(12) United States Patent  
Koenck et al.

(10) Patent No.: US 6,714,983 B1  
(45) Date of Patent: Mar. 30, 2004

(54) MODULAR, PORTABLE DATA PROCESSING TERMINAL FOR USE IN A COMMUNICATION NETWORK

(75) Inventors: Steven E. Koenck, Cedar Rapids; Patrick W. Kinney, Marion; Ronald L. Mahany; Robert C. Meier, both of Cedar Rapids; Phillip Miller, deceased, late of Cedar Rapids, all of IA (US), by Julie Ann Miller, executor

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 08/513,658

(22) Filed: Aug. 11, 1995

Related U.S. Application Data

(63) Continuation-in-part of application No. 08/114,872, filed on
(List continued on next page.)

(51) Int. Cl.⁷ .................................................. G06F 1/32
(52) U.S. Cl. .................. 709/230; 395/200.79; 395/500
(58) Field of Search ............................ 395/800, 200.01, 395/500; 364/DIG. 1, DIG. 2; 370/913

(56) References Cited

U.S. PATENT DOCUMENTS

| | | | |
|---|---|---|---|
| 3,665,164 A | 5/1972 | Beveridge | 235/460 |
| D229,234 S | 11/1973 | Kajita | D14/100 |
| D230,859 S | 3/1974 | Kurosu | D26/56 |
| 3,826,900 A | 7/1974 | Moellering | 250/568 |

(List continued on next page.)

FOREIGN PATENT DOCUMENTS

| | | |
|---|---|---|
| EP | 0194115 | 9/1986 |
| EP | 0262943 | 4/1988 |
| FR | 2389938 | 1/1979 |

(List continued on next page.)

OTHER PUBLICATIONS

C Patton, "Radio Transceiver Circuit Card Acts as Wireless Modem in PCs" p. 18, Mar. 1988, Infor World.
"PCMCIA Primer" by John Reimer, pp. 66–67, date unknown.

(List continued on next page.)

Primary Examiner—Eric Coleman
Assistant Examiner—Walter D. Davis, Jr.
(74) Attorney, Agent, or Firm—McAndrews, Held & Malloy, Ltd.

(57) ABSTRACT

A portable data terminal includes at least two communication transceivers having different operating characteristics, one for conducting data communications on a wired subnetwork and one for conducting data communications on a wireless subnetwork. A communication processor converts data received by the communication transceivers to a predetermined format for a base module and converts data in a predetermined format from the base module to a format for transmission by a selected one of the first and second communication transceivers, thereby isolating the base module from differing characteristics of the transceivers. The communication processor is arranged to relay communications received by one transceiver for re-transmission by the other transceiver and to transfer communications from one subnetwork to the other, without activating the base module.

25 Claims, 41 Drawing Sheets

Related U.S. Application Data

Aug. 31, 1993, now Pat. No. 5,680,633, which is a continuation-in-part of application No. 07/898,908, filed on Jun. 12, 1992, now abandoned, which is a continuation-in-part of application No. 07/835,718, filed on Feb. 12, 1992, now abandoned, which is a continuation-in-part of application No. 08/071,555, filed on Jun. 4, 1993, now Pat. No. 5,331,136, which is a continuation of application No. 07/660,615, filed on Feb. 25, 1991, now Pat. No. 5,218,187, which is a continuation-in-part of application No. 07/467,096, filed on Jan. 18, 1990, now Pat. No. 5,052,020, and a continuation-in-part of application No. PCT/US90/03282, filed on Jun. 7, 1990, which is a continuation-in-part of application No. 07/364,594, filed on Jun. 7, 1989, now abandoned, which is a continuation-in-part of application No. 07/339,330, filed on Apr. 14, 1989, now abandoned, which is a continuation-in-part of application No. 08/107,470, filed on Aug. 17, 1993, now abandoned, which is a continuation-in-part of application No. 08/081,411, filed on Jun. 22, 1993, now abandoned, which is a continuation-in-part of application No. 08/053,901, filed on Apr. 27, 1993, now abandoned, which is a continuation-in-part of application No. 08/097,462, filed on Jul. 26, 1993, now Pat. No. 5,590,346, which is a continuation-in-part of application No. 08/431,077, filed on Apr. 27, 1995, which is a continuation-in-part of application No. 08/097,462, filed on Jul. 26, 1993, now Pat. No. 5,590,346, said application No. 08/431,077, is a continuation-in-part of application No. 08/401,526, filed on Mar. 10, 1995, now abandoned, which is a continuation-in-part of application No. 08/258,285, filed on Jun. 10, 1994, which is a continuation-in-part of application No. 08/226,256, filed on Apr. 11, 1994, now abandoned, which is a continuation-in-part of application No. 08/194,178, filed on Feb. 9, 1994, now abandoned, which is a continuation-in-part of application No. 08/154,020, filed on Nov. 17, 1993, now abandoned, which is a continuation-in-part of application No. 08/107,470, filed on Aug. 17, 1993, now abandoned, application No. 08/513,658, which is a continuation-in-part of application No. 08/487,609, filed on Jun. 7, 1995, which is a continuation-in-part of application No. 08/279,148, filed on Jul. 22, 1994, now Pat. No. 5,657,317, which is a continuation-in-part of application No. PCT/US94/05037, filed on May 6, 1994, which is a continuation-in-part of application No. 08/198,404, filed on Feb. 22, 1994, nowabandoned, which is a continuation-in-part of application No. 08/198,452, filed on Feb. 18, 1994, now abandoned, which is a continuation-in-part of application No. 08/197,386, filed on Feb. 16, 1994, now abandoned, which is a continuation-in-part of application No. 08/168,478, filed on Dec. 16, 1993, now abandoned, which is a continuation-in-part of application No. 08/147,377, filed on Nov. 3, 1993, now abandoned, which is a continuation-in-part of application No. 08/101,254, filed on Aug. 3, 1993, now abandoned, which is a continuation-in-part of application No. 08/085,662, filed on Jun. 29, 1993, now abandoned, which is a continuation-in-part of application No. 08/076,340, filed on Jun. 11, 1993, now abandoned, which is a continuation-in-part of application No. 08/062,457, filed on May 11, 1993, now abandoned, which is a continuation-in-part of application No. 07/876,776, filed on Apr. 28, 1992, now abandoned, which is a continuation-in-part of application No. 07/854,115, filed on Mar. 18, 1992, now abandoned, which is a continuation-in-part of application No. 07/558,895, filed on Jul. 25, 1990, now abandoned, which is a continuation-in-part of application No. PCT/US93/12628, filed on Dec. 23, 1993, which is a continuation-in-part of application No. 07/997,693, filed on Dec. 23, 1992, now abandoned, which is a continuation-in-part of application No. 08/205,639, filed on Mar. 4, 1994, now Pat. No. 5,555,276, which is a continuation-in-part of application No. 07/735,128, filed on Jul. 22, 1991, now Pat. No. 5,365,546, which is a continuation-in-part of application No. 07/467,096, filed on Jan. 18, 1990, now Pat. No. 5,052,020, which is a continuation-in-part of application No. 08/275,821, filed on Jun. 10, 1994, now abandoned, which is a continuation-in-part of application No. 07/876,629, filed on Apr. 30, 1992, now abandoned, which is a continuation-in-part of application No. 08/027,140, filed on Mar. 5, 1993, now Pat. No. 5,602,854, which is a continuation-in-part of application No. 07/854,115, filed on Mar. 18, 1992, now abandoned, application No. 08/513,658, which is a continuation-in-part of application No. 08/267,758, filed on Jul. 5, 1994, now Pat. No. 5,568,645, which is a continuation-in-part of application No. 07/748,150, filed on Aug. 21, 1991, now Pat. No. 5,349,678.

U.S. PATENT DOCUMENTS

| | | | |
|---|---|---|---|
| 3,947,817 A | 3/1976 | Requa | 235/472 |
| 3,976,973 A | 8/1976 | Martin et al. | 235/472 |
| 4,002,892 A | 1/1977 | Zielinski | 307/150 |
| 4,005,400 A | 1/1977 | Engdahl | 340/365 R |
| 4,017,725 A | 4/1977 | Roen | 235/152 |
| 4,020,527 A | 5/1977 | O'Neill | 16/110 |
| 4,058,838 A | 11/1977 | Crager et al. | 358/257 |
| 4,091,270 A | 5/1978 | Musch et al. | 235/419 |
| 4,115,870 A | 9/1978 | Lowell | 364/900 |
| 4,133,034 A | 1/1979 | Etter | 364/464 |
| 4,136,821 A | 1/1979 | Sugiura et al. | 235/462 |
| 4,141,492 A | 2/1979 | Michel et al. | 235/437 |
| 4,158,130 A | 6/1979 | Speraw et al. | 235/146 |
| 4,158,194 A | 6/1979 | McWaters et al. | 235/454 |
| 4,165,554 A | 8/1979 | Faget | D18/7 |
| 4,188,103 A | 2/1980 | Biber et al. | 354/27 |
| 4,210,802 A | 7/1980 | Sakai | 235/483 |
| 4,247,908 A | 1/1981 | Lockhart, Jr. et al. | 364/900 |
| 4,277,837 A | 7/1981 | Stuckert | 364/900 |
| 4,282,425 A | 8/1981 | Chadima et al. | 235/462 |
| 4,322,612 A | 3/1982 | Lange | 235/419 |
| 4,385,285 A | 5/1983 | Horst et al. | 382/3 |
| 4,415,065 A | 11/1983 | Sandstedt | 186/39 |
| 4,418,277 A | 11/1983 | Tremmel et al. | 235/472 |
| 4,422,745 A | 12/1983 | Hopson | 354/105 |
| 4,423,319 A | 12/1983 | Jacobsen | 235/419 |
| 4,460,120 A | 7/1984 | Shepard et al. | 235/472 |
| 4,488,679 A | 12/1984 | Bockholt et al. | 235/469 |
| 4,500,776 A | 2/1985 | Laser | 235/162 |
| 4,506,344 A | 3/1985 | Hubbard | 364/900 |
| 4,511,970 A | 4/1985 | Okano et al. | 364/401 |
| 4,519,068 A | 5/1985 | Krebs et al. | 370/82 |
| 4,523,087 A | 6/1985 | Benton | 235/379 |
| 4,523,297 A | 6/1985 | Ugon et al. | 235/380 |
| 4,569,421 A | 2/1986 | Sandstedt | 235/383 |
| 4,570,057 A | 2/1986 | Chadima, Jr. et al. | 364/708 |
| 4,578,571 A | 3/1986 | Williams | 235/472 |

| | | | |
|---|---|---|---|
| 4,603,262 A | 7/1986 | Eastman et al. | 250/566 |
| 4,621,189 A | 11/1986 | Kumar et al. | 235/472 |
| 4,627,736 A | 12/1986 | Komaki | 368/88 |
| 4,628,193 A | 12/1986 | Blum | 235/375 |
| 4,634,845 A | 1/1987 | Hale et al. | 235/350 |
| 4,641,292 A | 2/1987 | Tunnell et al. | 381/42 |
| 4,654,818 A | 3/1987 | Wetterau, Jr. | 364/900 |
| 4,661,993 A | 4/1987 | Leland et al. | 455/103 |
| 4,689,761 A | 8/1987 | Yurchenco | 364/708 |
| 4,703,161 A | 10/1987 | McLean | 235/1 |
| 4,706,096 A | 11/1987 | Sato | 235/488 |
| 4,718,103 A | 1/1988 | Shajima et al. | 382/13 |
| 4,718,110 A | 1/1988 | Schaefer | 455/90 |
| 4,727,245 A | 2/1988 | Dobbins et al. | 235/472 |
| 4,734,566 A | 3/1988 | Senda et al. | 235/495 |
| D295,411 S | 4/1988 | Cho et al. | D14/100 |
| 4,743,773 A | 5/1988 | Katanta et al. | 250/566 |
| 4,749,353 A | 6/1988 | Breedlove | 381/43 |
| 4,752,965 A | 6/1988 | Dunkley | 235/379 |
| 4,758,717 A | 7/1988 | Shepard et al. | 235/472 |
| 4,760,248 A | 7/1988 | Swartz et al. | 235/472 |
| 4,761,822 A | 8/1988 | Maile | 455/82 |
| 4,766,300 A | 8/1988 | Chadima, Jr. et al. | 235/472 |
| 4,768,230 A | 8/1988 | Viebrantz et al. | 455/603 |
| 4,773,032 A | 9/1988 | Uehara | 364/900 |
| 4,793,812 A | 12/1988 | Sussman et al. | 235/472 |
| 4,825,057 A | 4/1989 | Swartz | 235/472 |
| 4,831,275 A | 5/1989 | Drucker | 235/472 |
| 4,835,372 A | 5/1989 | Gombrich | 235/375 |
| 4,836,256 A | 6/1989 | Meliconi | 206/523 |
| 4,842,966 A | 6/1989 | Omori et al. | 307/150 |
| 4,845,350 A | 7/1989 | Shepard et al. | 235/472 |
| 4,850,009 A | 7/1989 | Zook et al. | 235/375 |
| D303,112 S | 8/1989 | Desrochers | D14/100 |
| 4,857,716 A | 8/1989 | Gombrich et al. | 235/462 |
| 4,866,646 A | 9/1989 | Nakamura et al. | 364/709.11 |
| 4,877,949 A | 10/1989 | Danielson et al. | 235/462 |
| 4,881,839 A | 11/1989 | Grimm | 400/692 |
| 4,890,832 A | 1/1990 | Komaki | 235/146 |
| 4,897,532 A | 1/1990 | Swartz et al. | 235/472 |
| 4,910,775 A | 3/1990 | Yves et al. | 235/379 |
| 4,916,441 A | 4/1990 | Gombrich | 235/380 X |
| 4,942,356 A | 7/1990 | Ellingen et al. | 361/392 |
| 4,953,113 A | 8/1990 | Chadima, Jr. et al. | 364/708 |
| 4,967,188 A | 10/1990 | Collins | 340/636 |
| 4,972,496 A | 11/1990 | Sklarew | 382/13 |
| 4,983,818 A | 1/1991 | Knowles | 235/467 |
| 5,002,184 A | 3/1991 | Lloyd | 206/305 |
| 5,008,879 A | 4/1991 | Fischer et al. | 370/85.2 |
| 5,012,407 A | 4/1991 | Finn | 364/200 |
| 5,023,824 A | 6/1991 | Chadima, Jr. et al. | 235/462 |
| 5,029,181 A | 7/1991 | Endo et al. | 375/147 |
| 5,046,066 A | 9/1991 | Messenger | 370/349 |
| 5,046,130 A | 9/1991 | Hall et al. | 455/78 |
| 5,049,862 A | 9/1991 | Dao et al. | 340/706 |
| 5,049,863 A | 9/1991 | Oka | 340/710 |
| 5,057,676 A | 10/1991 | Komaki | 235/375 |
| 5,059,778 A | 10/1991 | Zouzoulas et al. | 235/472 |
| 5,101,406 A | 3/1992 | Messenger | 370/349 |
| 5,117,501 A | 5/1992 | Chidress et al. | 455/11.1 |
| 5,202,817 A | 4/1993 | Koenck et al. | 361/393 |
| 5,216,233 A | 6/1993 | Main et al. | 235/472 |
| 5,218,187 A | 6/1993 | Koenck et al. | 235/375 |
| 5,227,614 A | 7/1993 | Danielson et al. | 235/380 |
| 5,291,516 A | 3/1994 | Dixon et al. | 375/131 |
| 5,363,401 A | 11/1994 | Lucas et al. | 375/131 |
| 5,363,402 A | 11/1994 | Harmon | 375/132 |
| 5,404,375 A | 4/1995 | Kroeger et al. | 375/142 |
| 5,410,141 A | 4/1995 | Koenck et al. | 235/472 |
| 5,469,468 A | 11/1995 | Schilling | 375/130 |
| 5,513,184 A | 4/1996 | Vannucci | 370/350 |
| 5,546,397 A | 8/1996 | Mahany | 370/310 |
| 5,551,060 A | 8/1996 | Fujii et al. | 455/447 |
| 5,561,845 A | 10/1996 | Bendixen et al. | 455/443 |
| 5,627,882 A * | 5/1997 | Chien et al. | 455/465 |
| 5,644,576 A | 7/1997 | Bauchot et al. | 370/437 |
| 5,655,219 A | 8/1997 | Jusa et al. | 455/338 |
| 5,680,633 A | 10/1997 | Koenck et al. | 235/472.02 |
| 5,734,645 A | 3/1998 | Raith et al. | 370/329 |
| 5,790,587 A | 8/1998 | Smith et al. | 375/147 |
| 5,844,893 A | 12/1998 | Gollnick et al. | 370/329 |

FOREIGN PATENT DOCUMENTS

| | | |
|---|---|---|
| GB | 1572962 | 8/1980 |
| GB | 2201125 | 8/1988 |
| JP | 58-176792 | 10/1983 |
| JP | 58-211261 | 12/1983 |
| JP | 2-144681 | 6/1990 |
| WO | 8700659 | 1/1987 |
| WO | 8707106 | 11/1987 |

OTHER PUBLICATIONS

News Release "Norand Introduces Enhanced Wireless LAN Capabilities", May 16, 1995, by Norand Corporation, Cedar Rapids, Iowa, pp. 1–4.

News Release "Ositech Communications Inc. Will Release Next Month the Jack of Diamonds, A Type II PC Card", dated May 31, 1995.

Gary Legg, "Special Components Simplified Interface to PCMCIA cards", Jun. 10, 1993 EDN., pp. 61, 63–64, 66 and 68.

John R. Gyorki, "New Deal for Smart Cards", Machine Design, Jun. 1, 1993, pp. 38–40, 42 and 44.

* cited by examiner

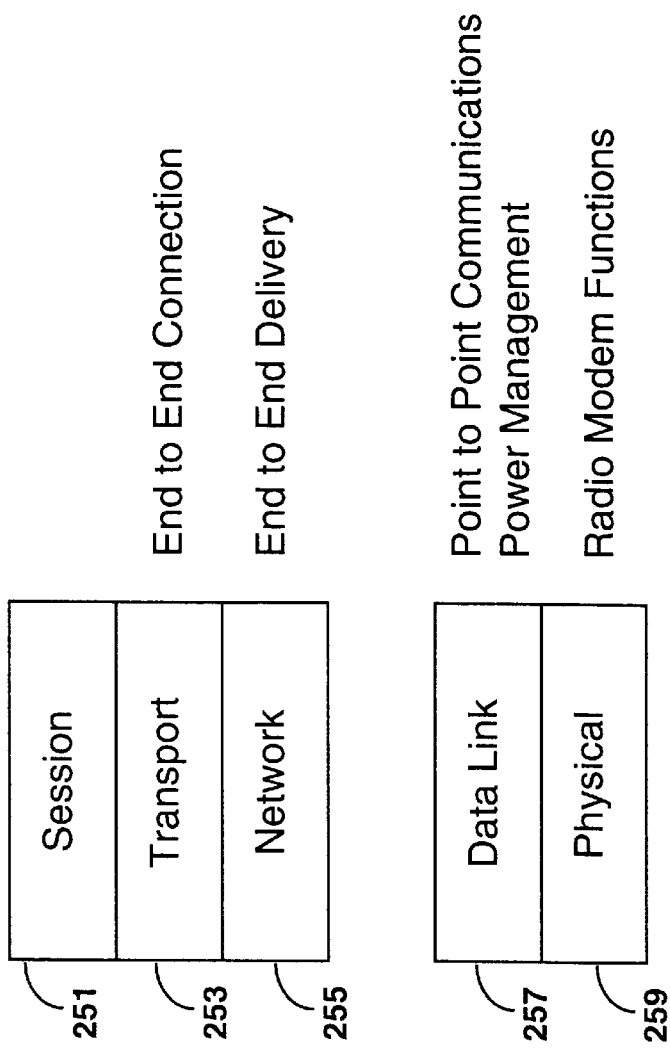

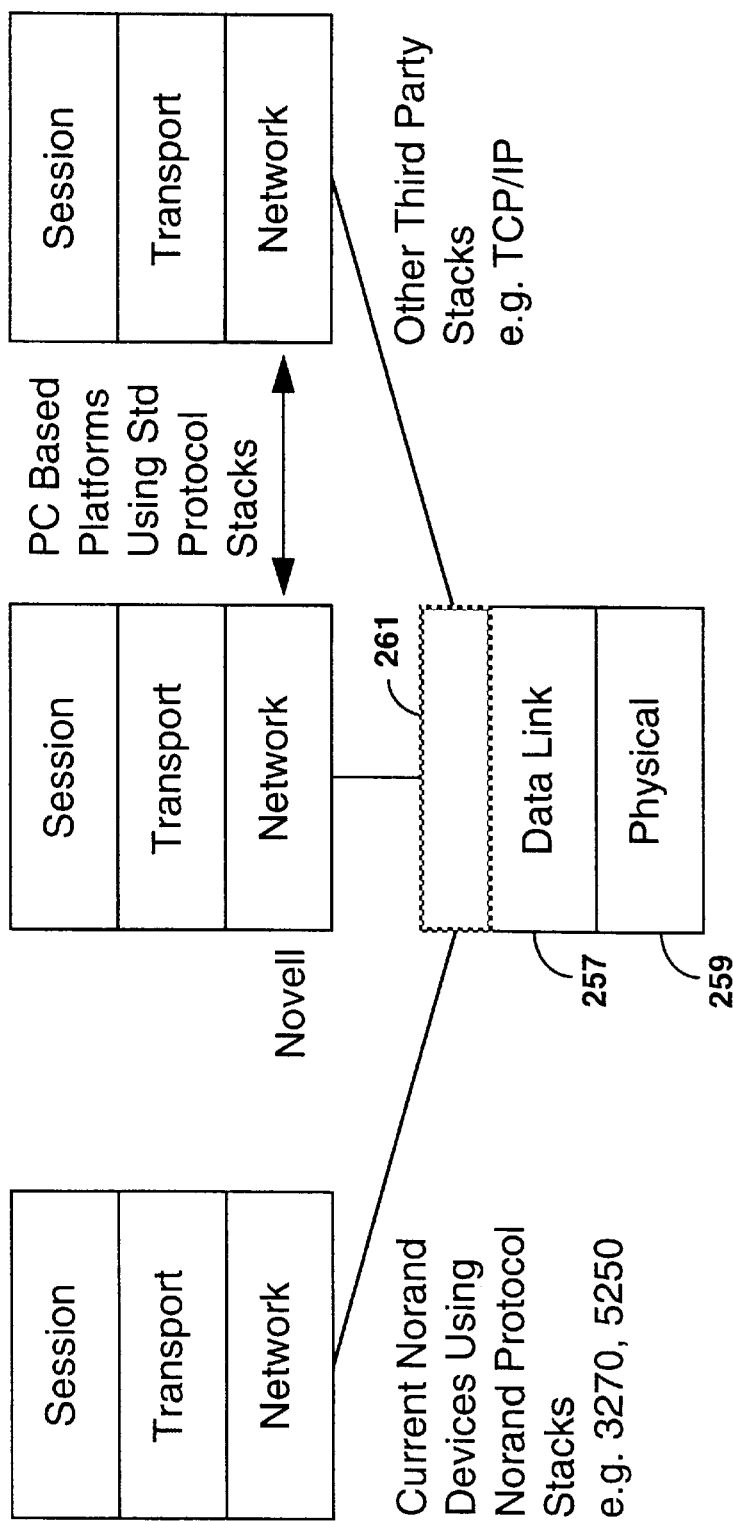

MODULAR, PORTABLE DATA PROCESSING TERMINAL FOR USE IN A COMMUNICATION NETWORK

CROSS REFERENCE TO RELATED APPLICATIONS

This application is a continuation-in-part of:
1. U.S. application Ser. No. 08/114,872 by Koenck et al., filed Aug. 31, 1993 (now U.S. Pat. No. 5,680,633), which is itself a continuation-in-part of:
   a. U.S. application Ser. No. 07/898,908, by Koenck et al., filed Jun. 12, 1992 (abandoned), which is itself a continuation-in-part of U.S. application Ser. No. 07/835,718, by Koenck et al., filed Feb. 12, 1992 (abandoned);
   b. U.S. application Ser. No. 08/071,555, by Koenck et al., filed Jun. 4, 1993 (now U.S. Pat. No. 5,331,136, issued Jul. 19, 1994), which is in turn a continuation of U.S. application Ser. No. 07/660,615, by Koenck et al., filed Feb. 25, 1991 (now U.S. Pat. No. 5,218,187, issued Jun. 8, 1993), which is itself a continuation-in-part of:
      1) U.S. application Ser. No. 07/467,096, by Koenck et al., filed Jan. 18, 1990 (U.S. Pat. No. 5,052,020, issued Sep. 24, 1991); and
      2) PCT application Serial No. PCT/US90/03282, by Koenck et al., filed Jun. 7, 1990, which entered the U.S. National Phase as application Ser. No. 07/777,393, filed Jan. 7, 1992 (now U.S. Pat. No. 5,410,141, issued Apr. 25, 1995), which claims priority as a continuation-in-part of U.S. application Ser. No. 07/364,594, by Cargin et al., filed Jun. 7, 1989 (abandoned), which is itself a continuation-in-part of U.S. application Ser. No. 07/339,330, by Cargin et al., filed Apr. 14, 1989 (abandoned);
   c. U.S. application Ser. No. 08/107,470, by Kinney et al., filed Aug. 17, 1993 (abandoned), which is itself a continuation-in-part of U.S. application Ser. No. 08/081,411, by Kinney, filed Jun. 22, 1993 (abandoned), which is itself a continuation-in-part of U.S. application Ser. No. 08/053,901, by Kinney et al., filed Apr. 27, 1993 (abandoned); and
   d. U.S. application Ser. No. 08/097,462, by West et al., filed Jul. 26, 1993 (now U.S. Pat. No. 5,590,346)
2. U.S. application Ser. No. 08/431,077, by Kinney et al., filed Apr. 27, 1995, which is itself a continuation in part of:
   a. The aforementioned U.S. application Ser. No. 08/097,462, by West et al., filed Jul. 26, 1993 (now U.S. Pat. No. 5,590,346); and Ser. No. 08/431,077
   b. U.S. application Ser. No. 08/401,526, by Kinney et al., filed Mar. 10, 1995 (abandoned), which is itself a continuation-in-part of U.S. application Ser. No. 08/258,285, by Kinney et al., filed Jun. 10, 1994, which is itself a continuation-in-part of U.S. application Ser. No. 08/226,256, by Kinney et al., filed Apr. 11, 1994 (abandoned), which is itself a continuation-in-part of U.S. application Ser. No. 08/194,178, by Kinney et al., filed Feb. 9, 1994 (abandoned), which is itself a continuation-in-part of U.S. application Ser. No. 08/154,020, by Kinney et al., filed Nov. 17, 1993 (abandoned), which is itself a continuation-in-part of the aforementioned U.S. application Ser. No. 08/107,470, by Kinney et al., filed Aug. 17, 1993 (abandoned).
3. U.S. application Ser. No. 08/487,609, by Mahany et al., filed Jun. 7, 1995, which is itself a continuation-in-part of:
   a. U.S. application Ser. No. 08/279,148, by Mahany et al., filed Jul. 22, 1994, (now U.S. Pat. No. 5,657,317), which is itself a continuation-in-part of:
      1) PCT application Serial No. PCT/US94/05037, by Mahany et al., filed May 6, 1994, which claims priority on U.S. application Ser. No. 08/198,404, by Mahany et al., filed Feb. 22, 1994 (abandoned), which is itself a continuation-in-part of U.S. application Ser. No. 08/198,452, by Mahany et al., filed Feb. 18, 1994 (abandoned), which is itself a continuation-in-part of:
         i) U.S. application Ser. No. 08/197,386, by Mahany, filed Feb. 16, 1994 (abandoned), which is itself a continuation-in-part of U.S. application Ser. No. 08/168,478, by Mahany, filed Dec. 16, 1993 (abandoned), which is itself a continuation-in-part of U.S. application Ser. No. 08/147,377, by Mahany, filed Nov. 3, 1993 (abandoned), which is itself a continuation-in-part of U.S. application Ser. No. 08/101,254, by Mahany, filed Aug. 3, 1993 (abandoned), which itself a continuation-in-part of U.S. application Ser. No. 08/085,662, by Mahany, filed Jun. 29, 1993 (abandoned), which is itself a continuation-in-part of U.S. application Ser. No. 08/076,340, by Mahany, filed Jun. 11, 1993 (abandoned), which is itself a continuation-in-part of U.S. application Ser. No. 08/062,457, by Mahany, filed May 11, 1993 (abandoned), which is itself a continuation-in-part of U.S. Ser. No. 07/876,776, by Mahany et al., filed Apr. 28, 1992 (abandoned), which is itself a continuation-in-part of U.S. application Ser. No. 07/854,115, by Mahany et al., filed Mar. 18, 1992 (abandoned), which is itself a continuation-in-part of U.S. application Ser. No. 07/558,895, by Mahany et al., filed Jul. 25, 1990 (abandoned); and
         ii) PCT application Serial No. PCT/US93/12628, by Mahany et al., filed Dec. 23, 1993, which claims priority on U.S. application Ser. No. 08/027,140, by Mahany et al., filed Mar. 5, 1993, (now U.S. Pat. No. 5,602,894), which is itself a continuation-in-part of U.S. application Ser. No. 07/997,693, by Mahany et al., filed Dec. 23, 1992 (abandoned);
      2) U.S. application Ser. No. 08/205,639, by Mahany et al., filed Mar. 4, 1994, (now U.S. Pat. No. 5,555,276), which is itself a continuation-in-part of U.S. application Ser. No. 07/735,128, by Mahany et al., filed Jul. 22, 1991 (now U.S. Pat. No. 5,365,546, issued Nov. 11, 1994), which is itself a continuation-in-part of U.S. application Ser. No. 07/467,096, by Mahany et al., filed Jan. 18, 1990 (now U.S. Pat. No. 5,052,020, issued Sep. 24, 1991); and
      3) U.S. application Ser. No. 08/275,821, by Mahany et al., filed Jun. 10, 1994 (abandoned);
   b. U.S. application Ser. No. 07/876,629, by Mahany et al., filed Apr. 30, 1992 (abandoned), which is itself a continuation-in-part of the aforementioned U.S. application Ser. No. 07/854,115, by Mahany et al., filed Mar. 18, 1992 (abandoned); and c. U.S. application Ser. No. 08/267,758, by Morris et al., filed Jul. 5, 1994, (now U.S. Pat. No. 5,568,645), which is itself a continuation of U.S. Ser. No. 07/748,150, by Morris et al., filed Aug. 21, 1991 (now U.S. Pat. No. 5,349,678, issued Sep. 20, 1994).

INCORPORATION BY REFERENCE

The following applications are hereby incorporated herein by reference in their entirety, and made part of this application:

1. U.S. application Ser. No. 08/114,872, by Koenck et al., filed Aug. 31, 1993 (now U.S. Pat. No. 5,680,633).
2. U.S. application Ser. No. 08/431,077, by Kinney et al., filed Apr. 27, 1995.
3. U.S. application Ser. No. 08/487,609, by Mahany et al., filed Jun. 7, 1995.
4. PCT application Serial No. PCT/US94/04977, by Kinney et al., filed Apr. 28, 1994.
5. U.S. application Ser. No. 08/457,697, by Kinney et al., filed Jun. 1, 1995 (now abandoned).

AUTHORIZATION PURSUANT TO 37 CFR 1.71 (d) (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to portable data collection and processing terminals for use in a Radio Frequency (RF) communication network, and, more specifically to portable terminals supporting a variety of RF transceivers and associated antenna systems. Additionally, this invention relates to methods in which a portable terminal gains access to the RF communication network.

In particular, portable data processing terminals have taken on an increasingly significant role in business environments. For example, battery powered, hand-held data collection terminals are used extensively for inventory control in warehousing and merchandising operations. Other uses of such terminals include invoicing, delivery route management, order taking and return control operations—as might be found in automobile rental operations.

In many business environments, portable data processing terminals often need to communicate in real-time with other portable terminals, peripheral devices, work stations, and host computers. To meet such communication needs, a variety of mixed hard-wired and wireless communication networks with associated communication protocols have been developed, each addressing the specific requirements of a given business environment. In the process of such development, portable terminals have undergone tailoring of both hardware and software to fully support a specific communication network and associated protocol.

As a result of such tailoring, each type of portable data collection terminal is generally capable of operating in a single type of business environment. Tailoring also results in unreasonable additional costs associated with developing, manufacturing, documenting, etc., each variety of portable data collection terminals.

More specifically, each portable data collection terminal includes a built-in radio transceiver. The built-in transceiver operates pursuant to one of a variety of types of RF (Radio Frequency) communication characteristics, characteristics that are directed per FCC (Federal Communication Commission) specification.

The choice of the type of radio transceiver, i.e., the type of RF communication characteristics, to build-in is based on the nature of the business application. For example, a digital cellular radio might be chosen in a environment having great distances between the radio and the destination transceiver. Similarly, data might be exchanged using a single channel UHF (Ultra-High Frequency), direct-sequence spread-spectrum, or frequency-hopping spread-spectrum band. Each of these bands has particular characteristics which make it attractive to a given business environment, and each generally requires a different transceiver.

After choosing the appropriate radio transceiver, an appropriate antenna is also selected. Each type of transceiver often requires a different type of antenna based on the corresponding RF communication characteristics, the shape of the portable terminal, and the business environment at issue.

Thus, there is need to provide a portable data collection terminal capable of easily supporting any of a plurality of types of radio transceivers and associated antennas, minimizing needed modifications to the terminal's hardware and software design.

As technical miniaturization has developed in the electronics industry, computers have been designed with smaller parts, and smaller peripherals. Entire peripherals have been incorporated into modules that connect to the computer. By incorporating functions into modules, computers have been designed with only basic functions, thus making the computer smaller, more efficient, and requiring less power. Custom and application-specific functions have thus been incorporated into the modules to be connected to the computer.

Modules have become so common that standards have been implemented to insure compatibility between modules and computers. The most popular of these standards is the Personal Computer Memory Card International Association (PCMCIA) standard, which sets forth a number of roughly credit card sized module configurations for use in various computers. These cards have become so popular that most portable computers are equipped with at least one PCMCIA card slot.

Modular cards can be used in a great variety of ways. PCMCIA cards may contain additional memory or storage, or implement communications or other peripheral functions. Communications supported by computer modules may include wired connection, such as over phone lines for a modem or through a wired local area network (LAN), and wireless communication such as a wireless LAN, a wide area network (WAN), or infrared. However, the number of peripheral functions that can be implemented with a single computer device has been limited in the prior art by the number of module slots supported by the computer. For example, a computer with only one card slot can only implement one peripheral function at a time. Even a computer device with more than one card slot is limited in its implementation of multiple peripheral functions. Interfacing between peripheral functions can only be done within the computer device itself, not by the card modules, since they are plugged into completely different slots and therefore are not directly interfaced together. Even when the computer accommodates interfacing between two different cards, additional processor power is required from the computer device, which is undesirable in many portable applications. Therefore, there is a need for a multipurpose computer module that can provide more than one peripheral function and control switching between those functions in a single module.

In addition, to support real-time access to a communication network, each portable data collection terminal needs to establish and maintain radio connectivity to the network. However, portable terminals must also address conflicting concerns of battery power conservation, i.e., maintaining connectivity places a substantial load on battery power. Moreover, the mobile nature of portable terminals also presents difficulties in maintaining connectivity. It would therefore be desirable to implement communication protocol techniques which address power saving and mobility concerns while providing virtually real-time access to the communication link.

SUMMARY OF THE INVENTION

A communication module for use with a portable data terminal according to the present invention comprises at least two communication transceivers having different operating characteristics for conducting data communications on a different subnetworks. As used herein, a "transceiver" refers to a device for transmitting and receiving any type of communicative energy, including but not limited to wired and wireless communication such as radio frequency, wired network communication, and infrared. A communication processor converts data received by the communication transceivers to a predetermined format and converts data in a predetermined format to a format for transmission by a selected one of the first and second communication transceivers.

In a preferred form of the invention, one of the communication transceivers is a wired transceiver and another of the communication transceivers is a wireless transceiver so that one of the subnetworks is a wired subnetwork and another of the subnetworks is a wireless subnetwork.

In one embodiment of the invention, the communication processor is able to relay communications received by one transceiver for re-transmission by another transceiver to transfer communications from one subnetwork to another.

In another embodiment of the invention, the communication processor includes means for initiating a test communication by the wireless communication transceiver, and means responsive to the absence of receipt of a reply test communication by the wired transceiver following initiation of a test communication by the wireless communication transceiver for conducting data communications with the wireless communication transceiver. This embodiment is particularly useful in testing the wired subnetwork by initiating a test communication from the wireless transceiver to a host computer which returns a reply test communication on the wired subnetwork.

The present invention is also realized in a portable data collection terminal that operates in a communication network having a first and second subnetwork. The portable data collection terminal comprises a base processing unit and a communication processor, as well as a first and second transceiver selected from a plurality of transceivers. The base processing unit operates according to its own set of communication software routines. Further, each of the plurality of transceivers has different operating characteristics. The communication processor isolates the base processing unit from the differences in the operating characteristics of the first and second transceivers.

In one embodiment, the base processing unit is contained in a base module of the portable data collection terminal. The data collection terminal also has a communication module that contains the communication processor and the first and second transceivers.

BRIEF DESCRIPTION OF THE DRAWINGS

FIGS. 1B and 1C are diagrams illustrating the modularity of the software protocol stack used by the data terminal in accordance with the present invention;

DETAILED DESCRIPTION OF THE INVENTION

Figure 1:
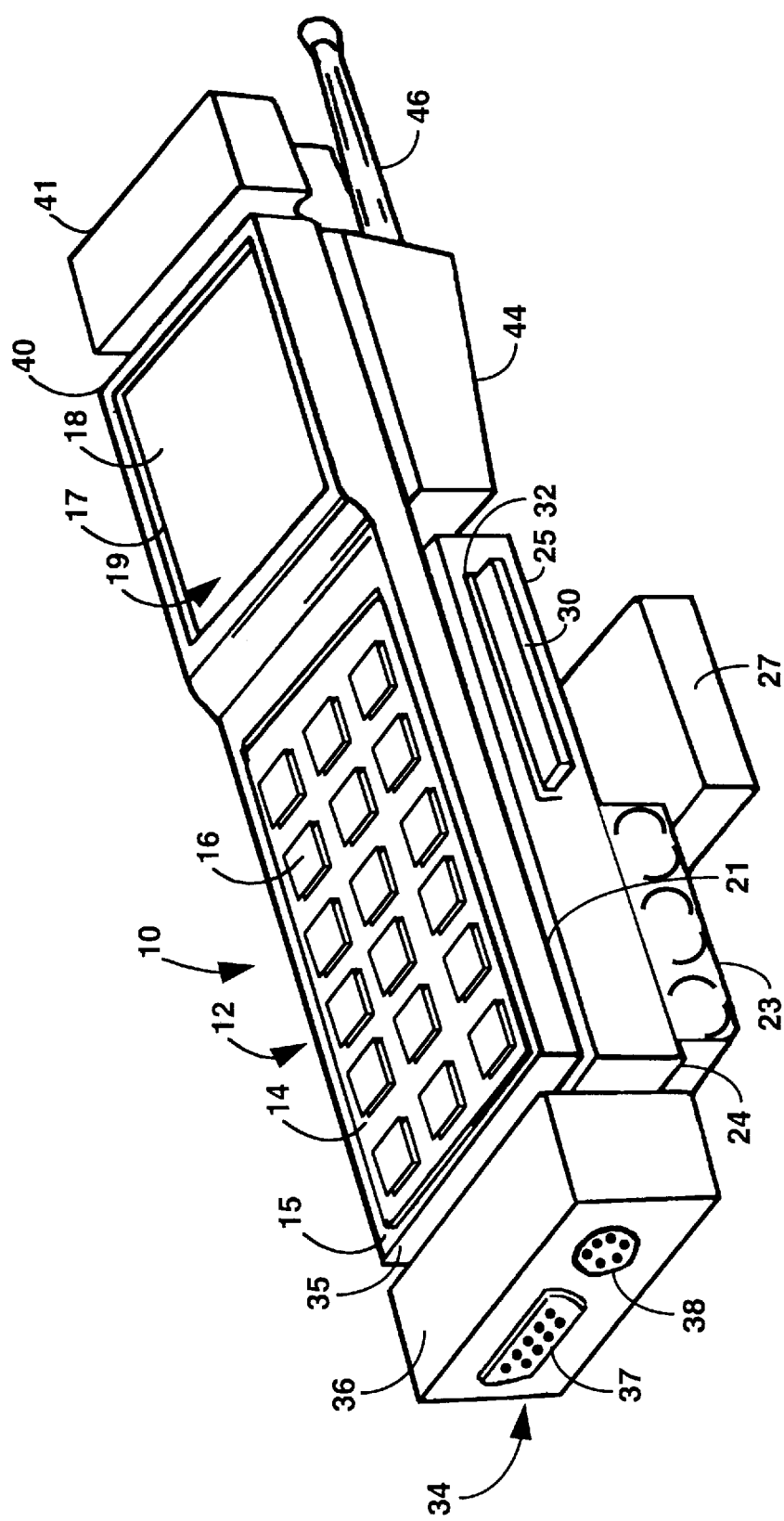
FIG. 1 is a ,schematic pictorial representation of a modular data collection terminal unit to which the present invention applies and showing schematically physical representation of modules of the data collection terminal.

Functional interconnections and power saving features of the present invention may be better understood from knowing how various building blocks or modules of a portable data collection terminal unit relate to each other. FIG. 1 shows a schematic arrangement of various physical modules or components that become integrated into the portable data terminal unit which is designated generally by the numeral 10. Hand-held terminals are of generally rectangular, elongate shape for accepted practical user friendliness. Thus the modular terminal unit 10 desirably has an elongate, rectangular shape. An upper module 12 provides a sensory or physical interface to an operator of the terminal unit 10. The module 12 is referred to as a keyboard and display module 12 and features a keyboard 14 which may be a typical alphanumerical keyboard, including also function keys and cursor manipulation keys as part of an integrated keyboard arrangement. The keyboard 14 may be, and desirably is, a submodule in itself, inserted and mounted into a mounting frame 15 of the keyboard and display module 12. In a typical manner, the depression of molded keytops 16 generally closes electrical contacts in a lower contact plane (not visible) of the keyboard 14. The type of keyboard 14 is, however, not critical and not considered limiting to the invention. The keyboard 14 being a selected one of a number of available keyboards is, however pertinent to the invention. For example, in one application the keyboard 14 may be preferred to be a twenty or a twenty-four key keyboard. Such a keyboard 14 comprises comparatively few keytops 16, the locations and functions of which are more readily learned and accepted by an operator. Such keyboards typically do not have alphabetical key functions. Thus for many record keeping and merchandising operations, the keyboard 14 having an array of twenty or twenty-four keytops may be most desirable. In another operation, a greater number of keytops 16 may be required to display the letters of the alphabet, numbers, and to provide for the execution of various functions. Thus, a keyboard 14 having an array of fifty-six keytops 16 may be preferred. Numerous variations in the arrangement of the keytops 16 within the array of the keyboard 14 are additionally possible. Mechanical or touch sensitive keytops 16 may be employed. In fact, touch sensitive keyboards which are known in the art, and typically involve programming and bi-directional feedback, may be improved by interconnection features of the present invention which will become apparent from the detailed description as a whole.

The keyboard and display module 12 further includes an upper cavity 17 wherein a display screen 18 is disposed. The display screen 18 is preferably a state-of-the-art liquid crystal display, the liquid crystal display ("LCD") technology being well established in the art. A dot-addressable liquid crystal array screen 18 is ideal for "User friendliness" and versatility and permits the display of various alphanumeric characters and graphic symbols, as well as Chinese or Japanese character symbols. Of course, dot-addressable graphic representations are known to require a substantial level of data processing and memory storage to permit the symbols to be displayed or moved about on the display screen 18 with reasonable speed. Long delays between the time that an operator pushes a keytop 16 to obtain data and the time that the requested data are displayed is considered "user unfriendly" and is commercially undesirable. A display technology which has become a standard is referred to as VGA technology. VGA screens are capable of fine gray scale or color resolutions. The display screen 18 would be part of a selected display screen module 19 of a number of available display screen modules.

Figure 1A:
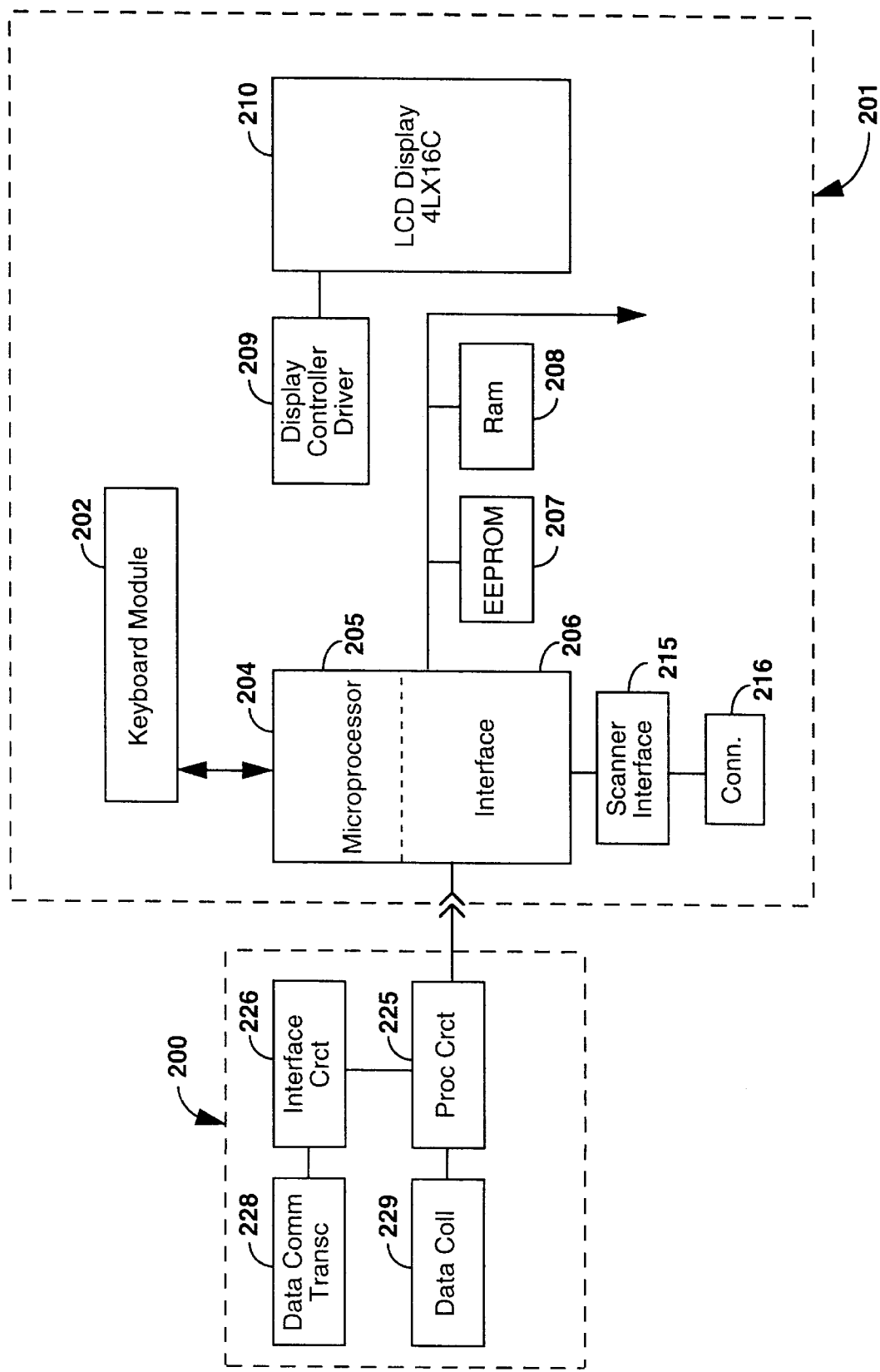
FIG. 1A a schematic diagram of functional blocks for illustrating major functional elements of a base module and a respective data and communications module of a data terminal in accordance with the present invention.

FIG. 1A illustrates one embodiment of the data processing terminal of the present invention illustrating advantages in the modular design approach. The terminal utilizes a microprocessor controlled data transfer between the base module 201 and any of a number of data and communication modules which may include various data collection and data communication transceivers such as narrowband radio frequency, frequency-hopping or direct-sequence spread spectrum radio frequency, modem or other wired network communication, infrared, etc. The terminal 10 and all of its circuits, including those of attached modules, are powered by a power pack module 23 as described herein.

Specifically, FIG. 1A shows a block diagram of functions of the base module 201 and a typical data and communications module designated generally by the numeral 200. The base module 201 is operative in conjunction with a typical radio frequency transceiver provided by the data and communication module 200, for example. The base module 201 includes a typical keyboard module 202 interactively coupled to a microprocessor 204. A preferred microprocessor is a 80C196KC device which is a 16-bit microcontroller 205 with on-chip masked ROM, RAM and built-in timers, ports, analog to digital converters and a serial interface 206. Thus, the microprocessor functions as a microcontroller and as an interface for communicating data and control signals to and from the base module 201. In addition to the on-chip memory capacity, an external ROM 207 and an external RAM 208 may be provided for additional data processing and communication capacity. Display controller and driver circuits 209 may be multi-chip circuits or may be integrated into a single device to drive the described LCD screen 210. A typical scanner interface 215 is coupled to a 9-pin connector 216, such as the referred to D-subminiature connector which may couple a laser scanner or CCD scanner to the base module 201 for data collection.

The data and communication module 200 is of particular interest in that an improved interfacing may be obtained by coupling communication between the data and communication module 200 and the base module 201 through a microprocessor 225, such as, for example an 80C51 microprocessor circuit. Typical on board ROM allows the microprocessor to be programmed to interact with a number of devices in accordance with the stored program. The microprocessor interacts with an interface circuit 226 which may be an analog or mixed analog and digital interface circuit. The program for interacting with the interface circuit 226 may also be stored within an on board ROM. The interface circuit 226 is coupled to a transceiver module 228. The microprocessor 225 may also be coupled directly to a data collection interface 229 to receive data from a scanner for reading any number of different bar codes or for providing input data from other external sources. The operation of the microprocessor 225 for coupling data to the base module 201 transforms communication patterns, allowing various input patterns to be processed by any of specific operational protocols controlled by the microprocessor 225, such that the data input from the data collection circuit can be made the same from any of a number of devices, isolating the base module 201 from differences in operating characteristics among the communication module devices. Also, with respect to the operation of the transceiver, the program for operating the microprocessor 225 may include particular address codes for data retrieval and data communication via the transceiver. The data sent via a data and control bus between the microprocessors 225 and 204 is converted to a uniform data transfer protocol or communication pattern to the base module 201. The addition of the microprocessor 225 in a data and communication module 200 thus increases the number of communications devices that may be represented by the data communication transceiver circuit or module.

The data and communication module 200 may be removed and replaced with a number of other modules. In those modules, the transceiver 228 may be, for example, any RF radio, such as a spread spectrum, UHF, or cellular transceiver, or a wired network transceiver, or an infrared transceiver. The commonality between all communication modules is the microprocessor 225 and the associated communication protocol back to the microprocessor 205 of the base module 201. In other words, the program function represented by the interface circuit 226 and interacting with the microprocessor 225 permits the interactive control and data stream between the base module 201 and the data and communication module 200 to appear the same to the base module 201 no matter how the module 200 communicates, effectively isolating the base module 201 from differences in operating characteristics associated with the transceiver 228 of communication module 200.

The reference to the particular microprocessor circuits should not be considered limiting to the scope of the invention. The combination of two microprocessors interacting with each other, each controlling the environment of a respective one of two submodules such as the base module and the data and communication module permits an increased number of different components and functions to be used within the data system. The data collection terminal unit of the present invention is particularly designed for use in a mobile computer network. Such a network connects mobile interactive radio-equipped computers (such as the terminal unit 10) to an infrastructure of stationary computer devices.

Communication within the network is generally governed by software control through a grouping of software routines. Together, the software routines define an overall communication protocol for the network. The software groupings also define a stack of protocol layers; i.e., a protocol stack. The protocol stack divides the overall communication protocol into hierarchical layers of functionality.

FIG. 1B illustrates one embodiment of the software protocol stack used by the modular data collection terminal unit of the present invention. The protocol stack is split to illustrate that the functionality of the software is divided between the base module 201 and the data and communication module 200. Specifically, the functionality of the upper layers of the protocol stack (i.e., sessions layer 251, transport layer 253, and network layer 255) is performed by the microprocessor 205 of the base module 201 while the functionality of the lower layers (i.e., data link layer 257 and physical layer 259 is performed by the microprocessor 225 of the data and communication module 200.

The sessions layer 251 performs general login functions, such as authentication of passwords, etc.

The transport layer 253 provides end-to-end connectivity within a mobile computer network. It recovers from lost data packets, discards duplicate data packets, and fragments and reassembles logical user messages. Essentially, the transport layer 253 provides a data pipeline between access points in terminal modes.

The network layer 255 provides end-to-end delivery of data packets within a mobile computer network. Specifically, the network layer 255 (1) organizes modes in the network into a spanning tree; (2) routes data packets along branches of the spanning tree; (3) provides a service for storing data packets for sleeping terminals (i.e. power management); (4) propagates lost terminal mode information throughout the spanning tree; (5) maintains spanning tree links; (6) allocates and distributes network addresses; and (7) maintains and provides diagnostic network statistics.

The data link layer 257 controls access to the communication channel and is responsible for providing reliable transmission between any two devices in the network on both wired and wireless links.

The physical layer 259 performs radio modem functions and is therefore very radio transceiver dependent.

As can be appreciated, the lower the level in the protocol stack, the more transceiver dependent the protocol becomes. Similarly, the lower the level, the more business environment specific the protocol becomes. Thus, a good dividing line for the protocol layers that exist in the communication module 200 is at the data link layer 257. This way, any communication module 200 supporting any type of transceiver can communicate with the common higher levels or protocol stack existing in the base module 201.

Alternatively, the dividing line might also be drawn at a higher level, for example, at the network layer 255, or somewhere in between. For example, referring to FIG. 1C, a portion of the network layer which addresses the specific concerns of roaming portable terminals and power management might be migrated into the communication module 200. Such migration permits the communication module 200 protocol substack to be able to communicate with other higher level protocol stacks which do not directly support such network layer functionality.

Further detail regarding mobile computer networks and the above protocol is found in attached Appendix A, a Masters Thesis entitled "Mobile Computer Network Architecture" authored by Robert C. Meier.

FIG. 1C illustrates the compatibility of the lower layers of the protocol stack (i.e., that of the data and communication module 200 used by the data collection terminal unit of the present invention with a variety of standard protocol stacks. Particularly, the protocol of the data and communication module 200 is capable of interfacing with any personal computer (PC) based platforms that use a standard protocol stack. Such PC based platforms may include, for example, a Novell Ethernet Network or TCP/IP. The network layer protocol associated with the mobility of a terminal unit (i.e. specific spanning tree and power management functionality), data link layer, and the physical link layer is managed by the microprocessor 225 of the data and communication module 200. This protocol substack is stored in the interface circuit 226. Similarly, the substack containing the sessions layer transport layer and a majority of the network layer is stored in memory in the base module 201.

Figure 2:
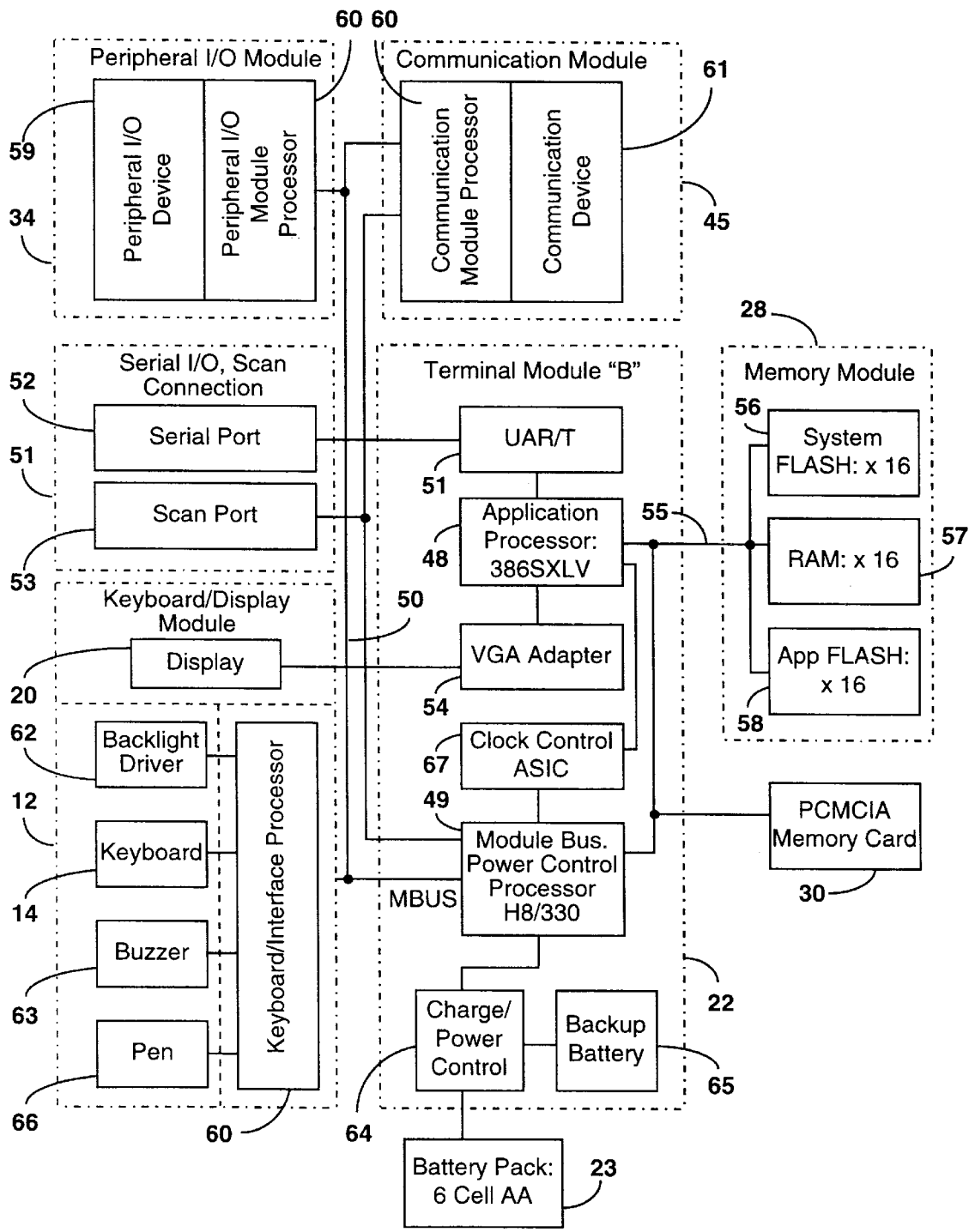
FIG. 2 is a schematic diagram of functional interfaces among various modules of the data collection terminal shown in FIG. 1.

In an alternate embodiment, FIG. 2 illustrates a schematic diagram of functional interfaces among various modules of the data collection terminal unit of FIG. 1. As will become more apparent below, the embodiment in FIG. 2 expands on the concept explained in reference to FIG. 1A of splitting up the hardware functionality and software protocol layers of the terminal unit 10 to enable ease of radio transceiver substitution. FIG. 2 refers to a display screen module 20 which is similar in function to display screen module 19 discussed above, yet which may include selected differences to illustrate the advantages of the modular concept in combination with other features of the present invention. Display screens may vary in size or resolution or both, such that options among a number of display screen modules 19 may be made available to a potential user of the terminal unit 10. A display of an array of (128 by 240) pixels of, for example, (0.25×0.25) millimeter is an example of what is considered to be a desirable display screen resolution. Another screen array size may be (64×192) pixels, for example, of (0.35×0.50) millimeter per pixel.

The keyboard and display module 12 occupies most of the area of the terminal unit 10 which faces an operator when the terminal unit 10 is held and operationally used by the operator. Assembled to an underside 21 of the keyboard and display module 12 are preferably two major modules of the terminal unit 10. A first module is what is referred to as the terminal module 22. Whereas the keyboard and display module 12 is the major interface component between the operator and the terminal unit 10, the terminal module 22 is a major functional component of the terminal unit 10 itself, as will become apparent from the description herein. The terminal module 22 functionally controls the interaction of the various units or modules as described herein, and functionally is the control unit of the terminal unit 10. The terminal module 22 houses functional submodules and microprocessor circuits. A significant component is, of course, a power pack module 23. The power pack module may contain, for example, six AA type rechargeable cells which may be arranged in a convenient flat arrangement and fitted into a battery end 24 of a housing 25 of the terminal module 22. The power pack module 23 supplies the power to various modules of the terminal unit 10, thus providing the capability for portable use of the terminal unit 10.

From the above description of potential choices of the type of display on the display screen 18, and further choices among keyboard arrangements of the keyboard 14, different requirements for electronic support circuits are indicated. One of the requirements to support the economical changing of functions is a means to provide a ready change in programmability of microprocessor circuits. Some module selections of the terminal unit 10 require less memory usage and different operational protocols than others. In accordance with a preferred embodiment, a memory module 27 may be selected as one of a number of differently programmed memory modules 27. However, in addition to being differently programmed, an alternate memory module 28 may include a different memory size (in cell numbers and in configuration). The terminal module 22 may further include an exchangeable memory card 30. The memory card 30 may be used to provide additional memory capacity as well as control programs for various desired functions of the various modules as described herein. The memory card 30 is schematically shown as being insertible laterally into a slot 32 of the housing 25 of the terminal module 22. However, the shown physical arrangement is but one of a number of equally desirable arrangements. An enclosed and sealed arrangement for the memory card 30 is desirable to protect modules of the terminal unit 10 from the environment.

A peripheral I/O module 34 is shown at a lower or inner end 35 (see FIG. 1) of the terminal unit 10. The inner end 35 is typically pointed toward an operator of the terminal unit 10, as the unit is held in the operator's hand with the keyboard and display module 12 directed upward toward the operator. The I/O (Input-Output) module 34 may typically include externally of a housing 36 a standard RS-232 and RS-485 connector 37. FIG. 1 also depicts a round communication connector 38. The peripheral I/O module 34 provides an interface between the terminal unit 10 and such diverse peripheral devices as "docks". Docks may be batch transfer devices for transferring accumulated data, battery charging devices, or cables which may connect to a code scanner, for example. An RS-232 interface is typically connected to a printer, for example.

A serial I/O and scan connection module 41 may be attached at a longitudinally opposite outer end 40 (see FIG. 1) of the terminal unit 10. The scan connection module 41 is a high speed serial data communication module 41 which provides for serial data to be received in high volume from a scanner for example. Scanner data are typically received in a high density data string and require significant processing. As will become apparent below, a direct communication link to the data processing capability of the terminal unit 10 is provided through the scan connection module 41.

A further functional module is a communication module 44. Again in reference to FIG. 1, the communication module 44 may be disposed adjacent the terminal module 22 toward the outer end 40 of the terminal unit 10. The communication module 44 is selected from a group of available communication modules of distinct functions. The selection of one of the communication modules such as the communication module 44 in FIG. 1, may characterize or classify the operation of the terminal unit 10. For example, a communication module 44 may have been selected from a group of modules which include standard FM data radio transceiver modules, spread spectrum radio transceiver modules, modem communication modules, scanner device modules, or other data input or communication devices. FIG. 2 shows a communication module 45 as an alternate to the physical representation of the communication module 44 shown in FIG. 1 to indicate a diversity of modules available for substitution. In further reference to FIG. 1, the communication module 44 is shown as having an antenna 46, indicating the selection being a transceiver unit for radio frequency real time communication with a data system. Such a data system typically includes a further transceiver station, not shown, with which the transceiver module 44 communicates. In other embodiments, the transceiver unit selected my be a wired or infrared transceiver for use with their appropriate communication networks. The operator of the terminal unit 10 also constitutes a second end of a communication link that is established by the operator's manipulation of the keyboard 14 and by the operator's visual perception and recognition of the data displayed on the display screen 18.

Referring now to FIG. 2, a functional schematic diagram of a combination of the physical modules discussed with respect to FIG. 1, or of alternate equivalents of the modules in FIG. 1, is shown. The modules with respect to which preferred physical positioning was discussed in reference to FIG. 1 are now shown functionally related in FIG. 2. It is to be noted that the schematic representation refers to functional or communication rather than electrical connections. The power pack 23 is typically coupled to power all electrically driven circuits of the terminal unit 10. The power pack 23 is functionally and physically coupled to the terminal module 22. While electrical power is distributed from the power pack 23 to all electrically powered or controlled modules of the terminal unit, the remaining power of the power pack is actually monitored by a function of the terminal module 22. The power pack 23 as the sole portable power source for the terminal unit 10 would, but for power saving provisions, experience a significant power drain during the operation of the terminal unit 10.

Power savings are implemented by selectively using circuit functions as they are needed. Accordingly, the terminal module includes preferably first and second microprocessors 48 and 49, respectively. The first microprocessor 48 is a data processing device and is also referred to herein as an application processor 48. The application processor may be any of a number of available microprocessors available. Desirably the application microprocessor 48 has the capability of processing data with greater word length or word width than the second processor 49. The term word width refers to the number of data bits that are capable of simultaneously being processed, retrieved or stored. The application processor 48 is therefore one capable, for example, of processing a 16-bit or a 32-bit data word. The processing speed and clocking rate of the application processor 48 would desirably exceed that of the second microprocessor 49. At present, the more powerful microprocessors, such as the microprocessor 48, have higher power requirements than the second microprocessor 49. However, even with the higher power requirement during operation, power savings may be achieved by providing a rest state at which the microprocessor 48 is not clocked and thus deactivated.

The second microprocessor 49 is also referred to as a control processor 49. The second microprocessor controls the operation of the terminal module 22 and controls communication within the terminal module as well as among the various other modules of the terminal unit 10. The control processor 49 requires less power for operation than the application processor 48 for reasons that will become apparent. Control is an ongoing function. Because the operational speed of the control processor 49 is comparatively slower than that of the application processor 48, the operational power consumption of the control processor 49 is also lower than that of the application processor 48. The control processor 49 may be a Hitachi H8/330 type microprocessor device. The Hitachi H8/330 processor features on-board memory which is convenient for its intended operation as will be seen in reference to its operational modes as set forth herein. The H8 type processor is an 8-bit processor, capable of processing data in an 8-bit word length. However, the control processor 49 need not be an 8-bit processor. In general, the word width processing capacity of the control processor 49 should be chosen to be relatively less than that of the application processor 48. The control processor 49 does not require the processing speed that is desirable for the application processor 48, and, processors with relatively low word width processing capacity (considering processors in general) require less processing power. It should be understood, however, that the specification of any particular device, such as the Hitachi H8-type microprocessor for the control processor 49, is for illustrative purposes only. The features and desired functions of the invention will be helpful to one skilled in the art to select any of a number of acceptable devices to function in the desired manner as described herein.

Figure 3:
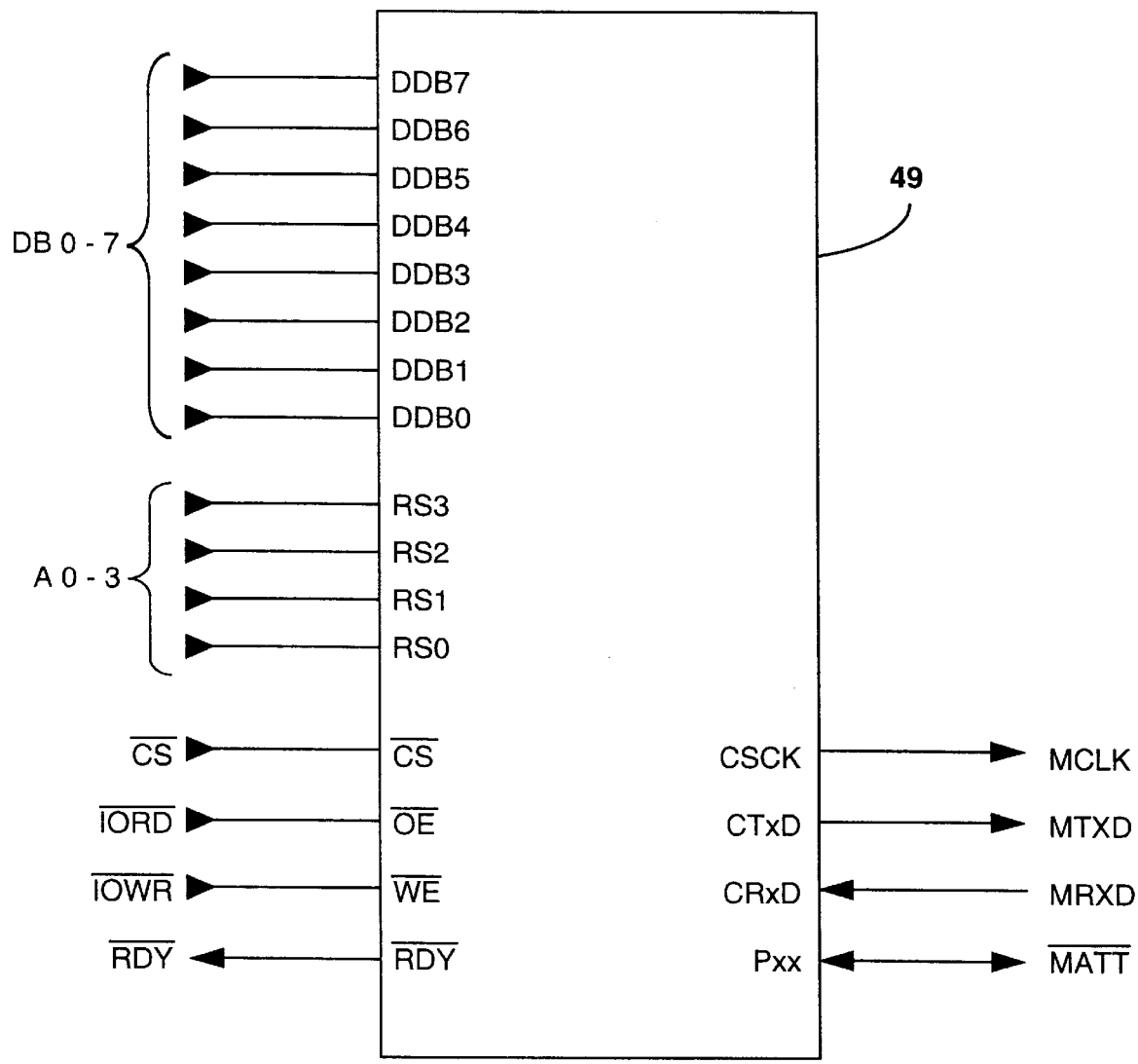
FIG. 3 is a schematic diagram of a control microprocessor, illustrating data bus terminals for synchronous communications.

FIG. 3 shows a schematic block representative of signal terminals of the control microprocessor 49 which are pertinent to the preferred mode of implementing the present invention. In describing the significant signal and data terminals, a bar above a designation indicates that a low signal is active. Herein, the inverse or signal low active state is described with an "N" preceding the letter name at the respective signal term. To communicate among the various described modules, four signal leads of the control processor 49 define the leads of a communication bus 50 referred to herein as "MBUS". The MBUS 50 is a high speed synchronous serial data signal bus which may, and preferably does, operate at a signal rate of 500 kilo bits per second. The high speed data bus provides reliability advantages explained below. In a modular structure in which the modules are readily disconnected and reconnected to permit convenient changes during the manufacture of the final product, may reduce the reliability of the terminal unit 10. When reliability is decreased with each additionally coupled module, the advantages of modular structure are quickly dissipated. Compared to typical parallel data buses used to link components of electronic products or systems, the present system architecture of the modular terminal unit 10 requires significantly fewer contacts to interconnect the various modules. With fewer signal lines to manage, it becomes more feasible to protect each line from noise and interference effects by using well known shielding, impedance reduction and termination techniques thereby increasing the reliability of the terminal unit 10. As a result, the present invention is typically more reliable than modular systems with conventional parallel data transfer, due to the reduction in the interconnections among the various modules. FIG. 3 shows four signal terminals which constitute the MBUS concept. "MCLK" is the clocking signal which synchronizes the modular counterparts of the control processor 49. The clocking signal provides for a bit rate of 500 kilo bits per-second. The terminal labeled "MTXD" transfers data from the control processor onto the MBUS 50. The terminal labeled MRXD receives data from other modules over the MBUS 50. The low signal active "NMATT" is a control signal line which indicates that data will be communicated over the MBUS 50. These four lines effectively permit the various modules to communicate among each other. A number of signal contention protocols are available to resolve potential collisions in data communication. It should be understood that any standard signal contention protocol may be modified if so desired to assign specific priorities for communication among the modules. For example, data received from a scanning operation may be accepted and processed on a priority basis. Keystroke inputs from the keyboard and display module 12 may be given priority over data flow from the communication module 45. Similarly, data messages received via radio transmission from an external master unit (not shown) may be given priority. Program altering instructions may be embedded within the message which affect future operations of the terminal unit 10.

Further with respect to FIG. 3, corresponding data lines interfacing with the application processor 48 are indicated as parallel signal lines DB0–7 and data lines A0–3. Data communication and control procedures between the control microprocessor 49 and the application processor 48 are further described with respect to alternate embodiments.

Referring again to FIG. 2, the application processor 48 is coupled to an asynchronous device or "UAR/T" function 51 with an output coupled to a serial port 52 of the serial I/O scan connection module 41. The serial I/O scan connection module 41 further includes a scan port 53 which links to the control processor 49 to communicate control signals, such as scan trigger signals, for example. The application processor 48 is further coupled to a VGA adapter circuit or driver 54 for driving the display screen 20. The display screen function is processor intensive. Data processing operations are, therefore, managed directly through the application processor 48. The data processing operations performed by the application processor 48 are in most instances memory-usage intensive. Consequently, the application processor 48 is linked by a conventional data bus 55 directly to the memory module 28. The memory module 28 is shown as including representative data storage functions or circuits including a 16-bit word width system FLASH-programmable memory 56, a typical 16-bit word width random access memory 57 ("RAM"), and additional application FLASH-programmable memory 58, also preferably 16-bit word width. The 16-bit word width storage devices 56, 57 and 58 are preferred in conjunction with a 16-bit microprocessor device. Presently preferred 16-bit microprocessors are a Chips and Technologies F8680 device or an Advanced Micro Devices 386SXLV processor. The selection of other processors for the microprocessor 48 may require different types of memory devices or different word width or storage capacities than those described above.

The peripheral I/O module 34 may, as discussed with respect to FIG. 1, include standard connectors for coupling the module 34 to an external device. A particular device 59 may be a portable printer device, as shown in the function block 59 of FIG. 2, which may be mounted or coupled directly to the terminal unit 10. The peripheral I/O device, whether it is a printer or a reader or other data input or output device, would functionally include a microprocessor 60. The microprocessor 60 is chosen to interact with the MBUS system. The microprocessor 60 is coupled in each described element to function as a terminal element, which is an interface communicatively coupling the respective logic circuits of the module to the MBUS. The microprocessor 60 receives control codes via the MBUS 50 and responds by activating or de-activating the power circuits of the respective module, or conditioning the module to receive or transmit data.

The communication module 45, which may be a modem, a wired network communication transceiver, or any of a number of available wireless transceiver modules, or may include two or more of the above transceivers, also includes a compatible microprocessor 60 which interfaces with a respective communication device 61 of the module 45. The communication device 61 may be a modem or transceiver device, for example. To be compatible with the MBUS data format of the other described modules. The keyboard and display module 12 also preferably includes its own interfacing microprocessor device 60. The keyboard and display microprocessor 60 is coupled to control various functions which are directly associated with the keyboard and display module 12. A particular function which may be conveniently controlled via the MBUS 50 and the respective control processors 49 and 60 is a backlight drive 62 for the display screen 20. Another function is a buzzer 63. The buzzer 63 may be activated to signal an incorrect key depression by an operator. The buzzer 63 may further be used to alert an operator when a charge and power control circuit 64 detects that the power pack 23 has become discharged and a backup battery 65 is being engaged, giving a user time to recharge or replace battery pack 23. The power control 64 may function to shut down the terminal unit 10 from further operation until the power pack has been recharged. In a preferred embodiment, power from the backup battery 65 would be maintained on the control processor to permit it to determine when power from the power pack 23 has been restored. The processor 60 of the keyboard and display module 12 may also control other input or output devices that may be coupled to the keyboard and display module 12. For example, a pen 66 may be coupled to the keyboard and display module 12 for use in connection with a pen stylus sensitive keyboard module 14 or in connection with a pen stylus sensitive display screen 20. In this latter instance, the display screen module 20 becomes an input device in addition to being an output device.

The application processor 48 and the control processor 49 are preferably controlled through a timing Application Specific Integrated Circuit 67 ("clock control ASIC"). The clock control circuit 67 may be driven from a single clock signal which is then divided to provide respectively different clocking rates to each of the processors 48 and 49. The implementation of the timing circuit 67 in a single circuit function is more efficient and provides synchronization among the components and modules. A second clock signal for implementing a real time clock may also be provided.

In addition to providing better reliability as discussed above, the MBUS 50 also provides more compact physical routing of cables among the modules. Furthermore, control of the functions of the various described modules via the MBUS 50 provides power savings, as will be described more fully below in reference to FIGS. 4 and 5. To conserve power and prolong the operational time of the terminal unit 10 between changes or recharges of the power pack 23, the control processor 49 and the related MBUS module processors 60 place any module which is not in active use into dormant state.

The MBUS 50 communicatively interconnects the modules of the terminal unit 10, such as the peripheral I/O module 34, the communication module 45, the keyboard and display module 12 and the terminal module 22. Other modules that may be included in the active communication network of the MBUS 50 may simply be added as described herein. For each module, one of the microprocessors 60, having the data terminals of the microprocessor 49 shown in FIG. 3, namely MCLK, MTXD, MRXD and NMATT are coupled to the respective lines of the MBUS 50 to become part of the internal communication network of the terminal unit 10. The microprocessors 49 and 60 constitute the terminal elements of the communication network represented by the MBUS 50. For each module, the respective microprocessor 60, though it may be physically identical to the control microprocessor 49, functions as a subservient processor to the control processor 49. The microprocessors 60 become a communication interface between the MBUS 50 and the functional circuits of the respective module, whether the module is the communication module 45, the keyboard and display module 12 or the peripheral I/O module 34. Inputs from the respective module are accepted by the processor 60. An H8/330 microprocessor includes internal memory for receiving and temporarily storing data communications. Programmable ROM on the H8/330 permit instructions to be stored which particularly configure the microprocessor as a module processor 60. The interface operation of the microprocessor 60 differs from the controlling operation of the control processor 49 as shown below in reference to FIGS. 4 and 5.

Figure 4:
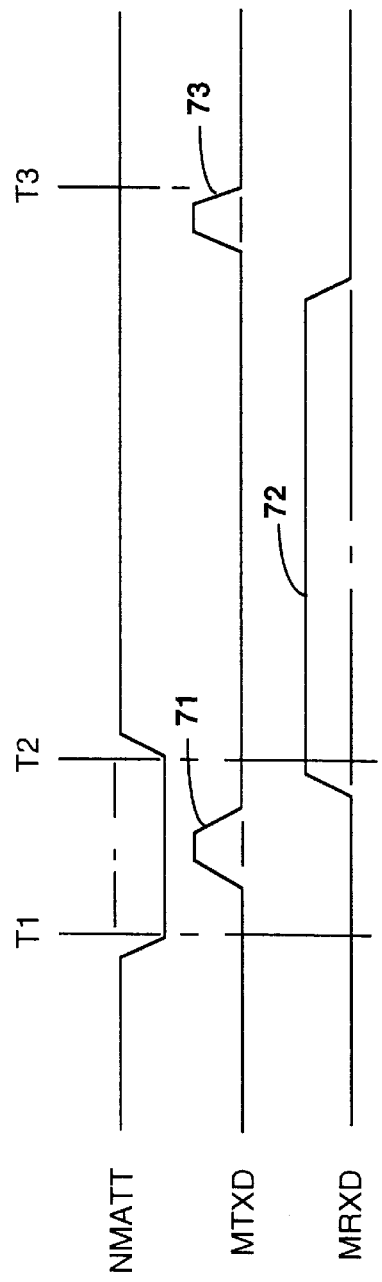
FIG. 4 is a sequencing diagram showing schematically occurrences of a module-initiated communication sequence in accordance with features of the invention.

A normal state of the microprocessors 49 and 60 is a sub-active or dormant state. In this state, the module processors 60 and the control processor 49 are clocked at a power saving "slow" clocking speed. The sub-active or dormant operational state permits the module processors 60 and the control processor 49 to execute certain long-interval control functions. For example, the keyboard and display screen processor 60 monitors the keyboard in order to sense a keytop depression while the control processor 49 maintains the charge and power control circuit 64 in order to sense a low battery signal. Upon occurrence of an event which that affects the operation of any typical communication function that is driven over the MBUS 50, all modules and the control processor are placed into a fully activated mode. The control processor 49 queries, directs and controls communication over the MBUS 50. For example, FIG. 4 shows an activation cycle of the MBUS 50 which is initiated by one of described modules other than the terminal module 22, i.e., from one of the processors 60. The respective processor 60 drives the NMATT line of the MBUS 50 into a low signal state. The low state of the NMATT line activates all processors 60 to receive an inquiry or instructions. At T1 in FIG. 4 all modules have been placed into the active state. During the time interval T1 to T2 the control processor sends a query or polls the activated modules over the MTXD line which is reserved for transmissions originating from the terminal module 22, i.e., from the control processor 49. The query would typically contain at least one byte of data, the quantitative translation of the byte of data indicating to the processors 60 that it is a query in response to one of the module processors 60 having driven the NMATT line to a low state. The query shown at 70 signals the processor 60 to transmit its data message over the MRXD line of the MBUS 50. At the onset of the data transmission 72 from the respective communicating module processor 60, the NMATT line is restored to a high state, placing all other modules back into the dormant condition. As shown in FIG. 4, the data communication may proceed for a variable length of time past the time state T2 at which the NMATT line has returned to a high state. Upon termination of data communication from the respective module processor 60 to the control processor 49, the control processor 49 sends a message 73 confirming correct receipt of the data message (at T3). Again the confirming data message contains at least one byte of information, the decoding of which would either indicate an error code or signal the correct receipt of the data message. At that time (at T3), the communicating module processor 60 and the control processor 49 also assume the power saving dormant state.

Figure 5:
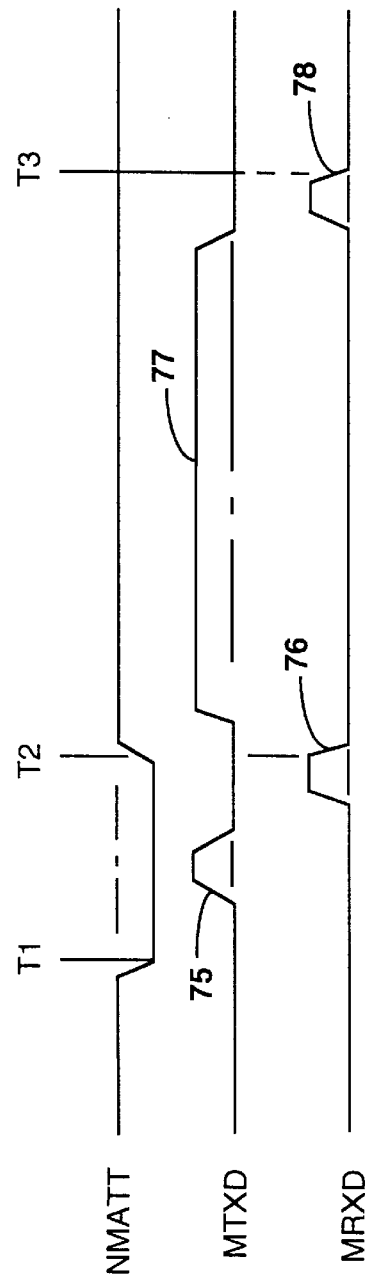
FIG. 5 is a further sequencing diagram illustrating schematically occurrences of a controller-initiated communication in accordance with features of the invention.

FIG. 5 describes a very similar event in which the control processor 49 drives the NMATT line to a low state. Again, all processors 60 assume an active state and all processors 60 receive a communication 75 of typically at least one byte of information from the control processor 49 during the time interval between T1 and T2. The information 75 contains an address of the module to which a data message from the control processor 49 will be directed. The respective module processor acknowledges its understanding of the address by a responding message 76 which may be translated by the control processor 49. In response to the receipt of the message the control processor releases the NMATT line, which assumes its normal high state and places all non-affected module processors 60 again into a dormant state. The control processor 49 then transmits its data message as indicated at 77 to the respective, previously addressed module processor 60. At the conclusion of the communication 77 from the control processor 49, the respective module processor acknowledges receipt of the communication 77 by its response 78. Once it is interpreted from the response 78 that the communication 77 has been received correctly, both the control processor 49 and the respective module processor 60 assume their dormant states. It is to be noted that the respective data messages shown in FIGS. 4 and 5 indicate durations of data messages. It is to be understood that the high and low states of other than the NMATT line indicate a time interval during which a great number of high or low states in synchronous time slots are transmitted essentially at the bit rate of 500 kilo bits per second. This bit rate may include start and stop intervals.

In the described communication events, power consumption by the terminal unit 10 is minimized by providing for a quasi dormant state for substantially all functions of the various modules, such that electrical power is used in pulses during the described query states and only in spurts by certain modules during real time performances. The power saving features in communication from and to the various modules is further present in implementing highly power intensive data processing operations in the terminal module 22.

Figure 6:
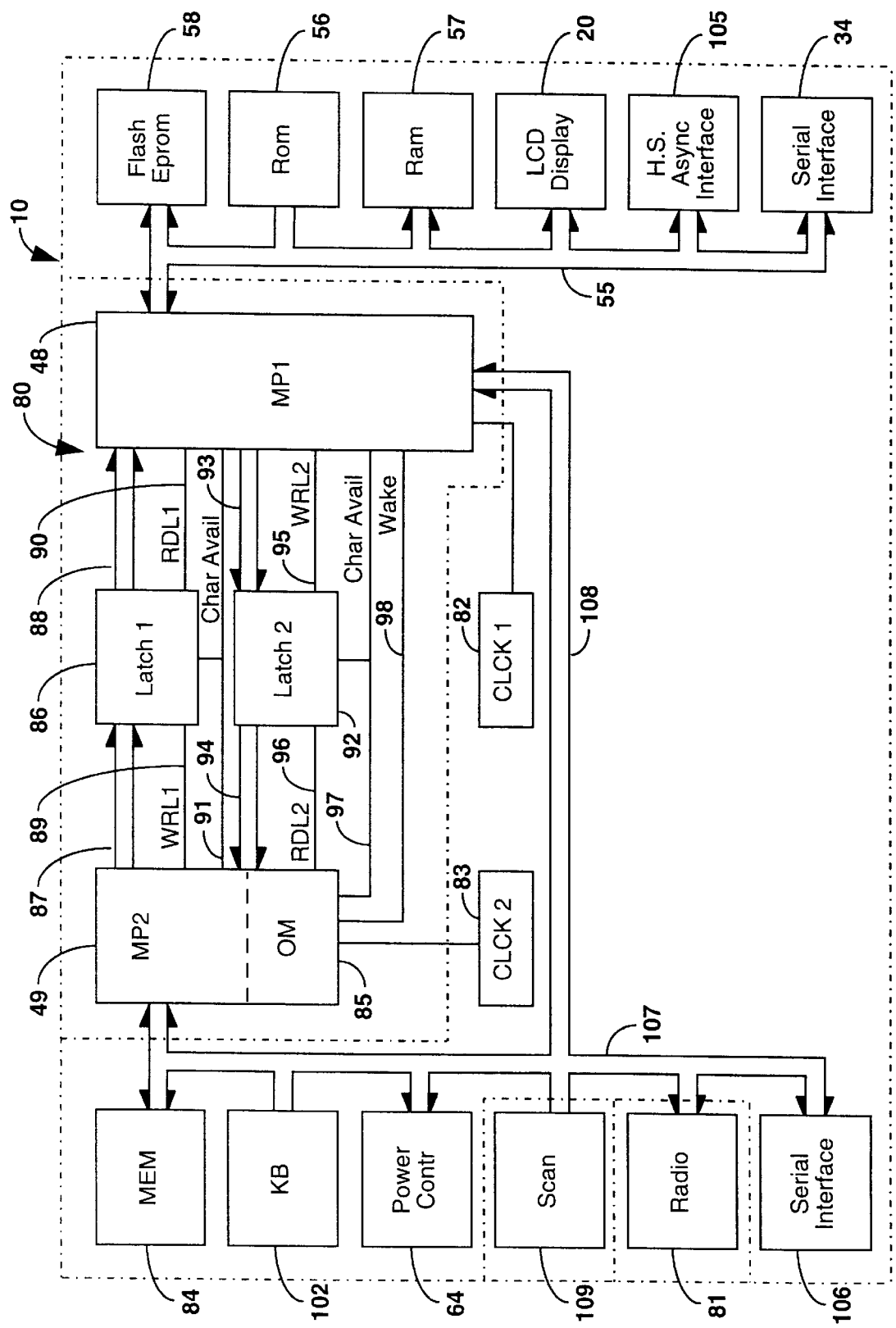
FIG. 6 is a schematic diagram of an alternate embodiment of the invention showing major functional elements and their interaction with a power saving microprocessor control circuit in accordance with the invention.

Referring to FIG. 6, the schematic diagram illustrates an alternate embodiment of the present invention where major functional logic and communications elements are coupled to and interact with the application processor 48 and the control processor 49 in a power-conserving microprocessor circuit 80. The circuit 80 may control the operations of, or be functional in the operation of, the terminal unit 10. The terminal unit 10 may interact as described with one or more distinct functional modules including communication modules, such as a transceiver communication module ("RADIO") shown at 81. Because the terminal unit 10 being portable, the physical circuits of the functional units or modules shown in FIG. 6 would typically be powered by the power pack or battery 23 (shown schematically in FIG. 2), which is illustratively included in the power management function ("POWER CONTR") 64. The microprocessor operated control circuit 80 comprises a combination of the application microprocessor 48 and the control microprocessor 49. The circuit 80 can also be two circuit portions that include specifically two microprocessor type subcircuits 48 and 49. Each of these subcircuits 48 or 49 are separately functioning microprocessor blocks, modules or separate microprocessor devices. In the preferred embodiment as described herein the devices are respectively an application processor 48 ("MP1") and a control processor 49 ("MP2"). It is advantageous to perform data processing operations at a comparatively higher speed and with a more powerful processor than is be desirable for relatively less complex control functions.

The term "data processing operation" is used herein in the sense of manipulating a series of binary codes according to programmed instructions to arrive at a desired result. Because of the great number of discrete binary operations required to perform many of the most common data processing functions, higher processor speeds and more complex or powerful microprocessor circuits of those typically available are more desirable for data processing operations.

In the now described embodiment, the application processor or data processing device 48 may be an "Intel 80C188EB" device which is "16-Bit" microprocessor device, operated at a preferred speed of 9.2 megahertz (MHz). At such preferred clocking speed of 9.2 MHz, the power consumption or operating current consumed by the data processing microprocessor device 48 is approximately 55 milliamps ("mA"). The control processor 49 may be a "Hitachi H8/325" device which is an "8-Bit" microprocessor, operated at a speed of one-half of the speed of the data processing microprocessor 48, that is, 4.6 MHz. Because of the smaller physical size of the control processor 49 and the slower, preferred clocking speed, the power consumption or current required by the control processor 49 in its operational mode is only about 9 mA, that is less than one-fifth of the power consumed by the processor 48. In general, the control microprocessor circuit or the control microprocessor 49 desirably operates at a slower and less power consuming speed than the application microprocessor circuit or the application microprocessor 48. A one-to-two speed ratio for driving the respective microprocessors 49 and 48 is preferably chosen because of the power savings that are realized with respect to the portable terminal unit 10. Respective clocking circuits 82 and 83 ("CLCK 1 and CLCK 2") are shown as providing respective timing signal ports coupled to the respective processors 48 and 49 to drive the processors at the desired speeds as described.

Also, a functional arrangement of the separate clocking circuits 82 and 83 preferably may be replaced by the clock control circuit 67, as shown in FIG. 2. The clock control circuit 67 may be expanded in its function to include an interface circuit function between the processors 48 and 49 which includes data transfer as well as clocking functions. The clock control circuit 67 would include in such coupling arrangement a typical divide-by-two timing circuit function. An original 9.2 MHz clocking signal port and a signal port with the divided by two signal, comparable to the timing signal ports 82 and 83, would be coupled to the respective timing signal input ports of the processors 48 and 49, respectively, to drive the processors 48 and 49 at their respective speeds of 9.2 and 4.6 MHz. As mentioned above, a second clock may be coupled to the clock control circuit 67 to provide a real time clock.

As will become apparent from the further description, it is within the scope of the invention to integrate the distinct functions and operational characteristics of the separately identified microprocessor devices 48 and 49 into a single integrated device. The resulting integrated device 80 desirably includes respective interface functions, as further described herein, to implement the power-saving characteristics realized by the control circuit 80. Within such integrated device 80, the function of the application processor 48 is then performed by a first microprocessor circuit block or circuit portion, and the function of the control processor 49 is performed by a second microprocessor circuit block or circuit portion. These circuit blocks, portions or modules interact essentially in the same manner within the circuit 80 as the currently used microprocessor devices 48 and 49.

The control processor 49 may include in its commercial implementation, in addition to typical microprocessor registers and an arithmetic logic unit, such functional circuit blocks as ROM, RAM and communications ports. These circuit blocks may also be included in any integrated device 80, or their functions may be supplied by peripheral devices. As shown in FIG. 6, additional external memory 84 ("MEM") may optionally be provided to supplement such on-board memory 85 ("OM"), though for typical operations as further described herein, the external memory device 84 is not required. According to one embodiment, data communication between the processors 48 and 49 occurs via an interface circuit that includes, for example, two 8-bit data registers or latches described in greater detail below in relation to FIG. 6. It should be understood, however, that the control processor 49 may have a direct bus interface to enable direct coupling of the control processor 49 to the application processor 48. The coupled processors 48 and 49 are capable of bidirectionally passing data and control signals without the described two 8-bit data registers or latches. Also, data latches are generally considered temporary data storage devices. Data from one device are latched into a respective data latch to be retrieved by a second device. Although not preferred, it is contemplated that dual post memory may be used as an alternative to the latches described below.

The clock control ASIC function 67 shown in FIG. 2 should be understood to not only include the clocking signal coupling circuits to drive the respective application processor 48 and the control processor 49, but to further include the data interface or bus to permit the desired bidirectional data and control code communication between the processors 48 and 49 as further described herein. In further reference to FIG. 2, an integration of the processor devices 48 and 49 into a single device desirably may include the described function of the interface and clock control circuit 67.

Referring again to FIG. 6, a first latch 86 ("LATCH 1") of the two latches is coupled through an 8-line parallel bus 87 to the microprocessor 49, and through a similar bus 88 to the microprocessor 48. Respective write and read lines 89 and 90 ("WRL1 and RDL2") provide control or trigger signals for the processor 49 to write data into the first latch 86 and for the processor 48 to read data from the latch 86. A handshake or control signal line 91 ("CHAR AVAIL 1") toggles between a high or "logic 1" to indicate to the processor 48 that data have been read into the first latch 86 by the processor 49 and a "logic 0" to signal that the processor has read or taken the data from the first latch 86. A second latch 92 ("LATCH 2") similarly stores an 8-bit data element written into the second latch 92 by the processor 48 over a second 8-bit write bus 93. A second read bus 94 transfers the data element stored in the second latch 92 from the latch to the second processor 49. The control or trigger signals for writing into or reading from the second data latch 92 are provided over trigger lines 95 and 96 ("WRL2 and RDL2"), respectively. A second handshake or control signal line 97 ("CHAR AVAIL 2") coupled to the second latch 92 and to the processors 48 and 49 also toggles between high and low signal states to indicate in the high state the availability of data in the second latch 92 and in the low state the completion of a read operation of the most recent data element by the control processor 49.

Figure 7:
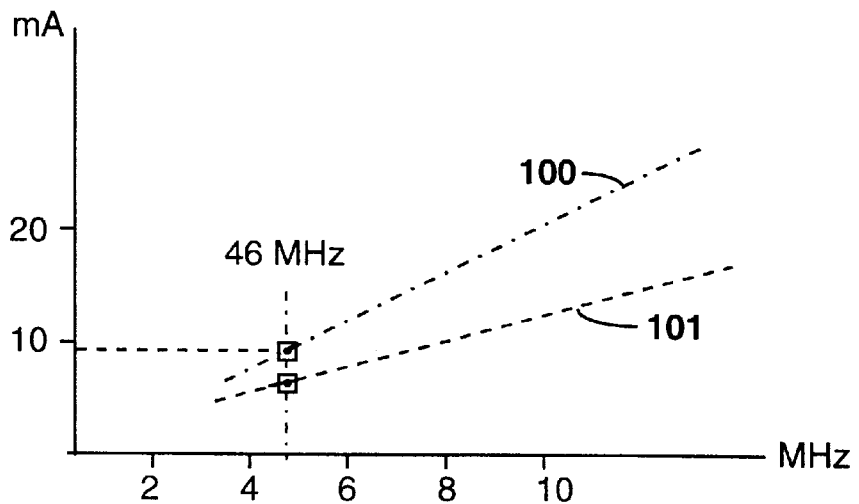
FIG. 7 is a schematic diagram showing typical, frequency related current characteristics of a control microprocessor device of the circuit shown in FIG. 5.

A control signal line 98 carries a control signal generated by the control processor 49 which controls the duty cycle of the application processor 48. In reference to FIGS. 7 and 8, the current usage of the control processor 49 ranges between a high of 9 mA in a typical operating mode and a low of about 7 mA in a typical "idle mode" at the preferred frequency of 4.6 MHz, (See FIG. 7, graphs 100 and 101, respectively). It should be realized that even while "idle", the control processor maintains power to internal memory and performs typical periodic monitoring functions, such as, for example, sampling a keyboard circuit 102 ("KB") for a "Depressed Key" signal or routinely monitoring the power management function 64 for a "Low Battery" indication. However, even when in the typical operational mode as indicated on the current vs. frequency graph 100, the control processor uses only about one-sixth of the current used by the application processor 48 in its preferred operational mode. On the other hand, when the application processor 48 is placed into an idle state (i.e., when it is not driven by a clocking signal), the required maximum current rating is 0.1 mA, as shown by the high-low indicated values at the 9.2 MHz frequency mark at and below graph 103 in FIG. 8. Graph 103 indicates the typical operating current consumption of the application processor 48. It should be noted that the application processor 48 could be deactivated by a complete electrical shut down of the device. However, because of the low non-clocked power or current draw of the application processor 48, the application processor function is preferably deactivated by eliminating its clocking signal but maintaining the application processor 48 under DC bias. Removing the clocking signal from the application processor function achieves a desired power-down idle state while permitting the device 48 to be reactivated immediately by an appropriate "wake up" control signal from the control microprocessor 49.

Typical data processing operations performed by the application processor 48 require approximately 10 milliseconds of time and not more than 20 milliseconds on the average of all operations which are typically performed by the application processor 48. A more user friendly and practical response time may be obtained from the terminal unit 10 (and less power is required) when the application processor 48 performs substantially all data processing operations is subsequently immediately deactivated than if a single alternative microprocessor circuit were used operating at a higher rate and including sufficient computing capacity to perform all required functions in an appropriately short time. The combination of the application processor 48 and the control processor 49 amounts, only to an approximate increase in current usage of typically about ten percent, and in the extreme of no more than 20 percent, over the normal operating current level of the control processor by itself. The power required by the application processor 48 as controlled by the control processor 49 is about one fifth that is required by the control processor 49 itself when it is operated continuously. However, the display speed and data manipulation speed of the terminal unit 10 essentially is the same as if the unit 10 were controlled by the more powerful application processor 48.

The operating current requirement for the application processor 48 is directly related to the number of actively switching elements in each computational operation. Though having an interrupt function, the referred to 80C188EB processor 48 does not include, in contrast to the control processor 49, any internal memory devices. FIG. 6 consequently shows a data bus 55 of the processor 48 coupled to external memory devices, such as the flash electrically erasable and programmable read-only memory 58 ("FLASH EPROM"), a read-only memory 104 ("ROM") and a typical random access memory 57 ("RAM"). The ROM 104 is also the functional equivalent to the system FLASH memory 56. The data bus 55 further couples the application processor directly to the display module 20 ("LCD DISPLAY") of the terminal unit 10. The display module 20 may be a dot addressable LCD graphic screen module, for example. A direct data transfer by the high speed application processor 48 to the LCD screen is preferred because of the substantial amounts of data handling or processing that is required in updating a particular screen. For example, even a small graphic screen display, such as a screen of 48×100 pixels, requires that each of the pixels be updated on a continuous basis. Typically control circuits, which are part of the data display function of the module 20 and are not separately shown, and which may be specific to a particular screen display, may routinely re-apply currently displayed information dots in a cyclic refresh operation to the already identified pixels of the screen. However, any screen update, such as a simple display line scrolling operation, requires that each pixel of the screen be updated. To perform such updating of information in a power efficient and prompt, user-friendly manner, a data processing operation and the high speed passing of the updated data between the RAM memory 57 and the data display 20 is accomplished during a short operational activation of the application processor 48. More data processing with respect to the data display screen 20 may be required for routine menu operations. Menu operations are particularly desirable for such portable terminal units 10, in that the typical user may not be well acquainted with computer terminals. Well defined menu operations with a number of available menu levels may therefore significantly increase the usefulness of a terminal unit. In addition to requiring the normal display screen update, menu operators also require data base searing and data retrieval. The above-described operations the described microprocessor circuit (i.e., with the selectively activated data processing device 48 and the relatively smaller and slower control processor 49) may be used to perform the menu operations.

Selective activation and deactivation of the microprocessor circuit portion implemented by the data processing device or application processor 48 also provides power savings when the operating speeds of the two processors 48 and 49 are the same. However, such power savings do not appear to be as great as those realized by the embodiment described above.

The application processor 48 may also communicate with a high speed asynchronous communication interface 105 ("H.S. ASYNC INTRFCE") to support facsimile or external display screen operations. In addition, the application processor 48 may communicate data to an RS-232/RS-485 serial interface module 34 ("SERIAL INTERFACE"). However, it should be realized that certain communications operations, such as outgoing communications to a printer (not shown) for example, may occur under the control of the control processor 49. Even when the application processor 48 selects data for communication to a line printer, a typical printer speed, except in a graphics mode, would be sufficiently slow to allow the application processor 48 to operate in an intermittent, power saving mode. FIG. 6 consequently shows a second RS-232/RS-485 interface 106 ("SERIAL INTRFCE") coupled to a second data bus 107, which is further communicatively coupled to the control processor 49 to support the above described data communication operation via the control processor 49.

The data bus 107 is further shown as being coupled via a bus extension 108 directly to the application processor 48. The data bus extension 108 is particularly provided for direct data communication between the application processor and a data scanner 109 ("SCAN"), which may, for example, be a bar code reader. Because of the high rate at which data are generated by the operation of a data scanner, the data are most reliably received, processed and stored by the application processor 48. A scanning operation may consequently involve the operation of both the application processor 48 and the control processor 49. According to one embodiment of the control circuit 80, the control processor 49 monitors the circuit function of the data scanner 109 to detect a control signal that indicates the event of a scanner trigger depression. The scanning operation results in a string of data appearing at the data bus 107 and the associated data bus 108. Since the application processor 48 is likely to be idle at the time of the occurrence of a trigger signal, the control processor places a "wake-up" signal on the control signal line 98 to activate the application processor 48. The control processor 49 further writes an 8-bit control character into the first latch 86. Upon completion of loading the control character into the data latch 86, the control processor 49 places a "one" signal on the character available line 91 to allow the application processor to read the control character from the latch 86. The application processor reads and decodes the control character in accordance with protocol instructions read from the ROM memory 56, for example. In the example of a scanner trigger indication, the decoded control character signals the forthcoming string of information to be received by the application processor 48 directly from the scanner 109 over the data bus 108. Hence, in contrast to being conditioned for the event of receiving data from the keyboard 49 or from the radio 81 (which data might preferably be received over the data latch 86), the application processor would in the event of scanned incoming data be conditioned to read the "event data" as a string of data directly from the data bus 108. The term "event data" is used to describe data relating to an event. Any time event data requires processing, such event data would be routed to the application processor 48 either directly, as described with respect to the scanner data, or between the two processors 48 and 49, such as by the circuit 67 or a similar interface circuit. It should be understood that conditioning the application processor to receive a string of data directly via the bus 108 need not be limited to the receipt of the scanner data. Such conditioning is contemplated for any use of the terminal 10 which requires a high volume of data to be received and processed within a short period of time. Upon completion of the scanning operation, a trigger release signal is loaded into the first latch and communicated from the control processor 49 to the application processor 48. Upon receipt of the signal and completion of any data processing operations remaining as a result of the receipt of data via the data bus 108, the application processor instructs the control processor to apply a "wake-up" signal to the control signal line 98 upon occurrence of any specified event requiring processing of data. Thus, in one embodiment, the control processor 49 continues to control the application processor 48 by transmitting control codes to selectively enable or disable the application processor 48 to directly receive data via the data bus 108. The receipt of data by the application processor 48 is referred to as "direct" data input, since the contemplated transfer of data via the data latches 86 and 92 is bypassed.

FIG. 2 shows schematically one embodiment of electrical components of an exemplary terminal unit 10, and the interactive relationship of such components to the application processor 48 or the control processor 49. FIG. 2 shows schematically a plurality of electrical components which are generally directly related to the functional elements discussed with respect to FIG. 6. In the embodiment shown in FIG. 2, the application processor 48 directly controls the previously referred to high speed asynchronous communications interface 105 and the RS-232/485 standards serial interface 34. The flash EPROM programmable read-only memory 58 is preferred to have no less than 256K byte storage capacity. The flash EPROM may supplement or even replace standard ROM, such as memory 56, which is preferred to have at least a 512K byte storage capacity. The ROM, if used, provides typical and normally non-variable data processing protocol instructions. Such ROM may include control instructions for standard display updating routines as well as for other routines which are typically implemented by standard keyboard instructions and which pertain to typical data input and output commands.

The random access memory 56 may be a semi-permanent static RAM type circuit. The memory may have a capacity of 512K bytes. The preferred data storage capacity provides sufficient storage for an on-board data base related to typical inventory or delivery route type information. In view of the portability of the terminal unit 10, an unexpected loss of battery power may bring about a significant loss of information unless the stored data are protected from destruction until full battery power is restored. For example, the terminal unit 10 may be returned at an initial signal of "low battery" to a battery charger unit (not shown) for a recharging operation and any stored data may be transferred, even while the battery 23 is being recharged, from the terminal unit 10 to a host computer (not shown).

Display 20 may be a graphic display having an array of 48×100 pixels. Typical menu or special graphic screen data may be pre-established for a particular terminal unit 10 or for an application group of such units and may be stored initially in the specific ROM 56 provided for the particular unit or units 10. As previously discussed, the updating of displayed data on the screen device 20 requires a significant amount of data processing. Typically, such data processing operations involve accessing permanently stored screen display information, such as from the ROM 56 or from the flash EPROM 58, the manipulation of such information, and temporary storage of such manipulated information in the random access memory 57. As shown in FIG. 2, the application processor 48 has direct functional control over the respective devices responsible for such data updating manipulations.

Contrast control is another function which is desirable in LCD display screen 20. In regards to FIG. 2, such a control may be integrally coupled to the VGA adapter circuit 54. The contrast of the LCD display screen 20 is typically set and adjusted by an operator and is a matter of choice. The contrast may be adjusted, for example, by a typical key depression or by a keyboard sequence given by an operator. Such control input executions are within the scope of operations of the control processor 49. Thus, in response to an appropriate command from the keyboard 102, the display contrast may be changed without activating the application processor 48. The contrast display may be controlled as indicated in FIG. 2 by the functional coupling of the keyboard circuit 102 to the control processor 49, and the further coupling of the processor 48 to the contrast control circuit and then directly to the LCD display screen circuit 20.

In one embodiment, the LCD display screen 20 is equipped with a backlighting drive 62. Many warehouse operations, route delivery operations and even merchandising inventory operations are often performed under sufficiently poor lighting conditions, thereby requiring a backlighting source to be supplied as a standard feature of the LCD display screen 20. A backlight drive circuit 62 may be coupled through the MBUS 50 to the control processor 49. A backlight drive circuit for use in conjunction with the exemplary terminal unit 10 is described in copending patent application by S. E. Koenck et al., Ser. No. 07/776,059, filed on Oct. 11, 1991, which application is assigned to the assignee of the present application. Both the application processor 48 and the control processor 49 may interact with the backlight drive circuit 62 to provide for an operator controlled brightness control sequence to be communicated to the backlight drive 62.

Figure 9:
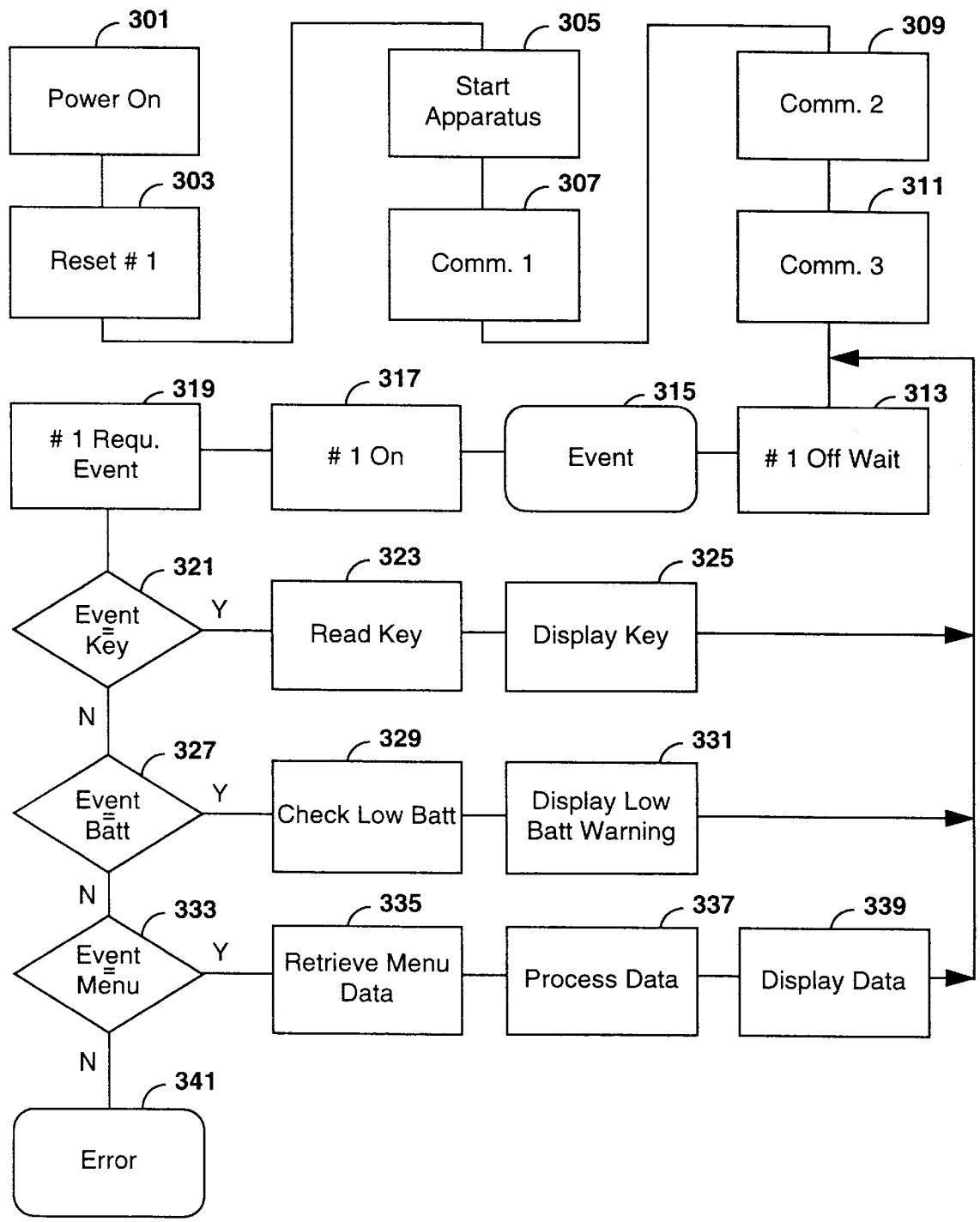
FIG. 9 is a flow diagram showing a desired interaction of the two microprocessor devices in FIG. 5 in accordance with the invention.

It should be realized that the control circuit 67 as an ASIC may also include, besides the timing function circuits for the real time clock and its functions, the clocking signals to each of the two processors 48 and 49. The control circuit 67 may also provide the already described data communication functions between the application processor 48 and the control processor 49, as represented in FIG. 6 by the two latching circuits 86 and 92. The function by the control processor 49 to activate or "wake up" the application processor for data processing operations is accentuated in the representation of the "wake-up" feature by the separate function line 98 in FIG. 2. In one contemplated embodiment, the control circuit 67 may include integrally a switching circuit function for separately switching the application processor 48 off or on, as indicated in FIG. 9 by the function blocks "#1 OFF WAIT" and "#1 ON". A switch in the integrated control circuit 67 may perform the switching operation by selectively interrupting and reestablishing the clocking signal to the application processor 48. In another embodiment, the application processor 48 may provide a shutdown status signal to the control processor 49 and shut itself down. The control processor 49 subsequently returns the application processor 48 to an active state upon occurrence of any event which requires the operation of the application processor 48. The process flow diagram of FIG. 9 generally depicts operational procedures between the application processor 48 and the control processor 49.

Further in reference to FIG. 2, a trigger control signal of the scanner module 41 may be received by the control processor 49. However the data flow from the scanner module 41 would be received directly by the application processor 48 for further processing and storage. Input signals which are received at speeds within the operational capability of the control processor 49 are received by and transferred through the control processor 49. For example, key depression signals from the keyboard 49 are generally received directly by the control processor 49. The keyboard for the terminal unit 10 referenced herein, as indicated in FIG. 2, may be a 6×8 key matrix. Because the real time selection of a key by an operator is slow in comparison to the processing speed of even the slower control processor, the interpretation of which key has been selected may be made by the control processor 49. An "event" indication character communicated to the application processor 48 may already reflect which of the available functions of a particular key has been selected. The preprocessing of slow occurring events limits the operational periods of the application processor 48.

The control processor further controls an input to an audible alarm circuit 63 ("BUZZER"). An audible alarm, a slow occurring event, generates a signal to alert an operator of an alarm condition or to indicate that a processing operation has been completed. For example, when the application processor 48 has received a string of data from the scanner module 41, and has further processed the received information to verify its correctness, the application processor 48 may communicate an acceptance code to the control processor 49 and be shut down from further operation. The control processor will then routinely generate an audible signal to alert the operator that the information has been accepted. Prior to communicating the acceptance code to the control processor, the application processor may retrieve from its memory 57, for example, information relating to the bar code which has just been read and accepted, and may compile an information screen displaying such retrieved information to the operator prior to the deactivation of the application processor 48. Thus, by the time the operator is alerted by the audible signal that the respective bar code has been read and accepted, the pertinent information regarding the item represented by the bar code is already displayed on the LCD display screen 20.

Other devices which may be under direct control of the control processor 49 are the radio 81 with its included radio interface ("RADIO INTERFACE"), and the power control circuit 64 ("CHARGE/POWER CONTROL") of the terminal unit 10. A serial interface 34 ("RS-232/RS-485 SERIAL INTERFACE") may optionally be controlled by the control processor 49. Because of the power savings achieved by the described interaction between the application processor 48 and the control processor 49, various other devices or functions may be added to the general operation of the terminal unit 10 without unduly limiting its operational cycle.

The interaction between the control processor 49 and the application processor 48 is described in greater detail in reference to both FIG. 2 and 9. In general, as discussed above, the application processor performs data processing operations, while the control processor 49 performs input-output control operations, which include periodic monitoring functions. The control processor 49 controls the activation or reactivation of the application processor 48. However, the application processor 48 processes the parameters and feeds to the control processor 49 the respective instructions that control the control processor 49. The application processor 48 is therefore, according to one embodiment, the one device which accesses the operations protocol of the terminal unit 10 from either the ROM or the flash EPROM devices 56 or 58.

Referring now to FIG. 9, the depression of the power switch by an operator, physically starts the terminal unit with a cold start at a block 301. The turn-on starts the clocking signal and the reset of both the control and application processors 48 and 49. The control processor 49 may reset the application processor 48 at a block 303. The reset operation starts the apparatus at a block 305 with an initialization sequence of communications between the application processor 48 and the control processor 49. During the initialization, the application processor 48 retrieves from its program storage default values, such as for a battery threshold value, and transfers the respective default value to the control processor 49 at a block 307. The control processor retains the default value and uses it in its further operations to operate the power control circuit 64. Other initialization functions may be performed, such as, for example, setting an initial contrast value on the LCD screen display 20 at a block 309, and determining whether or not the backlighting function is to be activated at a block 311. The application processor 48 further may retrieve data from memory 56, 57 or 58, and manipulate such data in a manner to indicate on the screen that the unit 10 is operational. Once the terminal unit 10 is initialized, the application processor 48 communicates to the control processor 49 that it is assuming its rest state at a block 313, and is shut off pending the occurrence of an event.

Upon occurrence of an event at a block 315, such as a "battery low indication" or the depression of a key by an operator, the control processor 49 causes the application processor 48 to turn at a block 317. Typically the clock signal to the application processor 48 may be provided by a control signal applied to the control device 67, or the application processor may be otherwise enabled, such as by an enable signal applied to the control signal line 98. Upon being activated, the application processor 48 communicates with the control processor 49, such as via the interface circuit 24 as described above with respect to FIG. 6, to request at a block 319 data relevant to the type of event that has occurred. After receiving the respective communication from the control processor 49, the application processor 48 tests the received information as to the type of event and proceeds to process data as required according to the program. FIG. 9 shows three typical events of a large number of possible programmed events for which the application processor 48 may be activated. A typical key depression detected at a block 321 may result in reading the value of the depressed key, at a block 323, from the second data latch 92 as described with respect to FIG. 6, or from an equivalent register of the control device 67 in FIG. 2. The information then results in the retrieval of data regarding the addresses of pixels which will be changed to a logical "high" to depict the information on the LCD display screen 20, at a block 325 the respective data being transferred to the respective circuit elements of the display screen 20. Thereafter, the application processor communicates to the control processor 49 that the instructions have been executed and is shut down to await a further activation by an event at block 315 and an instruction at block 317. The shutdown of the application processor 48 may be initiated either by the application processor 48 itself or by the control processor 49. Because the start-up or activation of the application processor 48 is initiated by the control processor 49, it may be desirable to disable the application processor 48 through the control processor 49.

Another typical event for activating the application processor 48 may be the detection of a low battery indication at a block 327 in response to a threshold value transferred by the application processor 48 to the control processor 49 during the described start-up procedure. The protocol may require that the application processor 48 verify the low battery indication by providing its own comparison check at a block 329. Because of an impending shutdown due to a low battery indication, the application processor may complete any operation if the low battery indication is still within tolerable limits or may suspend further data processing because of risk of errors. The application processor may further display a low battery indication on the LCD display screen 20 at a block 331 and then be shut off pending further event instruction as described above.

Another type event may be a special function key instruction such as the indication that a menu operation has been selected at a block 333. The application processor 48 proceeds to access a designated program routine corresponding to the requested menu choice ("RETRIEVE MENU DATA"). The respective program instructions are executed at a block 337, and the result or completion of the routine is displayed on the LCD display screen 20 at a block 339. The displayed result may be preceded by a repetitive interactive data transfer between the application processor 48 and the control processor 49, for example, when the menu choice requires the transmission of displayed information to a host computer. In such an event the application processor 48 may transfer the displayed information character by character to the control processor 49. The control processor 49 in turn activates the radio interface and transfers the information string to the radio interface to be transmitted in accordance with the program instructions interpreted by the application processor 48. FIG. 9 shows an error trap at a block 341 to which the program instructions proceed if an event code is not recognized by the programmed event descriptions and resulting processing routines of the application processor 48 for the particular application of the terminal unit 10. The data processing operations performed by the application processor 48 generally require less than 10 milliseconds. Thus, on the average, operations including the processing of keystrokes and the associated display manipulations require less than one fiftieth of the average operational period of the terminal unit 10. Substantial power savings are consequently achieved by selectively de-activating and re-activating the application processor 48 for preprogrammed events which require the execution of the respective data manipulations at a speed not obtainable by the control processor 49.

Further in reference to FIG. 9, if none of the event tests recognize the particular code supplied to the application processor 48, an event error trap routine at block 341 is used to inform the operator of the error condition. Such a routine may, for example, instruct the operator to again enter the most recently requested operation, and may include an audible warning from the buzzer. Various changes in the described control sequence may be implemented. Certain routines may be implemented at the described slower speed by the control processor 49 directly, while the application processor 48 remains deactivated. Further, other microprocessor devices may be chosen for the application and control processors, respectively. The described microprocessor devices are particularly suitable for various operations that are performed by the terminal unit 10 in the above-referred to operations.

Figure 10:
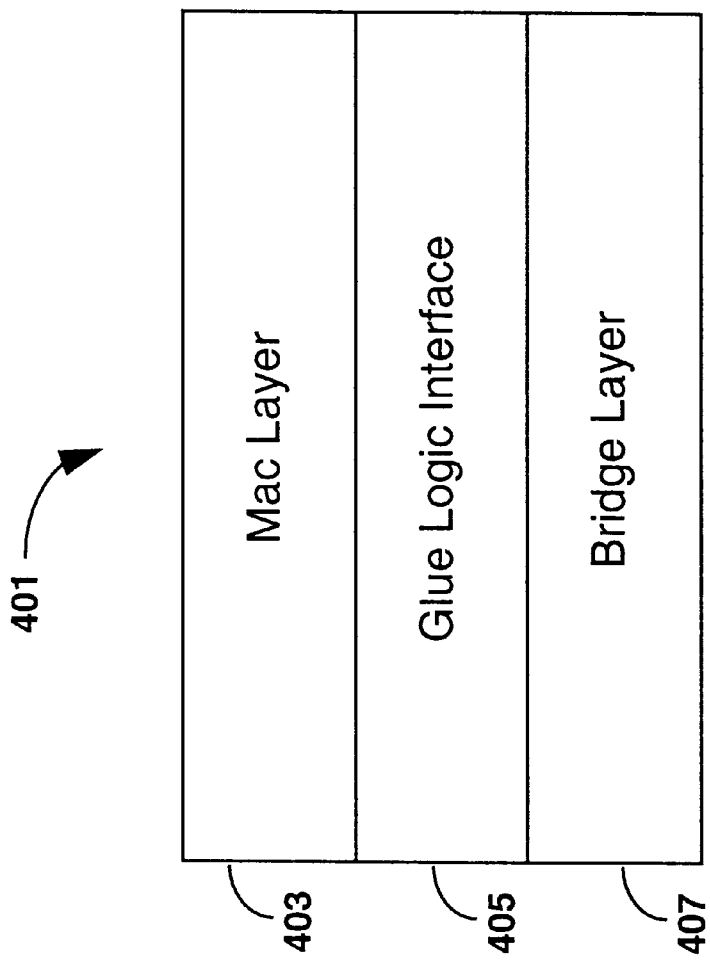
FIG. 10 is a diagram illustrating a protocol stack used in the data processing terminal of the present invention.

FIG. 10 illustrates a portion of the software protocol stack 401 that runs on one of Norand Corporation's Portable Data Collection Terminal Units, Model No. TM 1100 (See attached APPENDICES B and C). Specifically, the MAC (Medium Access Control) layer 403 is responsible for providing reliable data transmission between the terminal unit and any other node or device in a mobile computer network. When a radio module (e.g., Norand RM40 RF Module) is attached to the terminal unit and powered up, the MAC layer 403 and a Glue Logic Layer 405 are transferred to flash memory in the radio module. The Glue Logic Layer 405 controls the microprocessor in the radio module so that it is able to communicate with the high speed main microprocessor of the terminal unit. Generally, the Bridge Layer 407 organizes the nodes or terminals of the mobile computer network into an optimal spanning, routes data between any two nodes or terminals in the network, and provides data package storage to facilitate sleeping terminals. Appendix D provides an exemplary computer program listing of the software protocol stack 401 of FIG. 10 (Bridge Layer at pp. 1–33; MAC Layer at pp. 34–51; Glue Logic Layer at pp. 52–59). These protocol layers are actually subgroupings of the protocol stacks illustrated in FIGS 1B and 1C.

Figure 11:
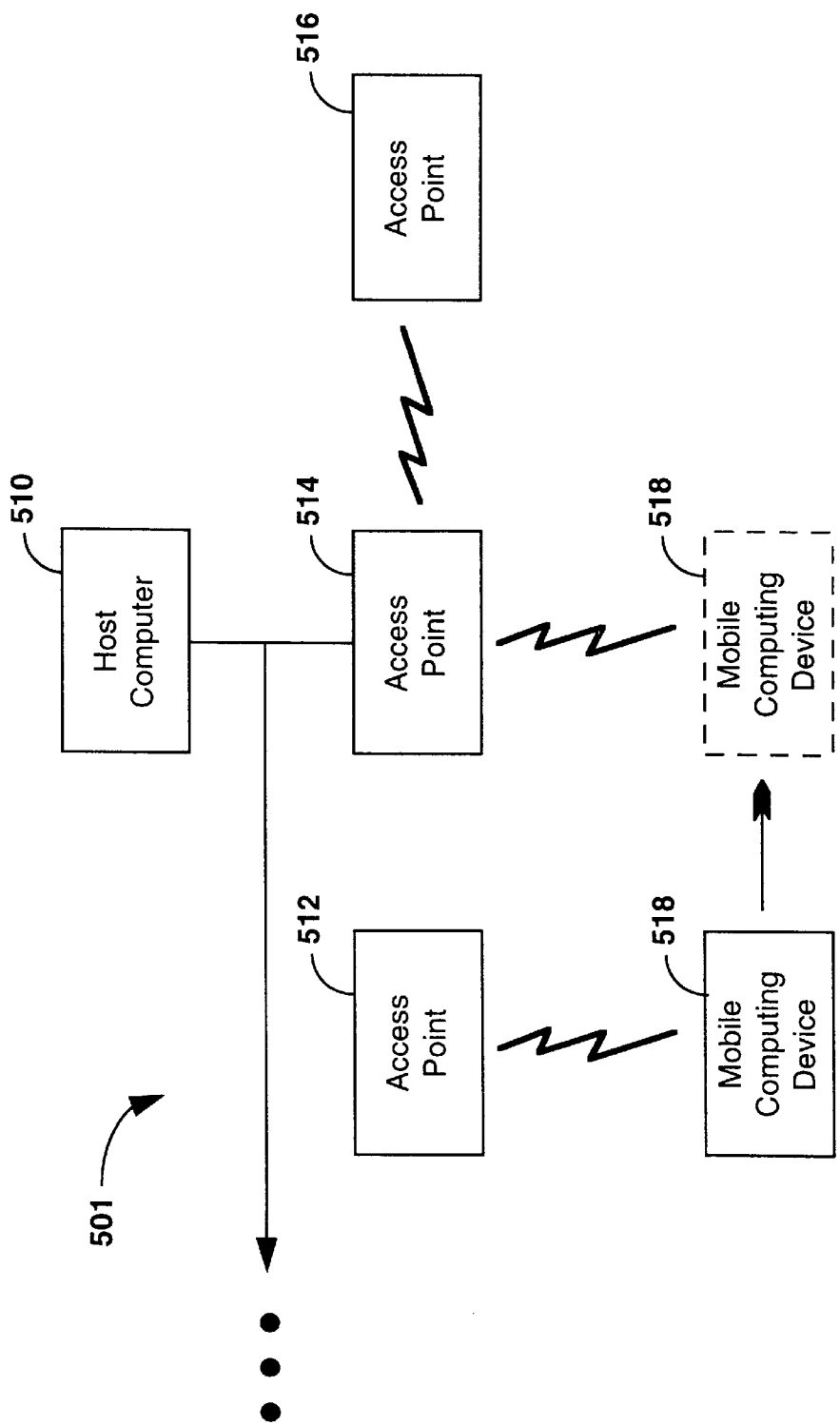
FIG. 11 is a diagram illustrating a local area communications network of the present invention.

FIG. 11 shows an exemplary local area network (LAN) illustrating the roaming characteristics of the portable data collection terminals. Specifically, the illustrated LAN consists of a host computer 510, multiple access points 512, 514, 516 and a mobile computing device (MCD) 518. The MCD 518, a portable data collection terminal, is communicatively coupled to the host computer 510 through an access point 512. Although only one MCD, MCD 518, is shown typically a plurality of MCDs would exist on the LAN. The MCD 518 communicates with the host computer 510 through the access point 512 to which it is connected.

The MCD 518 is preferably one of a plurality of MCDs (not shown) in the LAN. The MCD 518 communicates with the host computer 510 through the access point 512 to which it is connected.

In a preferred embodiment, mobile computing devices remain in a sleep mode, where their radio is powered down, except when they are actually communicating with the host computer 510 or when they periodically awaken to synchronize with an access point.

In one embodiment, the MCD 518 remains in a fixed position, and maintains a wireless RF link to the access point 512. However, in another embodiment, the MCD 518 is capable of roaming between access point coverage areas, and may disconnect the RF link with the access point 512 in favor of connection with a different access point 514.

The MCD 518 and the access point 512 communicate in a structured manner, where the MCD 518 transmits a request-for-poll (RFP), the access point 12 responds with a poll, the MCD 518 then transmits its data, and the access point 512 responds with an acknowledge (ACK) signal if the data message is finished or with another poll if there is still more data to be transmitted. One data message from the MCD 18 to the access point 512 may consist of several POLL-DATA sequences, where each DATA transmission is a fragment of the entire data message. In this context, a maximum interpoll gap time is defined as the maximum time between poll messages transmitted from the access point 512 to the MCD 518.

Figure 12:
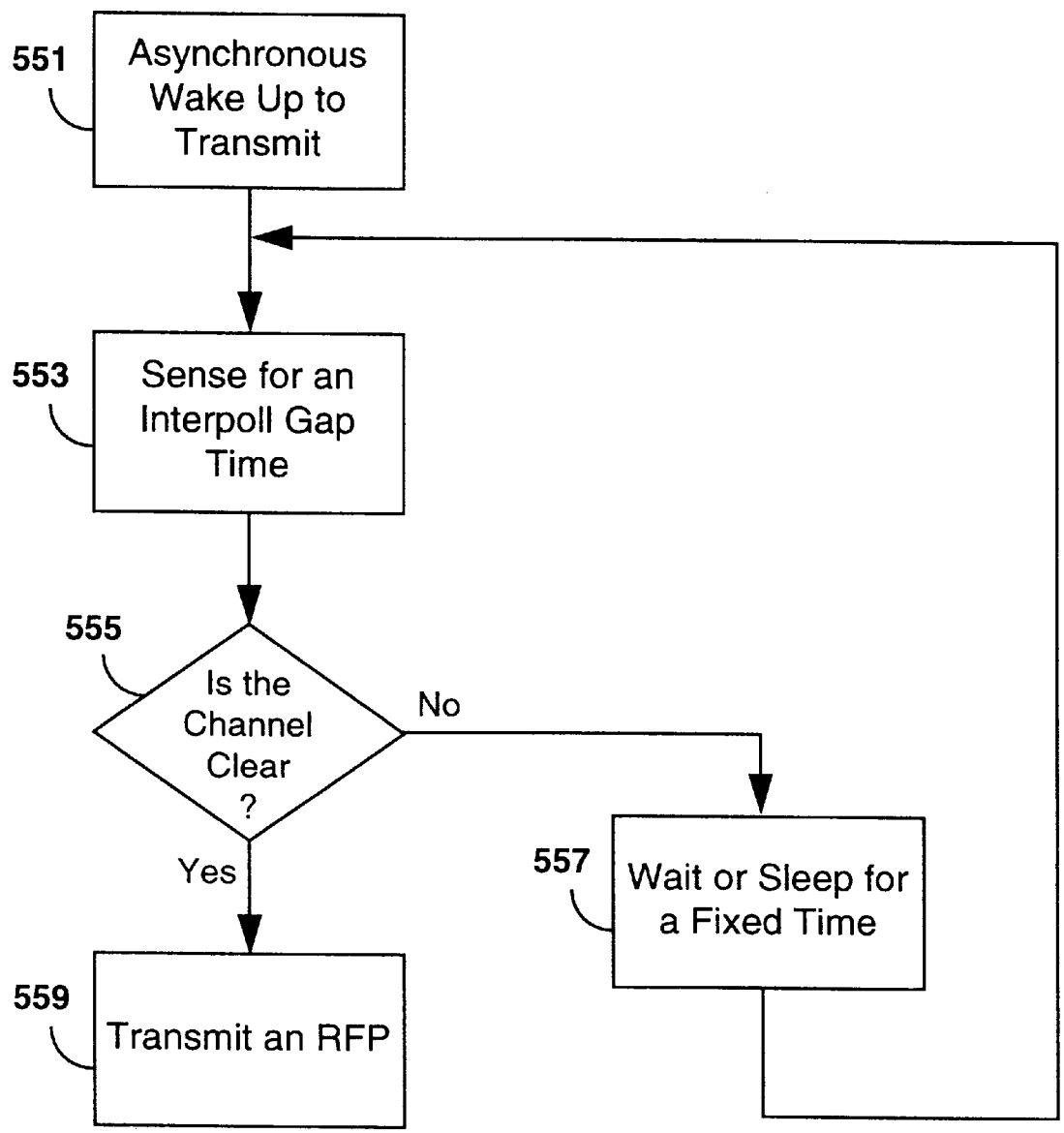
FIG. 12 is a flow diagram illustrating another protocol embodiment used by the data processing terminal of the present invention for gaining access to the channel.

FIG. 12 shows the process implemented by a mobile computing device when it has a message to transmit to the host computer. A MCD wakes up at a block 551 when it has a data message to transmit to the host computer. This wake-up can occur at any possible moment in time, i.e., a random time. After waking up, the MCD senses, at a block 553, the communications channel for a predetermined time, which is greater than or equal to the maximum interpoll gap time. In this context, a maximum interpoll gap time is defined as the maximum time between poll messages transmitted from the access point to the MCD. This assures the MCD that a transmission from the access point to another MCD will occur within the sensing time if the channel is currently being used. If, at a block 555, the channel is clear for the interpoll gap time, the MCD transmits a RFP at a block 559, and the communications sequence begins. If, at block 555, the channel is busy during the interpoll gap time, the MCD waits a fixed time period at a block 557 and senses the channel at block 553 as before.

Because the MCD wakes up at some random time to send data to the host, the probability of collision with the transmission of another MCD is extremely small. By sensing the channel for a fixed period of time and waiting for a fixed period of time to retry transmission, the random nature of transmission attempts is retained even after a busy channel is sensed. For a collision to occur in this scenario, two MCDs would have to wake up at the exact same moment in time, the probability of which is extremely small.

Figure 13:
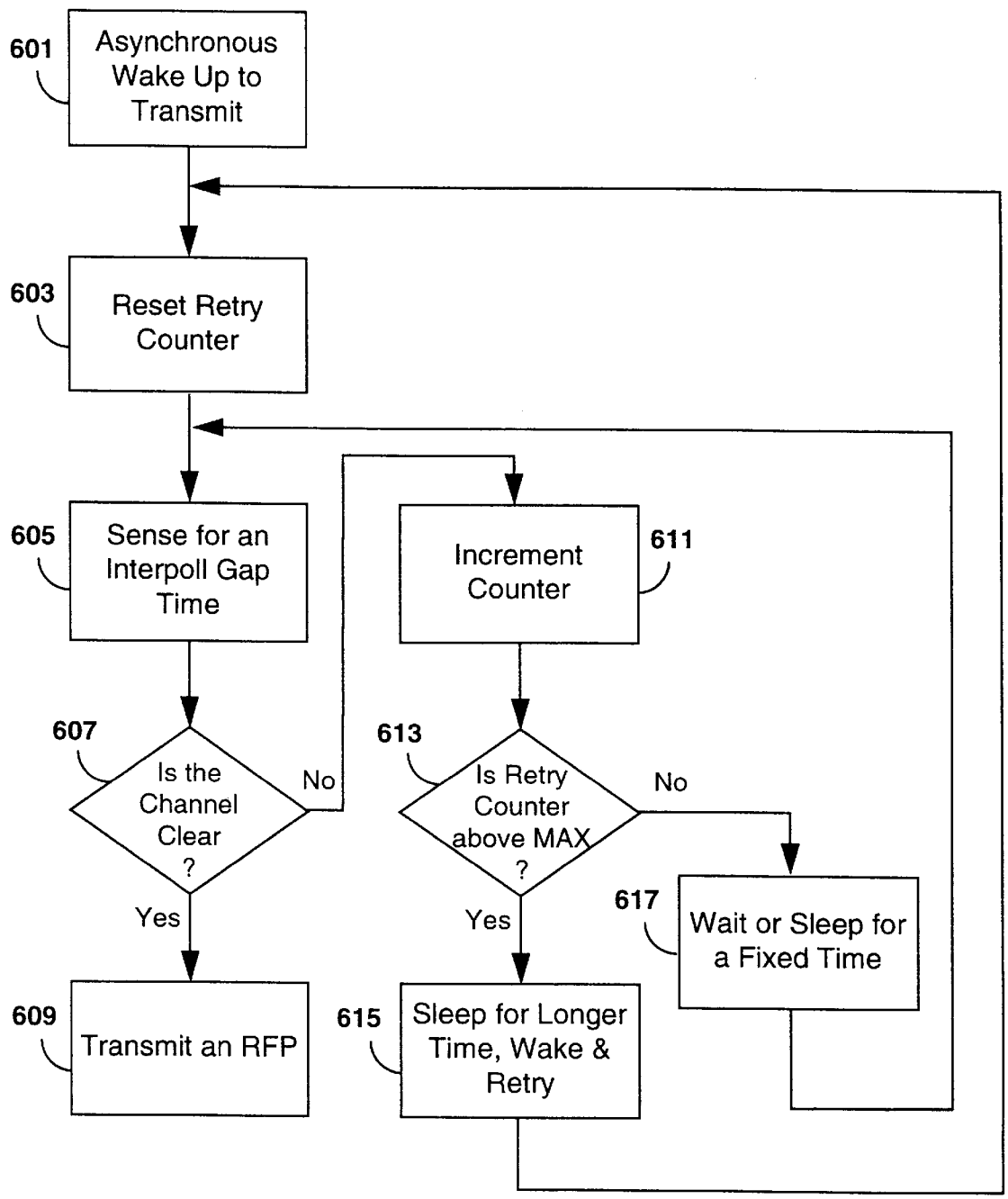
FIG. 13 is a flow diagram illustrating an alternate protocol embodiment used by the data processing terminal of the present invention for channel access which includes a retry counter.

FIG. 13 shows a process similar to that of FIG. 12, except that a retry counter implementation is used. Upon waking up to transmit at a block 601, a MCD resets a retry counter to zero at a block 603, indicating that it is the first attempt to communicate on the channel. If, at block 607, the channel is determined to be clear for the interpoll gap time, the MCD transmits an RFP at a block 609, and the communications sequence begins. Each time the channel is sensed at a block 605 and is determined to be busy at block 607, the retry counter is incremented at a block 611. Once the retry counter reaches a predetermined MAX value at a block 613, the MCD stops trying to transmit and goes back to sleep for some relatively long period of time at a block 615 before trying to transmit again. If instead, the predetermined MAX value has not been reached at the block 613, the MCD may either wait or sleep for a predetermined or fixed time before trying to access the channel again. This channel access protocol allows a terminal, an MCD, to save power if the channel is heavily loaded by sleeping until the channel may be less heavily loaded.

Figure 14:
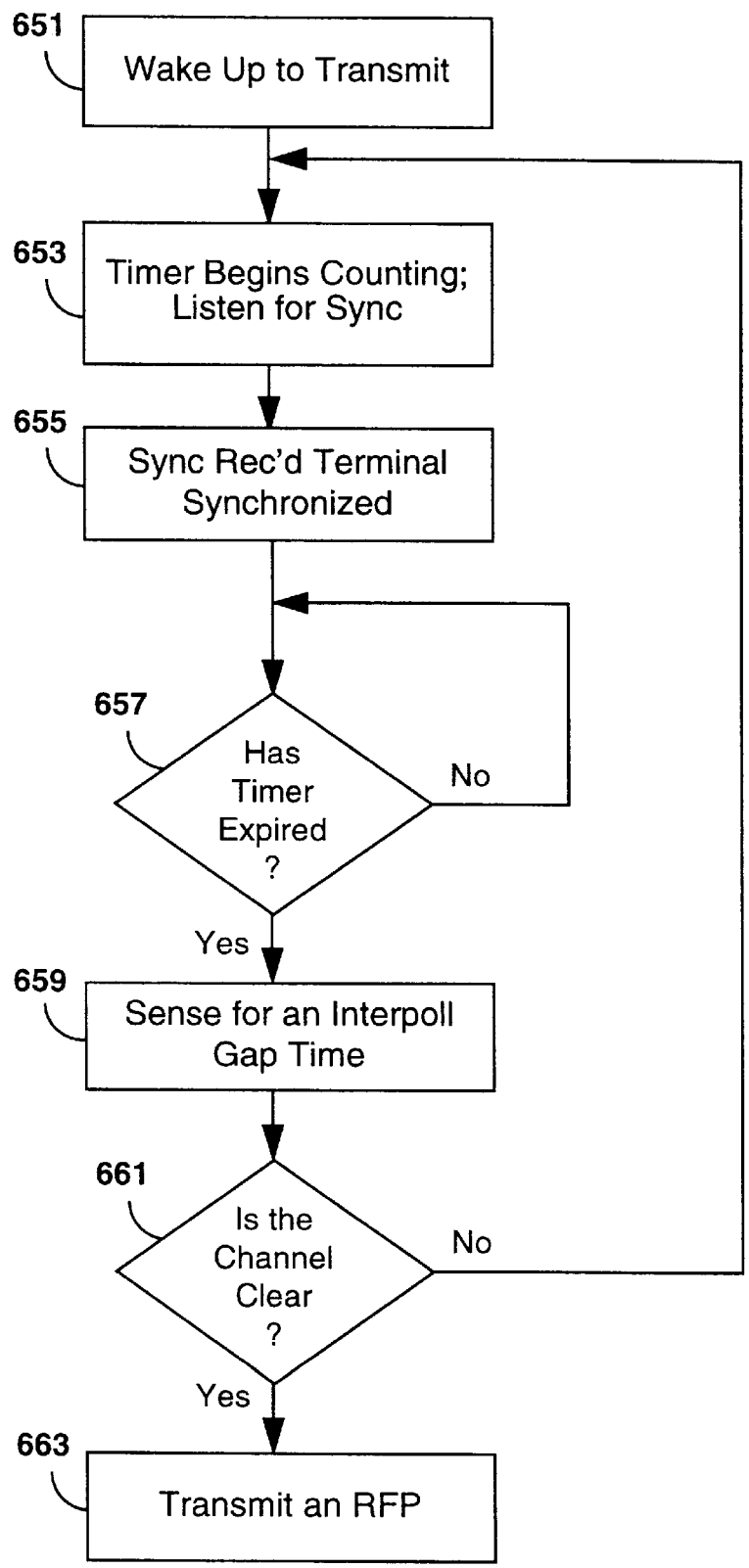
FIG. 14 is a flow diagram illustrating an alternate protocol embodiment used by the data processing terminal of the present invention for channel access which uses periodic SYNC messages in roaming implementations.

FIG. 14 shows the process implemented by a mobile computing device in a configuration where the MCD may be roaming between coverage areas and disconnecting and reconnecting with different access points (as is illustrated in FIG. 11). In this situation, access points periodically transmit SYNC messages, so that a MCD which is roaming, or has been sleeping for an extended period of time, can connect to the proper base station and synchronize its clock so that it knows when further SYNC messages will occur. In this embodiment, therefore, after waking at a block 651, the MCD listens to receive a SYNC message 653, 655 and 657 before attempting to transmit on the communications channel, since it may have awakened in the coverage area of a different access point. Thus, the amount of time, at a block 657, between wakeup and channel sensing or between a busy channel sense and a further channel sense should be greater than or equal to the time between SYNC messages minus the maximum interpoll gap time. This assures that a SYNC message will be received each time before the MCD attempts to sense the channel and transmit. In addition, after receiving a sync signal, the MCD listens for an interpoll gap time 659 to determine if the channel is clear, at blocks 659 and 661. If clear, the MCD transmits an RFP at a block 663.

Figure 15:
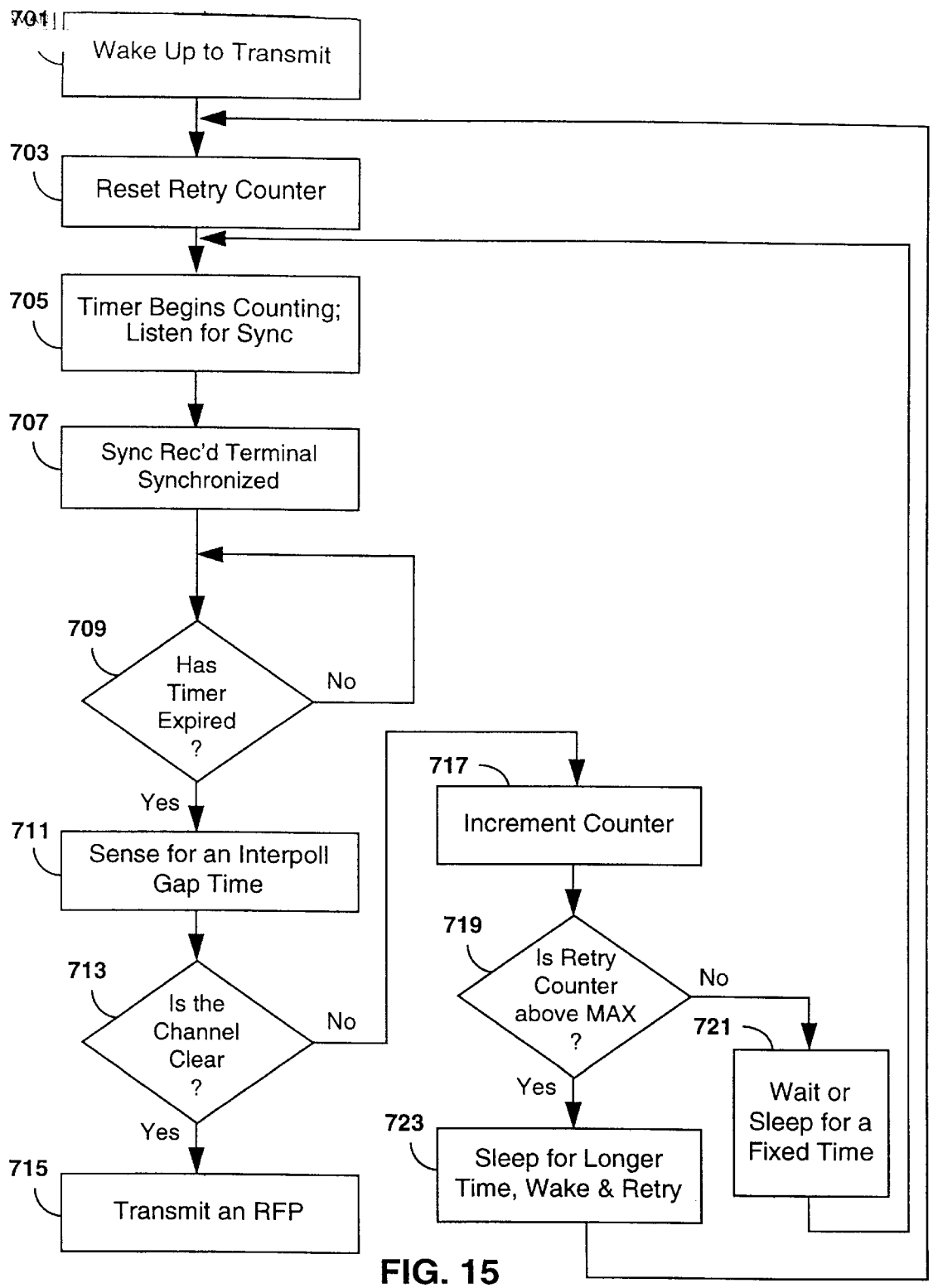
FIG. 15 is a flow diagram illustrating another protocol embodiment used by the data processing terminal of the present invention for channel access which includes both periodic SYNC messages and a retry counter.

FIG. 15 shows a process similar to that of FIG. 14, except that a retry counter implementation is used to control the number of retry counter implementation is used to control the number of retry attempts. Upon waking up to transmit at a block 701, a MCD resets a retry counter to zero at a block 703, indicating that it is the first attempt to communicate on the channel. Each time the channel is sensed and is determined to be busy, the retry counter is incremented at a block 717. Once the retry counter reaches a predetermined MAX value at a block 719, the MCD stops trying to transmit and goes back to sleep at a block 723, for some relatively long period of time before trying to transmit again. This procedure allows a terminal to save power if the channel is heavily loaded by sleeping until the channel may be less heavily loaded. In addition, if the channel is busy but the retry counter has not reached the MAX value, the MCD may either sleep or wait for a fixed period of time at a block 721. Although a fixed period of time is desirable, a random or pseudo-random back-off might also be used.

Figure 16:
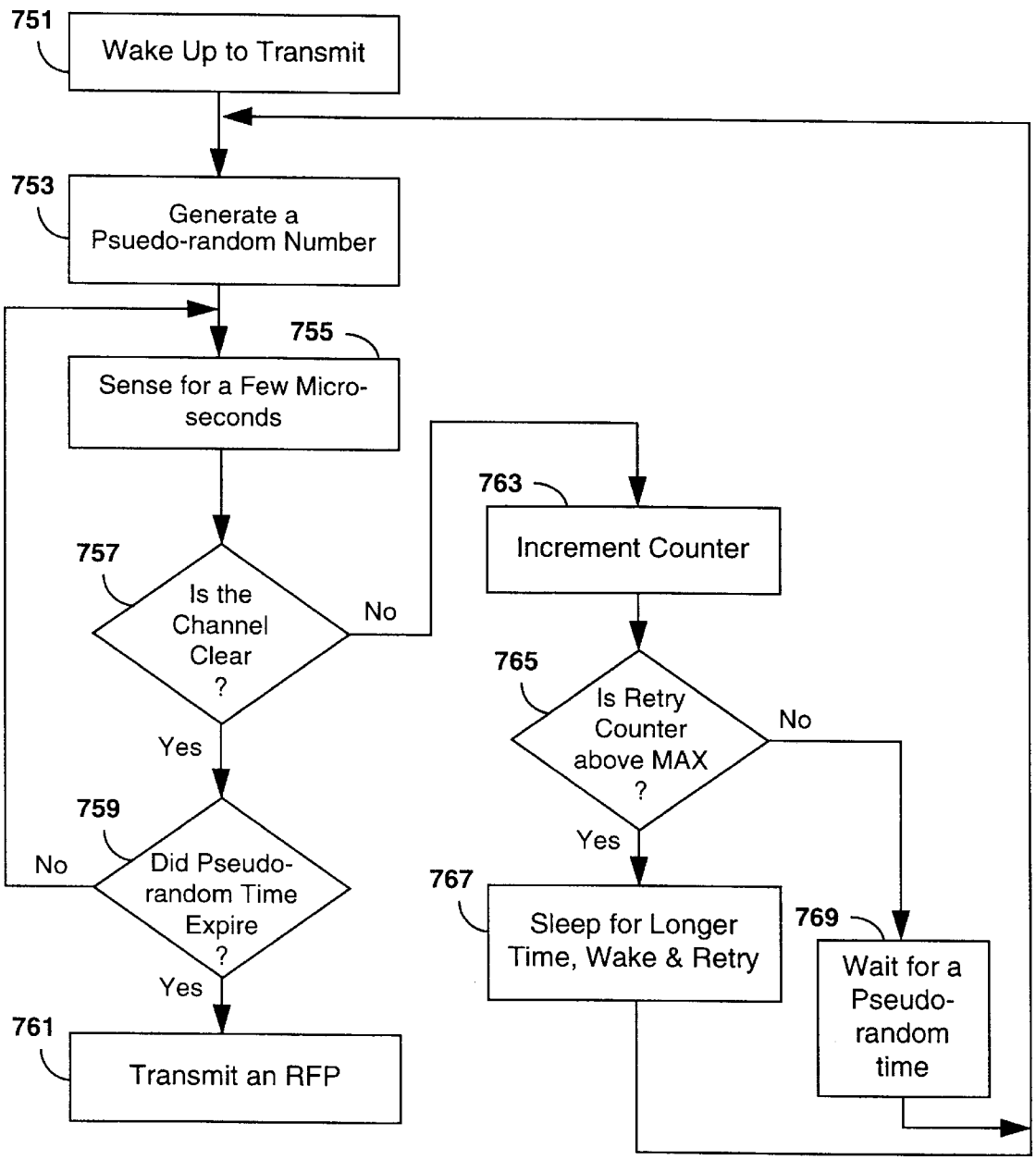
FIG. 16 is a flow diagram illustrating a channel access protocol using a pseudo-random number generator according to another embodiment of the present invention.

FIG. 16 is a flow diagram illustrating a channel access protocol using a pseudo-random number generator according to another embodiment of the present invention. Upon waking up to transmit at a block 751, a MCD generates a pseudo-random number (e.g., 5–8 microseconds) at a block 753. The MCD then senses the communication channel for a few microseconds at a block 755. If the channel is determined to be clear at a block 757, the MCD determines whether the pseudo-random time period has expired at a block 757. If it has expired, the MCD transmits an RFP at a block 761, and the communications sequence begins. If the pseudo-random time period has not expired, the MCD again senses the communication channel for a few microseconds determined at a block 755 to determine if the channel is clear at block 757, i.e., repeating the above.

If the channel is determined to be busy at block 757, the MCD increments a retry counter at a block 763. If the retry counter has not reached a predetermined maximum value at a block 765, the MCD waits for a pseudo-random time (e.g., 10 milliseconds) at a block 769 and then generates another pseudo-random number at block 753 and repeats the above procedure. Once the retry counter reaches the predetermined maximum value, at block 765, the MCD quits trying to transmit and goes to sleep for a longer period of time at a block 767, before awakening against at block 751 to retry the transmission.

Figure 17:
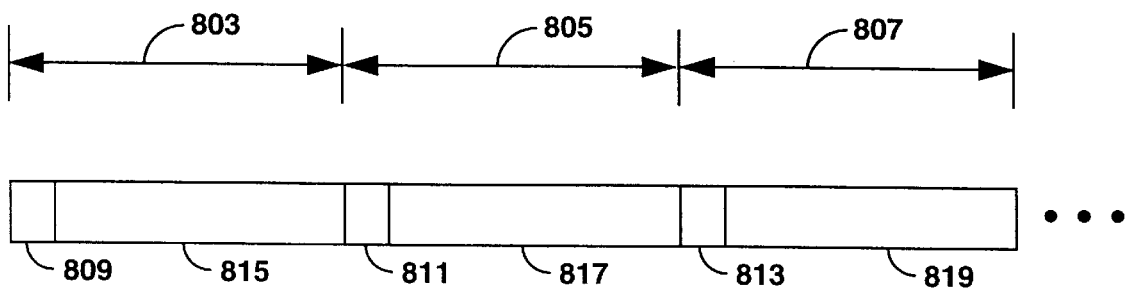
FIG. 17 is a diagram of the basic communication structure used in the channel access protocol of the present invention.

FIG. 17 shows the basic communication structure in one embodiment of the present invention. Access points periodically transmit a series of SYNC messages 809–813, while allowing time for communication exchanges during the periods 815–819 between SYNC messages. In general, the SYNC message itself takes much less time than the amount of time allocated for communication between SYNC messages. The time allocated for a SYNC message and for subsequent terminal communication (i.e., until another SYNC message is transmitted) is depicted by periods 803–807.

Figure 18:
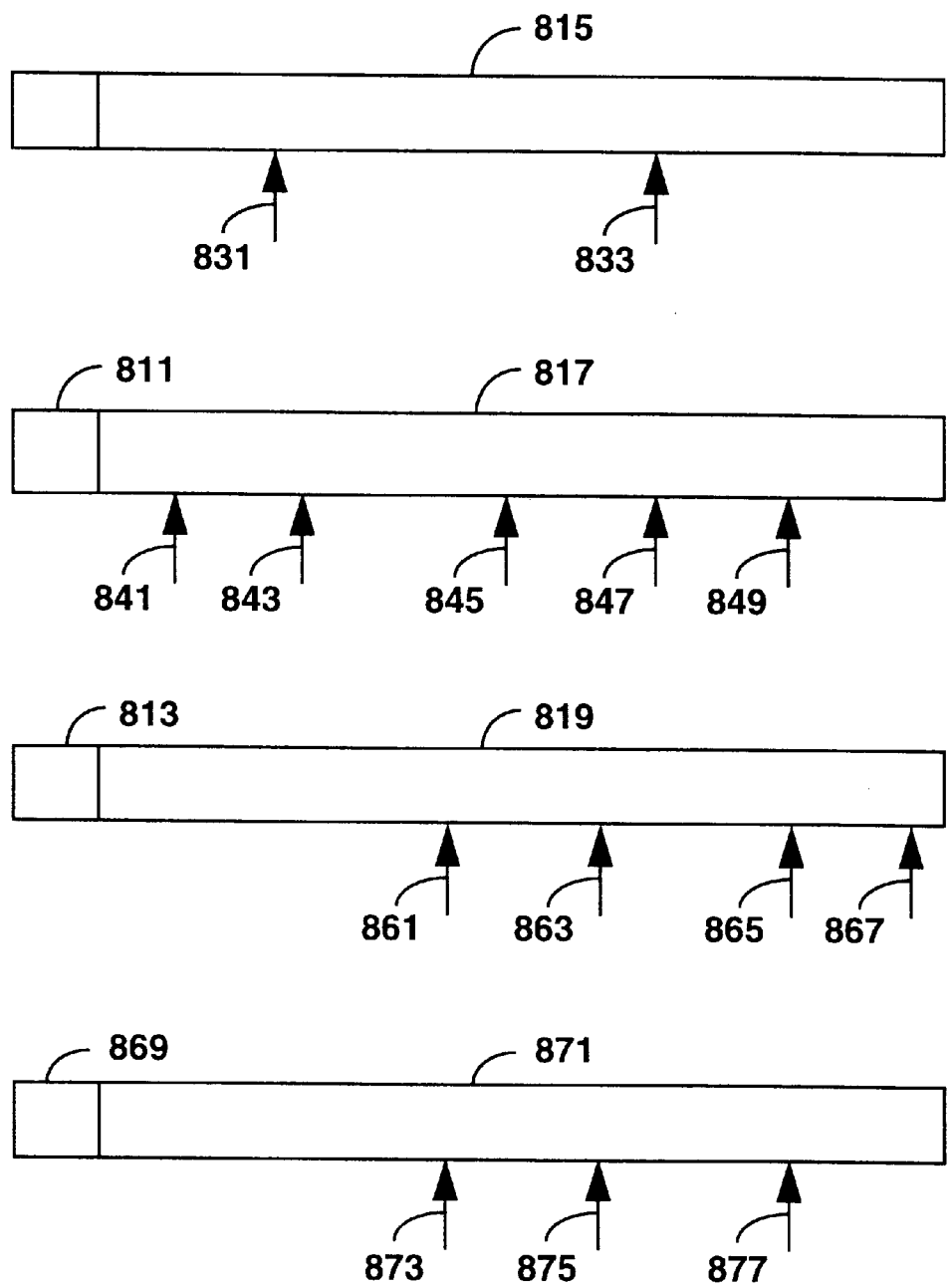
FIG. 18 is a diagram illustrating an exemplary communication sequence according to the channel access protocol of the present invention.

FIG. 18 shows a series of exemplary communication exchanges and channel access attempts where three MCDs are attempting to communicate in the same general time frame. The three units attempting to communicate are referred to as unit 1, unit 2, and unit 3. Unit 1 wakes up first at 831, in the first time interval 815. It must wait until it receives a SYNC message at 811, so it cannot attempt to transmit in time interval 815. Unit 2 is the next to wake up at 833, also in time interval 815. As with unit 1, unit 2 cannot transmit until a SYNC 811 is received, and therefore cannot transmit in time interval 815.

After the timer set by unit 1 when it initially woke up expires, SYNC message 811 has been received by unit 1. Thus, unit 1 can listen to the communications channel at 841 for the maximum interpoll gap time, determine a clear channel, and begin its communications sequence at 843, all in this time interval 817. The timer initially set by unit 2 also expires during time interval 817, and unit 2 has therefore received the SYNC message 811 and senses the communications channel at 847. However, unit 1 has not yet finished its transmission when unit 2 senses the channel for the maximum interpoll gap time. Thus, unit 2 must defer transmission, and waits until time interval 819 to retry communication.

Meanwhile, also in time interval 817, unit 3 initially wakes up to transmit at 845. Unit 3 must wait for a SYNC before attempting to transmit, so it does not transmit in the time interval 817.

In time interval 819, after the SYNC message 813, unit 2 and unit 3 have both received a SYNC message and can sense the channel to attempt transmission. In this case, unit 3 listens to the channel at 861 slightly before unit 2 senses the channel at 863, such that the channel is not busy when unit 2 begins to sense the channel. However, after unit 3 has sensed the channel for the maximum interpoll gap time, it begins communication on the channel at 865. Unit 2 finishes listening to the channel, also for the maximum interpoll gap time, after unit 3 has begun its communication, so unit 2 must defer communication. Finally, after SYNC message 869 in time interval 871, unit 2 senses an idle channel at 873 and transmits its communication to the access point at 875. Unit 2 ends its transmission at 877. This sequence illustrates the interpoll gap time channel sense and the wait to transmit until after a SYNC message has been received.

The operation of the protocol of the present invention takes advantage of the inherently random wake-up time of a mobile computing device in a local area communications network. Rather than performing a random back-off routine, the time of wake-up is used to ensure random communications attempts, thereby preventing collisions due to many terminals attempting to transmit immediately after a certain common event. This is done by preserving the random wake-up time, adding a fixed amount of time to the time of wake-up in back-off procedures. The protocol of the present invention eliminates the need for random number generation and the implementation of random back-off algorithms.

Figure 19:
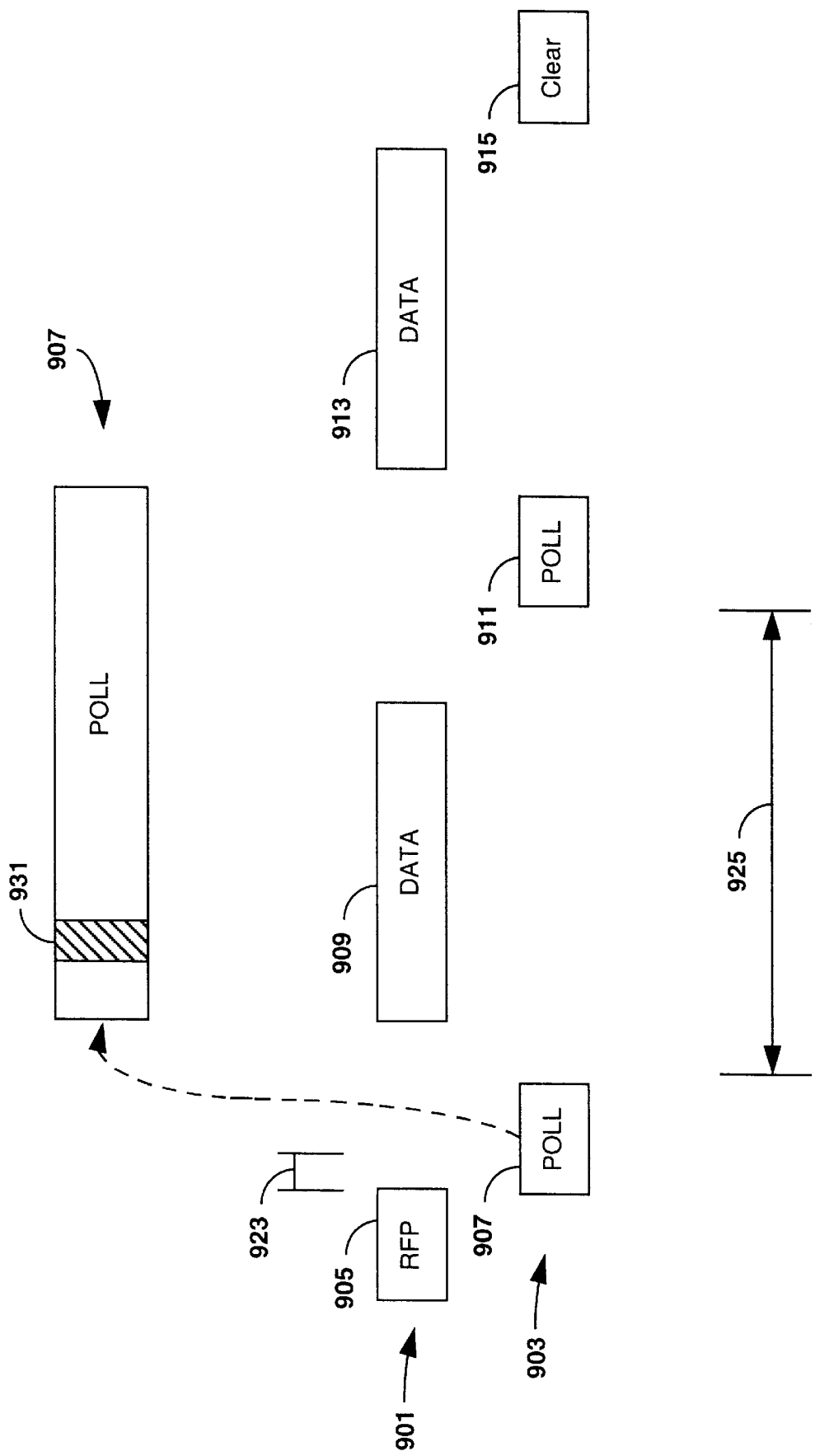
FIG. 19 is a diagram showing an exemplary communication exchange and illustrating channel access using a channel reservation scheme.

FIG. 19 is a timing graph illustrating an exemplary communication exchange between a portable data terminal 901 and an access point 903. Upon determining that the channel is clear, the portable data terminal 901 begins by transmitting an RFP (request for poll) frame 905. After an interframe gap time 923, the access point 903 responds with a POLL frame 907 to indicate to the portable data terminal 901 that it is available to receive data. The portable data terminal 901 then sends a DATA frame 909. The access point 903 acknowledges receipt of DATA frame 909 with a POLL frame 911. The portable data terminal 901 then transmits DATA frame 913 which indicates that data transmission is complete. The access point 915 then transmits a CLEAR frame 915 to acknowledge receipt.

A channel reservation scheme is used to generally restrict channel access contention to RFP frames. Each frame transmitted during the communication exchange contains a channel reservation field (e.g., field 931 in POLL 907) which may indicate either the number of outstanding frames or the amount of time required to transmit the outstanding frames.

This scheme enables other terminals attempting to access the busy channel to determine the actual amount of time during which they may sleep. Sleeping, i.e., or powering-down the radio for the duration of the channel reservation period (i.e., until the channel becomes clear) conserves battery power and aids in collision avoidance. Further, channel reservation may be implemented with the other channel access embodiments discussed above during heavy communication traffic. In other words, channel reservation may supplement other channel access protocols when terminals using those protocols are continuously failing to gain access to the channel.

Figure 20:
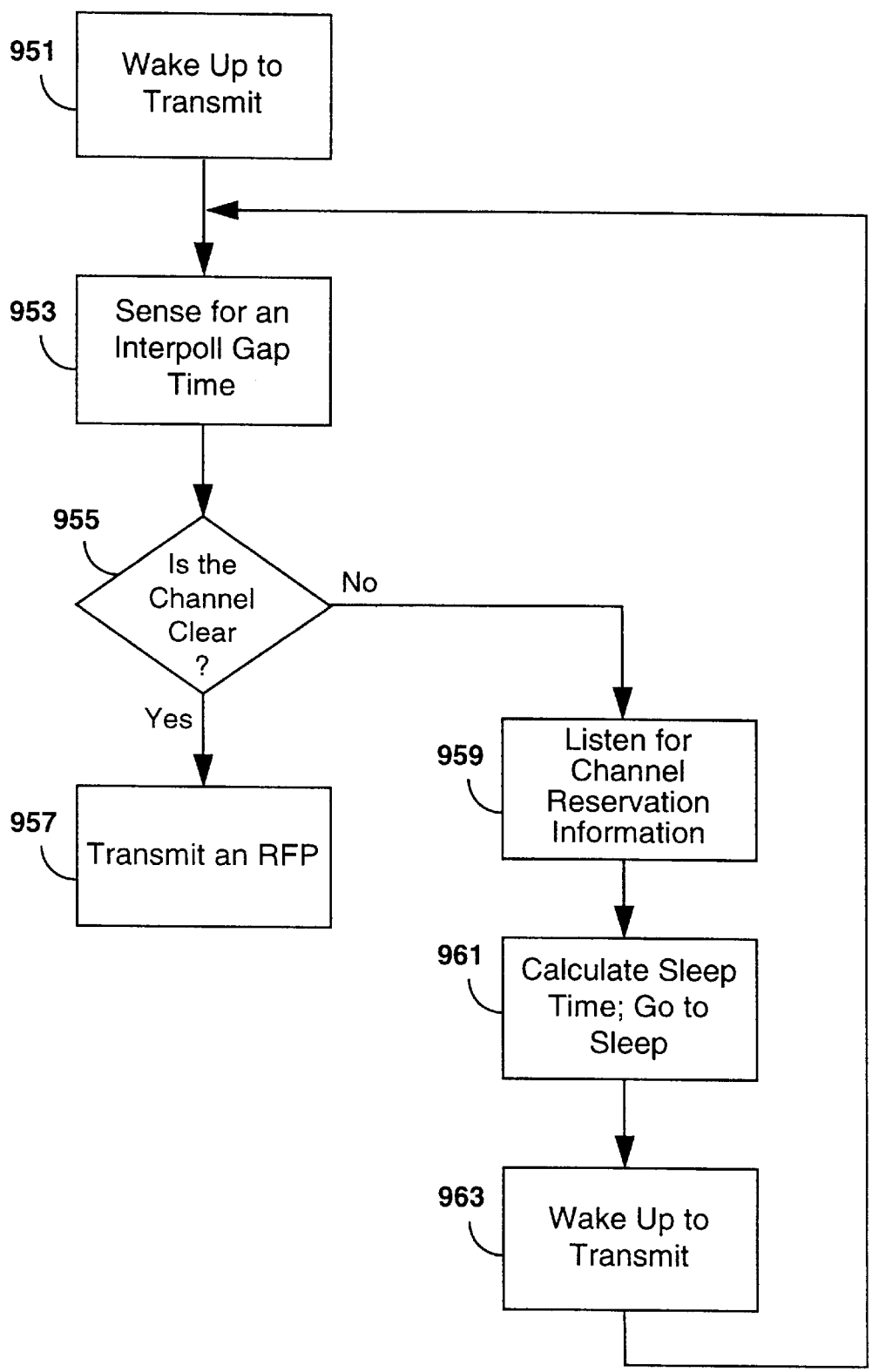
FIG. 20 is a flow diagram illustrating channel access using the channel reservation scheme of FIG. 19.

FIG. 20 is a flow diagram illustrating an embodiment of the channel access reservation scheme described above. A portable data terminal (or mobile computer device ("MCD") wakes up to transmit data at a block 951. It then senses the channel for an interpoll gap time at a block 953 before determining if the channel is clear at a block 955. If the channel is clear, the portable data terminal transmits an RFP and the communication sequence begins (e.g., that shown in FIG. 19). If the channel is busy, the portable data terminal listens for the channel reservation information on the channel at a block 959, and calculates the time that it should "sleep" and powers down at a block 961. At the end of the calculated sleep period, the portable data terminal wakes up to transmit at a block 963 and repeats the process by sensing the channel for an interpoll gap time at block 953.

Figure 21:
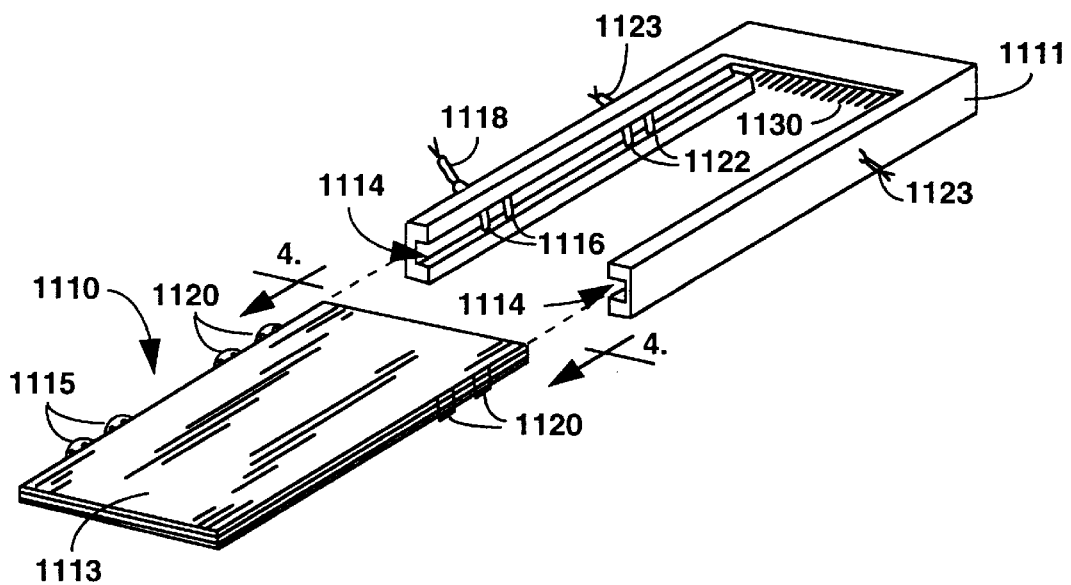
FIG. 21 is a perspective view of a radio card and a corresponding port for receiving the radio card in accordance with the present invention.

FIG. 21 shows a radio card 1110 and a receiving device 1111 built in accordance with the present invention. The radio card 10 has a housing 1113 inside which is a completely operation radio transceiver not shown. The receiving device 1111 in this embodiment of the present invention uses a pair of opposed slots 1114 to receive and guide the incoming radio card 1110.

Figure 22:
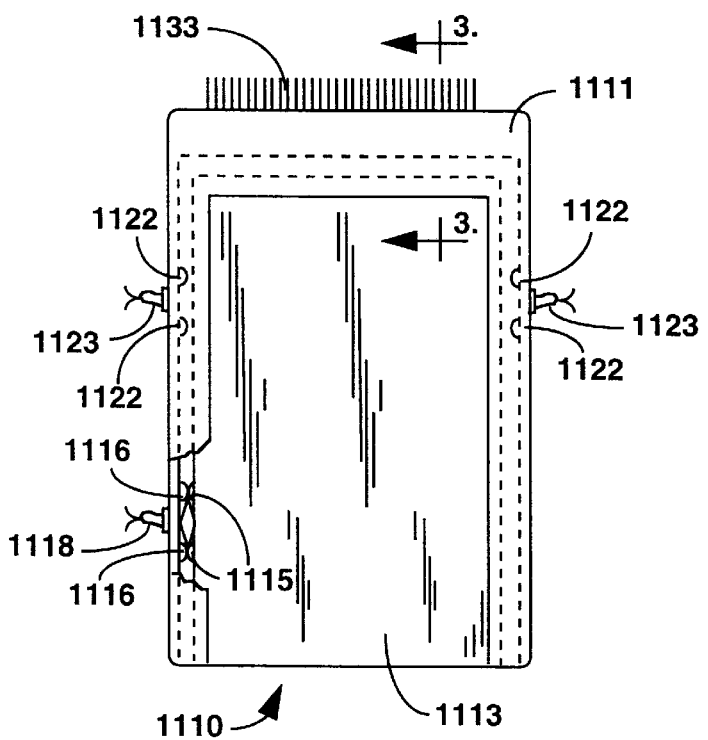
FIG. 22 is a partial top plan view of a radio card and port for receiving the radio card with the radio card completely inserted in the port.

The radio card 1110 has a pair of antenna contacts 1115 positioned along the edge of the housing 1113. The receiving device 11 has a corresponding pair of antenna contacts 1116. As can be seen in FIG. 22, when the radio card 10 is inserted into the receiving device 1111 the antenna contacts 1115 on the radio card housing 1113 electrically encounter the corresponding set of antenna contacts 1116 positioned on the receiving device 1111. The antenna contacts 1116 on the receiving device 1111 are connected to an antenna cable 1118. The antenna cable 1118 is in turn connected to an antenna not shown. Thus, when the radio card 1110 is completely inserted into the receiving device 1111 the radio card 1110 automatically is connected to an antenna.

Referring again to FIG. 21, a radio card 1110 may have antenna contacts 20, shown in dashed lines, located at different positions on the housing 1113. Similarly, the receiving device 1111 may have several additional pairs of antenna contacts 22. In other embodiments, the card 1110 and receiving device 1111 may have contacts to a modem or other wired hookup, or to an infrared antenna. The additional pairs of antenna contacts 22 on the receiving device 1113 can be used to allow access to several different antennas depending on the type and frequency of radio communication to be utilized by the radio card 1110. This access is accomplished through additional antenna cables 1123 attached to the additional contacts 1122. Thus, if the receiving device 1113 is part of a hand held computer terminal which has more than one antenna attached or built in, different pairs of contacts 1116 & 1122 can be used to allow access by the radio card to the different antennas depending upon the frequency and range characteristics of each antenna. While a radio card 1110 may only operate at one frequency and thereby only need one antenna and therefore only have one pair of antenna contacts, the receiving device 1111 still may have several pairs of antenna contacts 1116 & 1122 all but one of which do not correspond to any pair of radio card 1110 antenna contacts 1115. In other embodiments, the card 1110 may operate multiple transceivers interchangeably or even simultaneously, allowing the receiving device 1113 to communicate on two or more mediums at the same time. For example, the card 1110 could implement radio frequency communication through an antenna and wired communication through a hookup to an RS232 port or an Ethernet port. Many other combinations of transceiver operation are possible and contemplated by the present invention.

Figure 23:
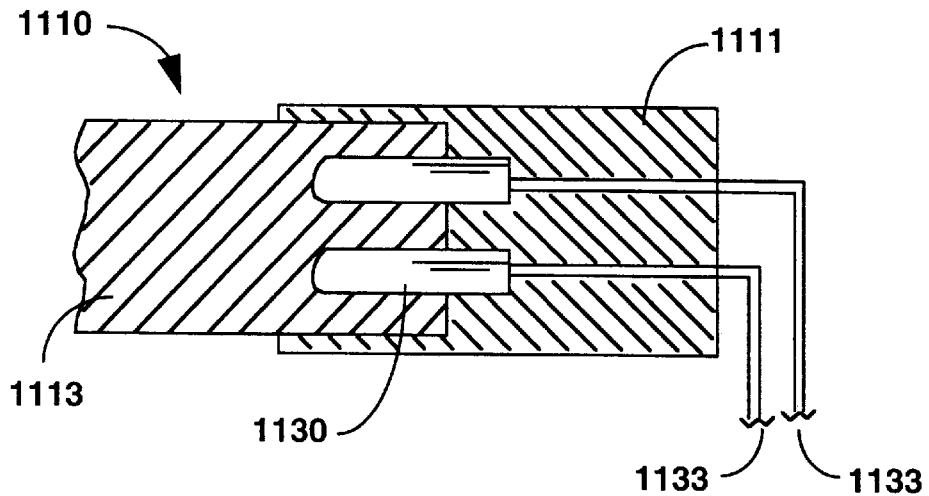
FIG. 23 is a partial side elevational view taken along line 3—3 in FIG. 22 showing the pin connection of the radio card and the port of FIG. 22.
Figure 24:
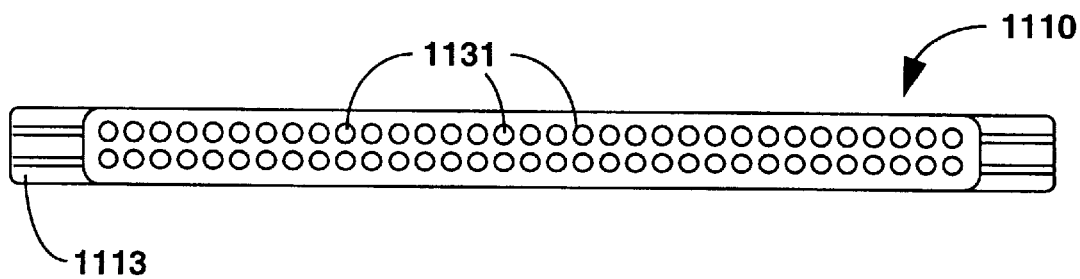
FIG. 24 is a front view taken along line 4—4 of FIG. 21 showing the pin connections of the radio card of FIG. 21.

Referring to FIGS. 23 and 24, when the radio card 10 is inserted into the receiving device 1111 an interface between the radio card 1110 and the receiving device 1111 is produced. The receiving device 1111 has a plurality of pins 1130 which form the male portion of a connector. The radio card 1110 has a corresponding plurality of holes 1131 which form the female portion of the connector and which engage the pins 1130. The pins 1130 are connected to the computer terminal not shown by a series of electrical connections 1133 such as wires or electrical ribbon. The holes 1131 in the radio card 1110 are electrically connected to the radio. When the pins 1130 are engaged in the holes 1131, electrical signals can be exchanged between the radio card 1110 and the computer terminal. The electrical signals can be in the form of information exchange, power supply or both.

The radio card 1110 of FIGS. 21–24 might also be a modem card not shown. In this embodiment, the connections would be the same as previously described with the only difference being that instead of the contacts connecting the modem card to a radio antenna, the modem card would be connected to a traditional telephone line, a cellular phone or an antenna for a cellular phone if the cellular phone was built within the modem card.

Figure 25:
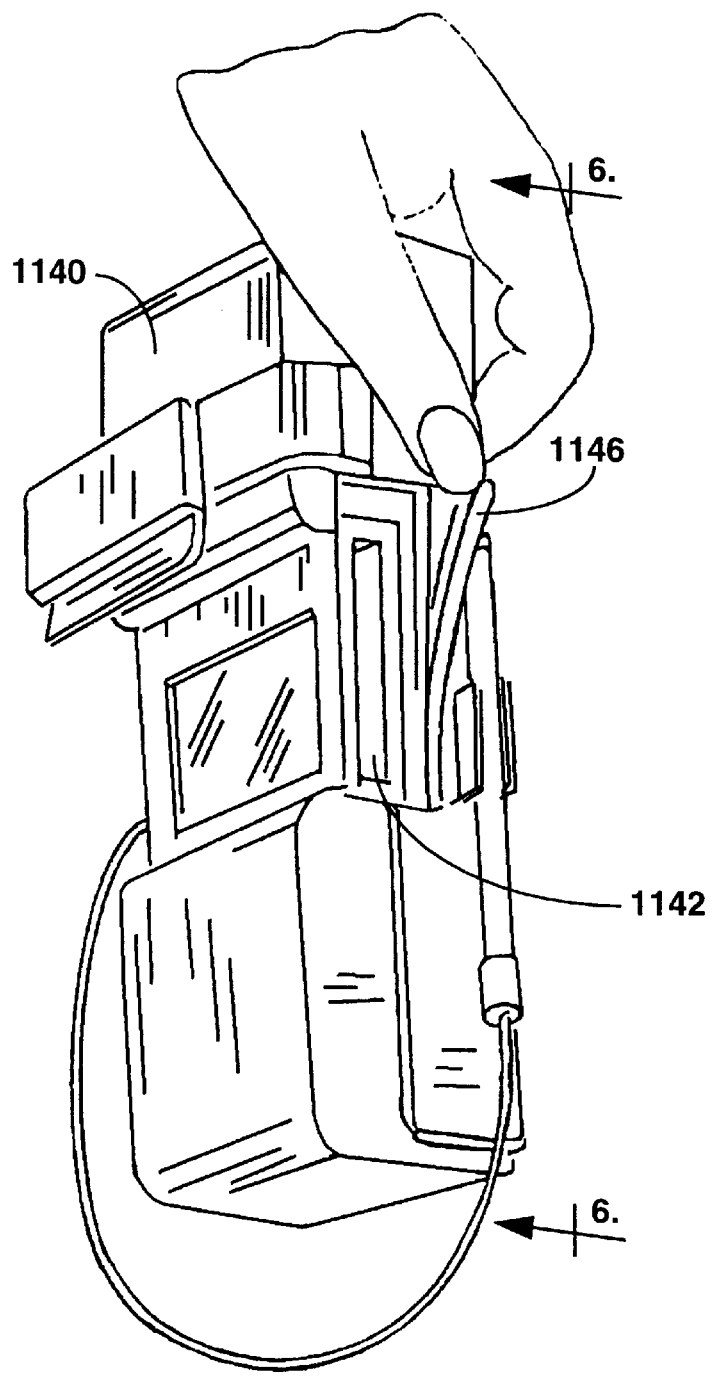
FIG. 25 is a perspective view of computer terminal showing the slot for receiving the radio card.
Figure 26:
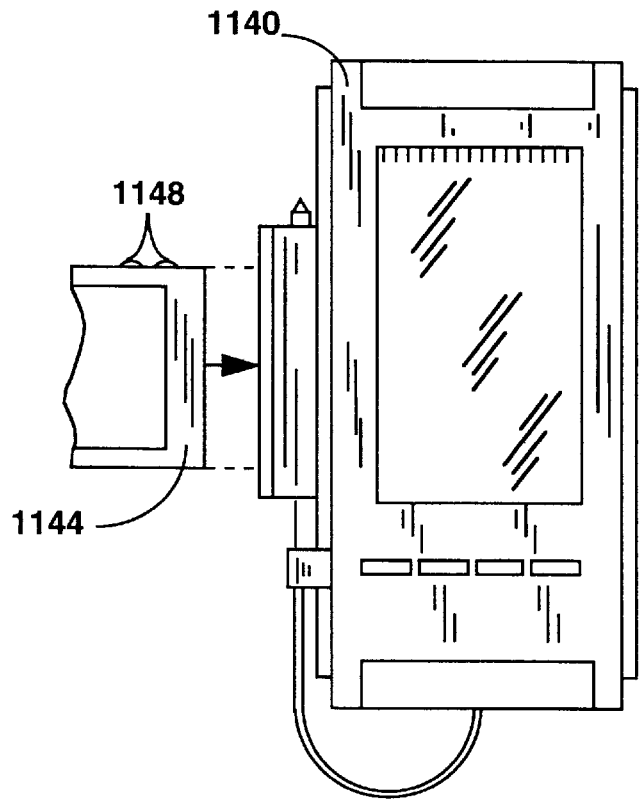
FIG. 26 is front view taken along line 6—6 in FIG. 25 showing the insertion of a radio card into the slot of the computer terminal of FIG. 25.

Referring to FIGS. 25 and 26, a computer terminal 1140 is shown built in accordance with the present invention. The computer terminal 1140 has a slot 1142 for receiving a radio card 1144. The user of the computer terminal 1140 lifts up a flexible cover 1146 and inserts the radio card 1144 into the slot 1142. The radio card 1144 engages with the computer terminal 1140 in a similar manner as described in FIGS. 21–24. The radio card 1144 as a pair of antenna contacts 1148 which will engage with a corresponding pair of contacts inside the computer terminal 1140. The pair of antenna contacts inside the computer terminal are connected to a radio antenna not shown.

Figure 27:
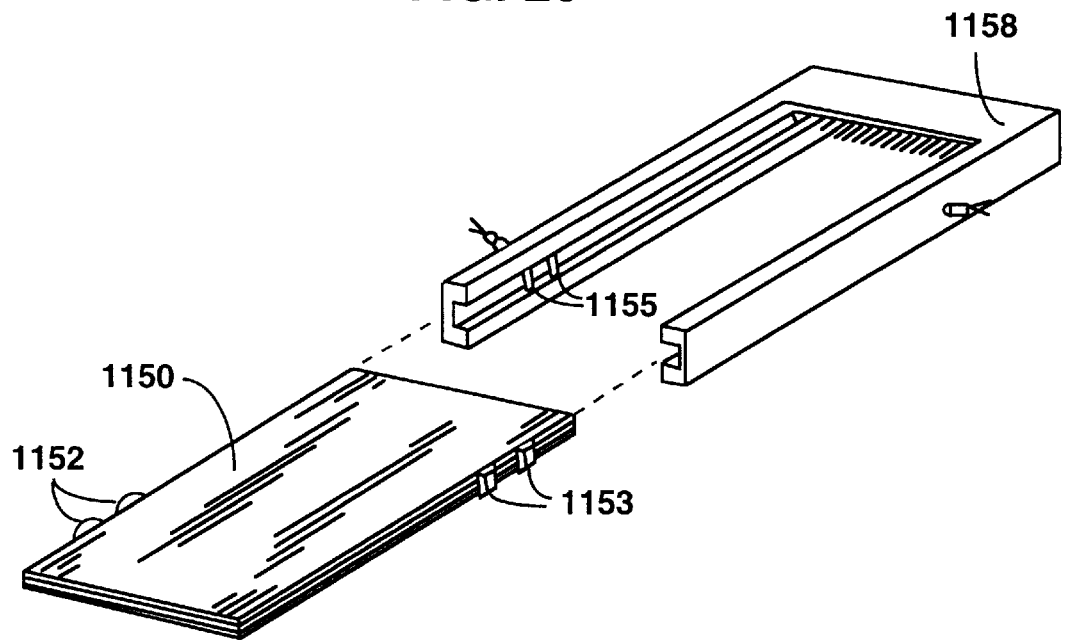
FIG. 27 is a perspective view of another radio card and a corresponding port for receiving the radio card in accordance with the present invention.
Figure 28:
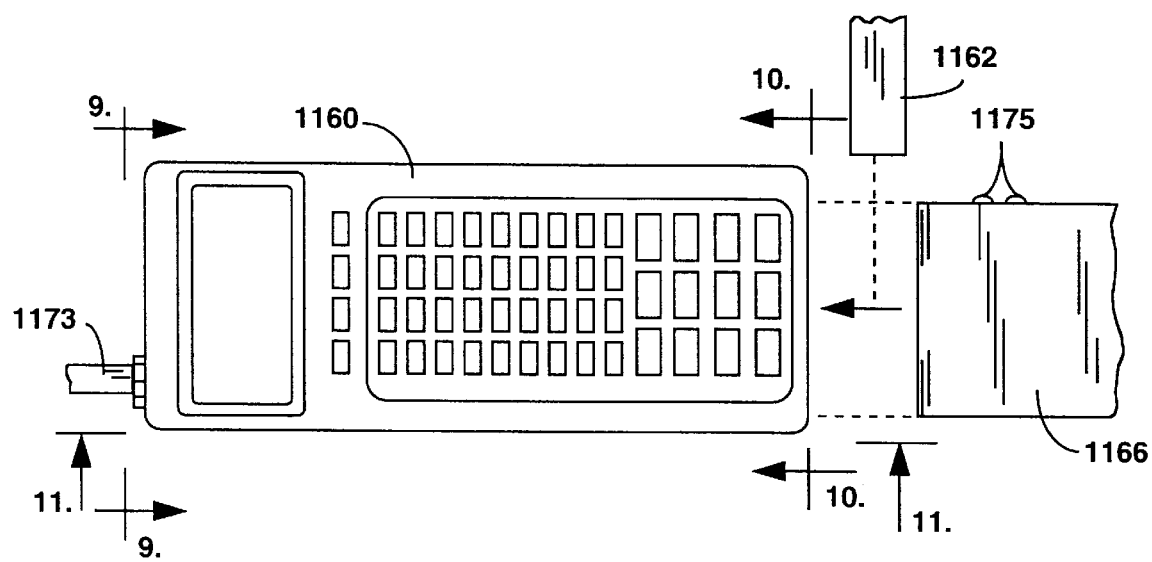
FIG. 28 is a front view of another computer terminal and end cap capable of receiving a radio card.
Figure 29:
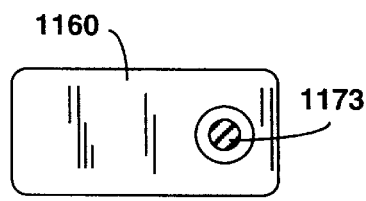
FIG. 29 is a top view taken along line 9—9 in FIG. 28 of the computer terminal of FIG. 28.
Figure 30:
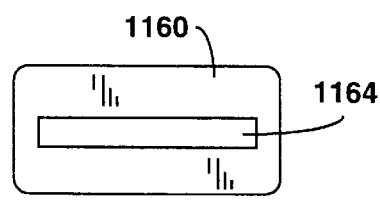
FIG. 30 is a bottom view taken along line 10—10 in FIG. 28 of the computer terminal of FIG. 28 with the end cap removed.
Figure 31:
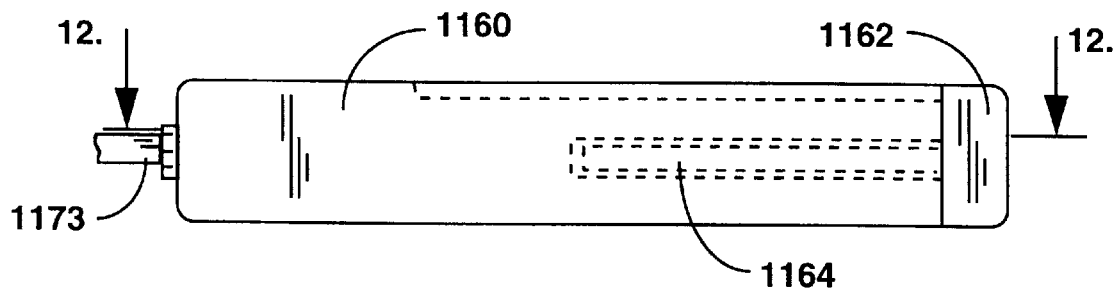
FIG. 31 is a side elevation view taken along line 11—11 in FIG. 28 of the computer terminal of FIG. 28 with the slot for the radio card shown in dashed lines.
Figure 32:
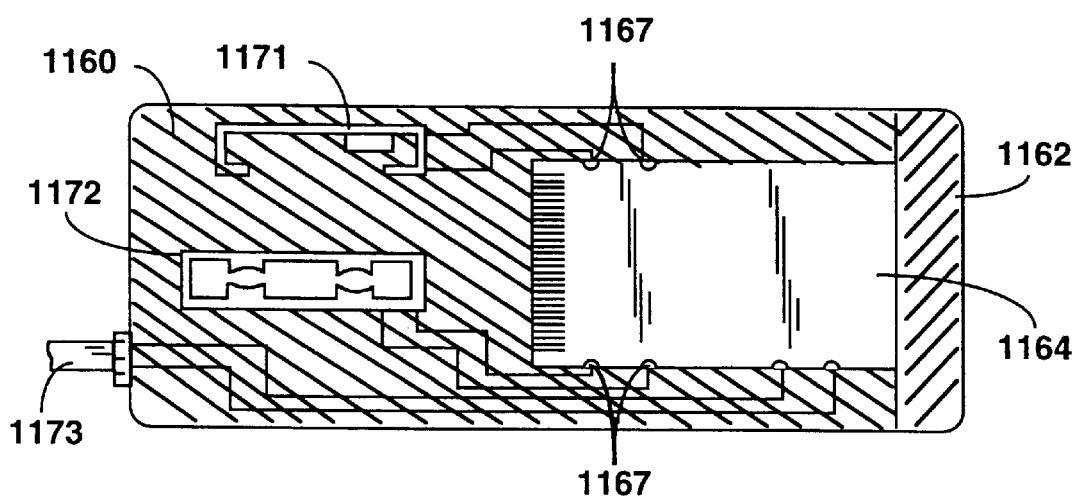
FIG. 32 is a partial top view taken along line 12—12 in FIG. 31 of the computer terminal of FIG. 31 showing the slot for receiving the radio card and the antennas.

Referring to FIG. 27, another embodiment of the present invention is shown. The radio card 1150 has two pairs of antenna contacts 1152 & 1153 which will encounter respectively two pair of antenna contacts 1155 & not shown on the receiving device 1158. This embodiment accommodates a radio card 50 which can operate at two different frequencies which require two different antennas. Standardization of antenna contact position with antenna type is anticipated and covered by the present invention.

Referring to FIGS. 28–32, another embodiment of a computer terminal 1160 built in accordance with the present invention is shown. The computer terminal 1160 has a removable end cap 1162. When the end cap 1162 is removed, a slot 1160 is revealed which is used to receive a radio card 1166. The slot 1164 in the computer terminal 1160 has three pairs of antenna contacts 1167, 1168 and 1169 which are respectively connected to three different radio antennas 1171, 1172 and 1173. The radio card 1166 in this embodiment only has one pair of antenna contacts 1175. Thus, when the radio card 1166 is inserted into the slot 1164, the antenna contacts 1175 will match up to the antenna contacts 1167 and the radio will utilize the internal antenna 1171. The external antenna 1173 and the other internal antenna 1172 will not be used by this particular radio card 1166.

Figure 33:
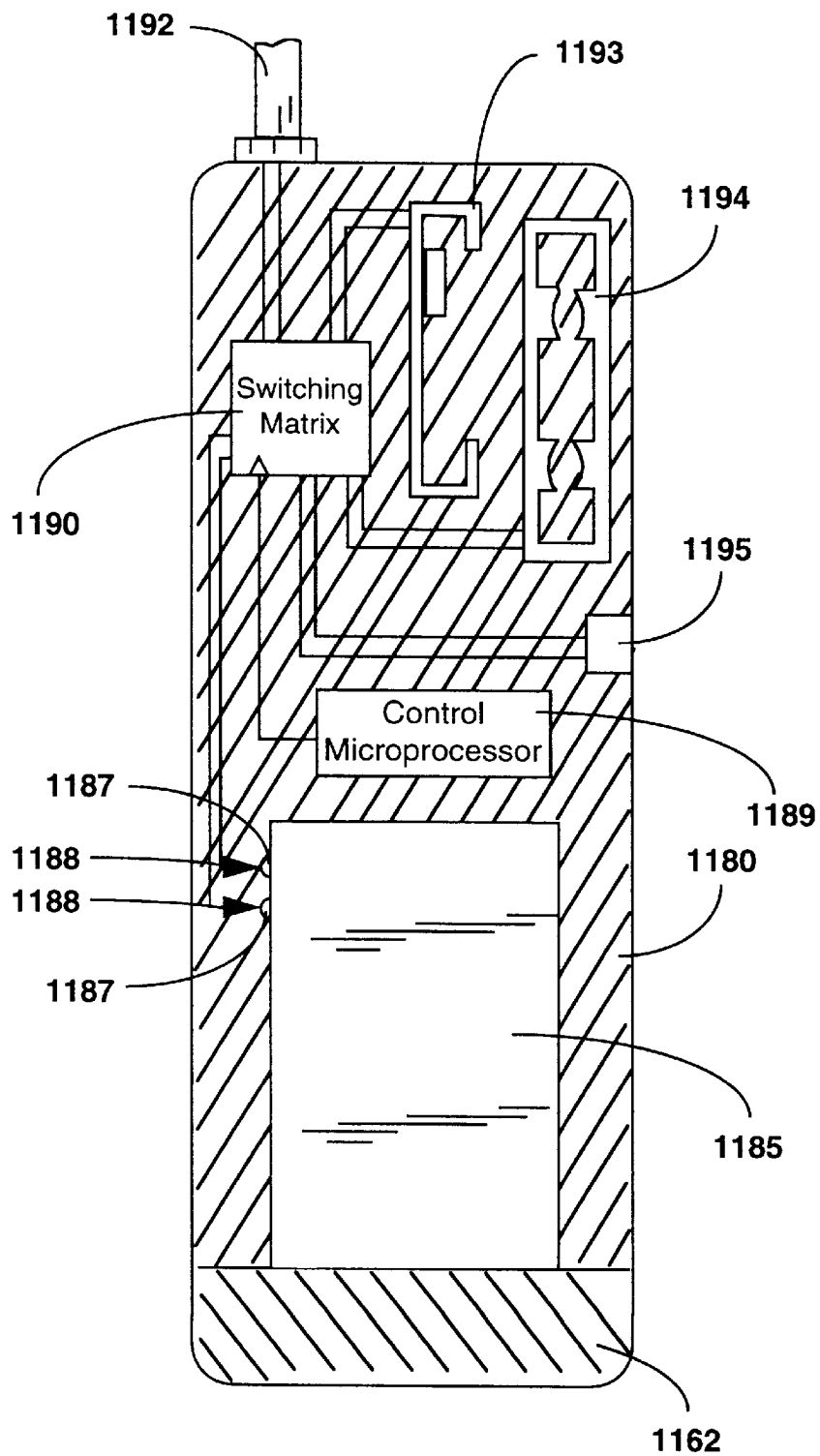
FIG. 33 is a partial top view of yet another embodiment of a computer terminal built in accordance with the present invention showing the use of a switching matrix.

Referring now to FIG. 33, still another embodiment of a computer terminal 1180 built in accordance with the present invention is shown. A communication card 1185 is inserted into the computer terminal 1180. The card 1185 can be a radio card, a modem card, a wired communication card, an infrared card, or a card containing more than one of the above transceivers. The card 1185 has a set or pair of contacts 1187 which encounter a set or pair of contacts 1188 disposed on the receiving portion of the computer terminal 1180. The contacts 1188 are electrically connected to a switching matrix 1190, thus the radio card or modem card 1185 is electrically connected to the switching matrix 1190.

The switching matrix 1190 is connected to a plurality of antennas 1192, 1193 and 1194 and to a telephone jack 1195. In other embodiments, the switching matrix 1190 may additionally be connected to an Ethernet port or additional antennas to accommodate infrared communication. The switching matrix 1190 is used to electrically and selectively connect the radio or modem card 1185 to the appropriate antenna or to a wired or telephone line. The switching matrix 1190 is controlled by the control microprocessor 1198 of the computer terminal 1180. The control microprocessor interrogates the card 1185 to determine what kind of card it is and to determine what antenna or telephone connection it needs. The control microprocessor then signals the switching matrix 1190 which connects the card 1185 to the appropriate antenna 1192, 1193 or 1194, to the phone jack 1195, or to any other appropriate port or antenna.

Figure 34:
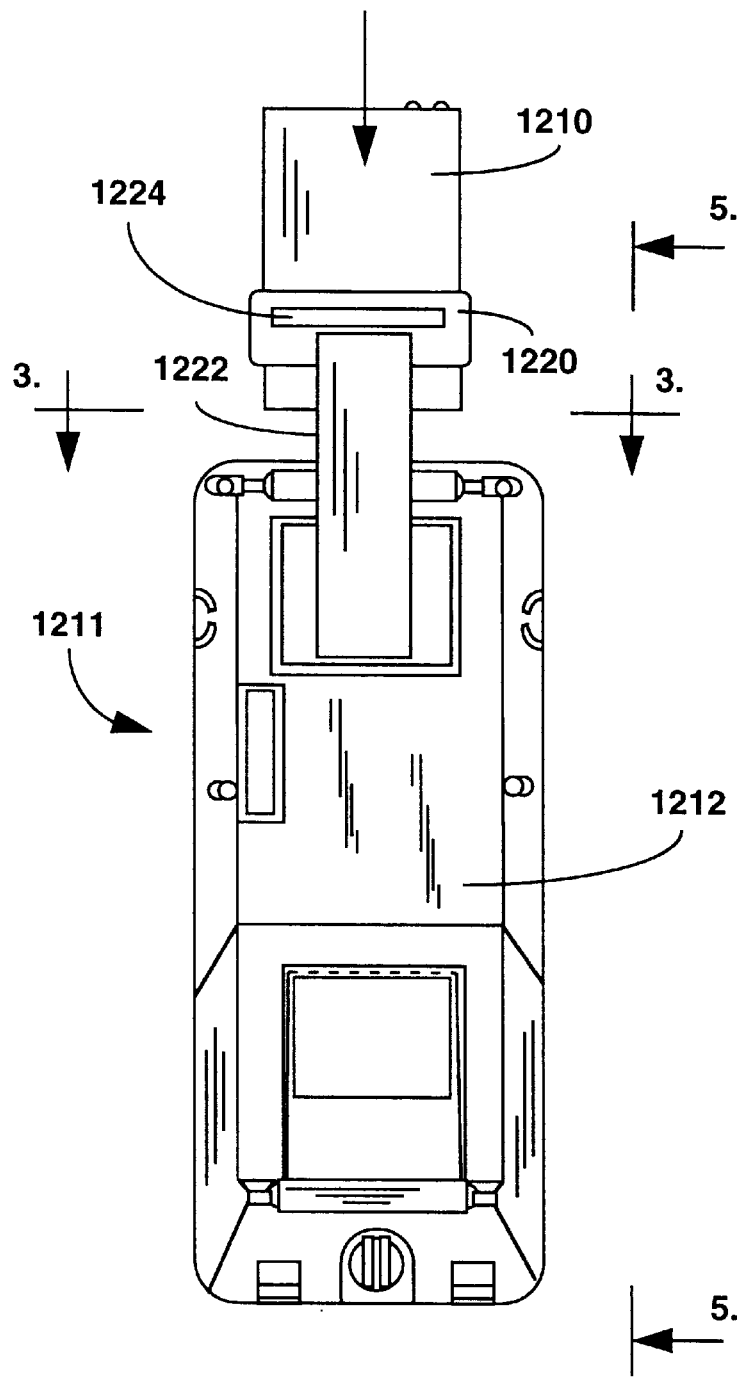
FIG. 34 is a rear view of a computer device and radio card built in accordance with the present invention.
Figure 35:
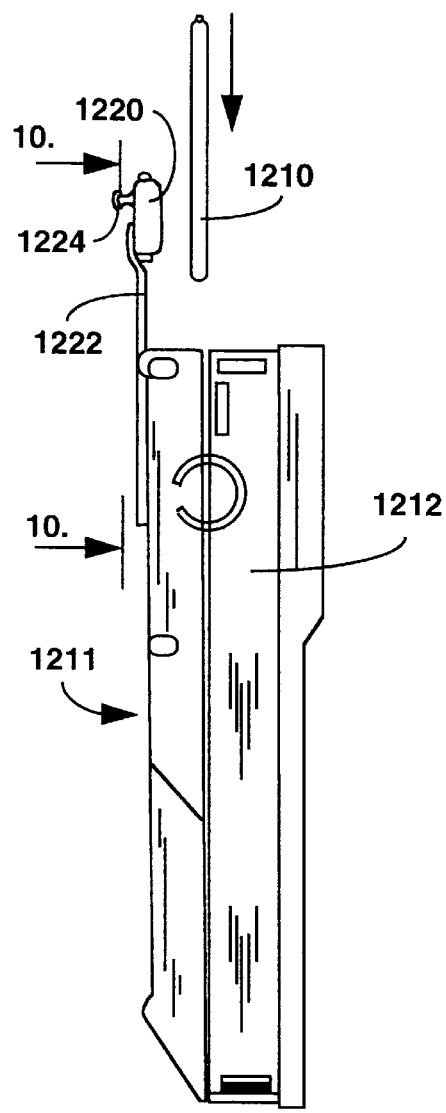
FIG. 35 is a side elevational view taken along line 5—5 in FIG. 34 of the computer device and radio card.
Figure 36:
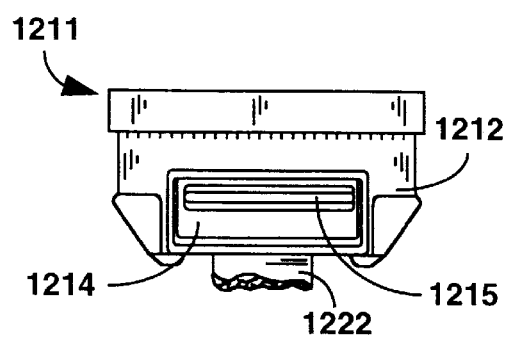
FIG. 36 is a partial top view taken along line 3—3 in FIG. 34 of the computer device.

FIGS. 34, 35 and 36 illustrate another embodiment wherein a computer device 1211 utilizes a radio card 1210 built in accordance with the present invention. The computer device 1211 has a housing 1212. Inside the radio card 1210 is a completely operation radio transceiver not shown. The computer device 1211 has an opening 1214 in the housing 1212 through which the radio card 1210 can be inserted into the computer device 1212. In the present embodiment of the invention, the receiving means for the computer device is a slot 1215.

When the radio card 1210 is inserted into the slot 1215 in the computer device 1211 an interface between the radio card 1210 and the computer device 1211 is produced. The computer device 1211 has a plurality of pins not shown which form the male portion of a connector. The radio card 1210 has a corresponding plurality of holes not shown which form the female portion of the connector and which engage the pins. The pins are connected internally and electrically to the computer device 1211 by a series of electrical connections such as wires or electrical ribbon. The holes in the radio card 1210 are electrically connected to the radio transceiver. When the pins engage the holes, electrical signals can be exchanged between the radio transceiver inside the radio card 10 and the computer device 1211. The electrical signals can be in the form of information exchange, power supply or both. The radio card 1210 includes antenna contacts 1217 to engage corresponding radio antenna contacts that are connected to an appropriate antenna.

The computer device 1211 includes a cap 1220 which is designed to matingly engage the opening 1215 in the housing 1212 of the computer device 1211 and thereby cover the slot 1215 used to receive the radio card 1210. A flexible band 1222 attaches the cap 1222 to the housing 1212 of the computer device 1211. One end of the band 1222 is connected to the cap 1222 while the other end is attached to the housing 1212. A handle 1224 helps assist the removal of the cap 1220 from the housing 1212 of the computer device 1211.

The cap 1220 is constructed of a closed cell foam material with high air content for low dielectric losses. Alternatively, a quality dielectric material may be used to reduce the size of the antenna structure. The cap 1220 when made of a foam material helps to protect the radio card from the physical trauma typically associated with computer devices of these types. Additionally, as will be discussed in further detail below, the cap 1220 helps to environmentally seal the opening 1214 preventing harmful material from the outside such as dust or moisture from reaching the radio card 1210 and helps to reduce the escape of electronic noise from the housing 1212 created by the radio card 1210 and computer device 1211. As will be discussed below, a grounded metal shield covering a portion of the cap 1220 is used to reduce the escape of electronic noise.

While the cap 1220 helps to seal the opening, protect the radio card 1210 and hold the radio card in place, the primary function of the cap is to provide the radio card 1210 access to an appropriate antenna or antennas. The connection of the radio card 1210 to the antenna is made through the cap 1220. The antenna or antennas can be embedded in the cap 1220, embedded in the band 1222 or even attached to, mounted on, or embedded in the housing 1212 of the computer device 1211.

Figure 37:
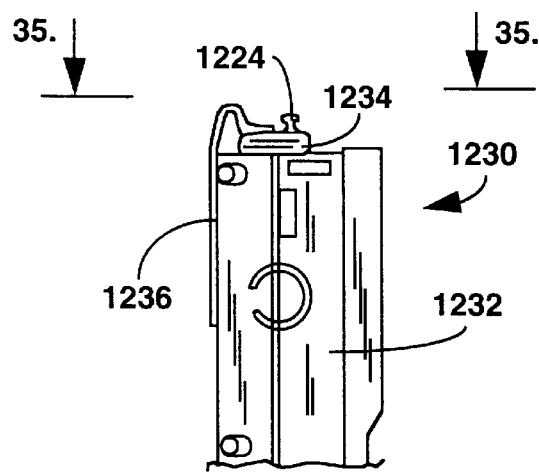
FIG. 37 is a partial side elevational view of another computer device built in accordance with the present invention.
Figure 38:
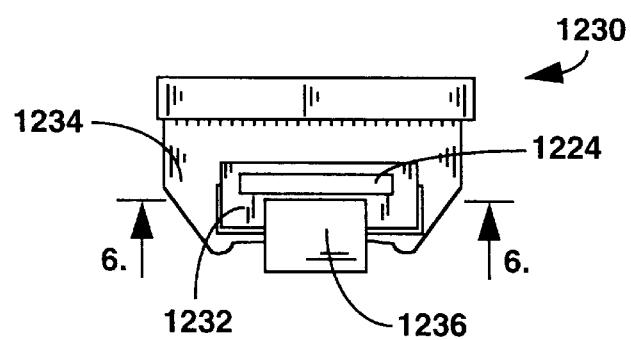
FIG. 38 is a top view taken along line 35—35 in FIG. 37 of the computer device showing a rubber cap inserted therein.

Referring now to FIGS. 37 and 38, a computer device 1230 built in accordance with the present invention is shown with a cap 1234 engaged in the opening of the housing 1232 wherein a radio card can be inserted. A band 1236 is attached to both the cap 1234 and the housing 1232. The band 1236 helps prevent the loss of the cap 1234 when the cap 1234 is not engaged in the housing 1232 of the computer device 1230.

Figure 39:
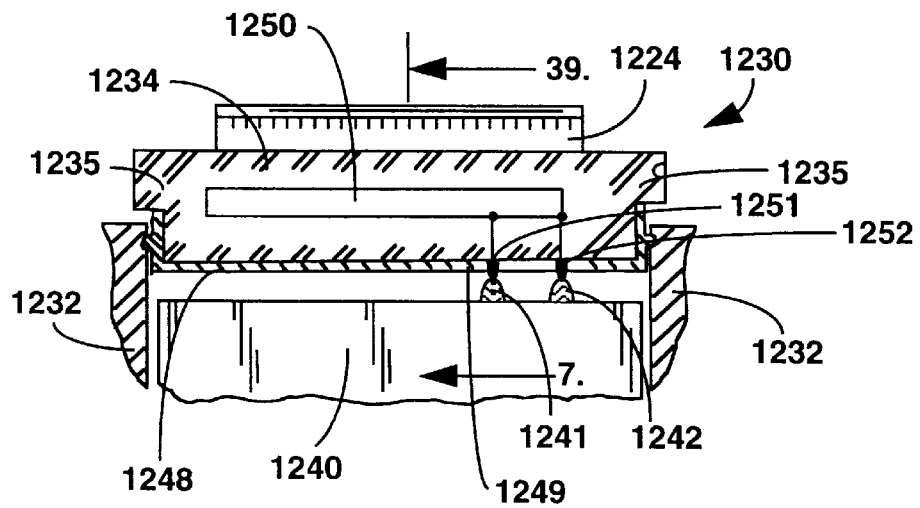
FIG. 39 is a partial vertical sectional view taken along line 6—6 in FIG. 38 showing a radio antenna embedded within the rubber cap.
Figure 40:
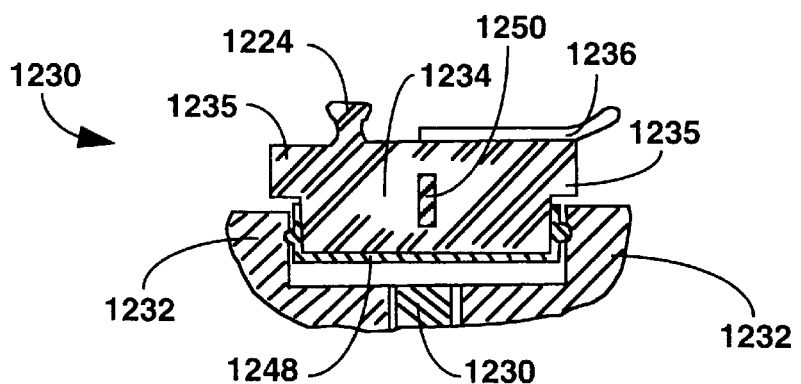
FIG. 40 is a partial vertical section view taken along line 7—7 in FIG. 39 of the rubber cap.

Referring now to FIGS. 39 and 40, the cap 1232 is shown engaged with the housing 1232 of the computer device 1230. The cap 1234 includes an outwardly extending lip 1236 which helps to environmentally seal the opening in the housing 1232 preventing harmful material from the outside such as dust or moisture from reaching the radio card 1240 which has been inserted into the computer device 1230. When the cap 1234 is completely inserted or fully engaged in the housing 1232, the lip 1235 sealingly engages the housing 1232.

Embedded in the cap 1234 is an antenna 1250. The antenna 1250 is connected to the radio card 1240 through contacts 1251 and 1252 disposed on the cap 1234 and contacts 1241 and 1242 disposed on the radio card 1240. Contact 1252 is the ground contact for the antenna 1250 and is connected to the end of the antenna 1250. Contact 1242 is the ground contact for the radio card 1240. Contact 1251 is the signal contact and is connected to the antenna 1250 a short distance from the end of the antenna 1250. Contact 1241 is the signal contact for the radio card 1240.

Contact 1251 and contact 1241 are disposed on the cap 1234 and the radio card 1240, respectively, such that the contacts engage each other when the cap 1234 is inserted into or engaged with the housing 1232 of the computer device 1230. Similarly, contact 1252 and contact 1242 are disposed on the cap 1234 and the radio card 1240, respectively, such that the contacts engage each other when the cap 1234 is inserted into or engaged with the housing 1232 of the computer device 1230. The contacts shown in the present embodiment are of the metal button type wherein the connection is made when the two metal surfaces meet. Many variations of the contacts are possible including the use of male/female connections and spring type contacts.

A shield 1248 is disposed around the bottom portion of the cap 1234 and is used to reduce the escape of electronic noise. Typically in computer devices of this type, the inside of the housing of the computer device is shielded. Additionally, the area immediately surrounding the radio device such as a radio card may also be shielded. By shielding the cap 1234, the integrity of the housing and radio shields are not breached by the opening used to insert and remove the radio card. The shield 1248 is connected to the antenna ground contact 1252 on the cap 1234. A hole 1259 in the shield 1248 allows the signal contacts 1251 and 1241 to engage without being grounded.

Figure 41:
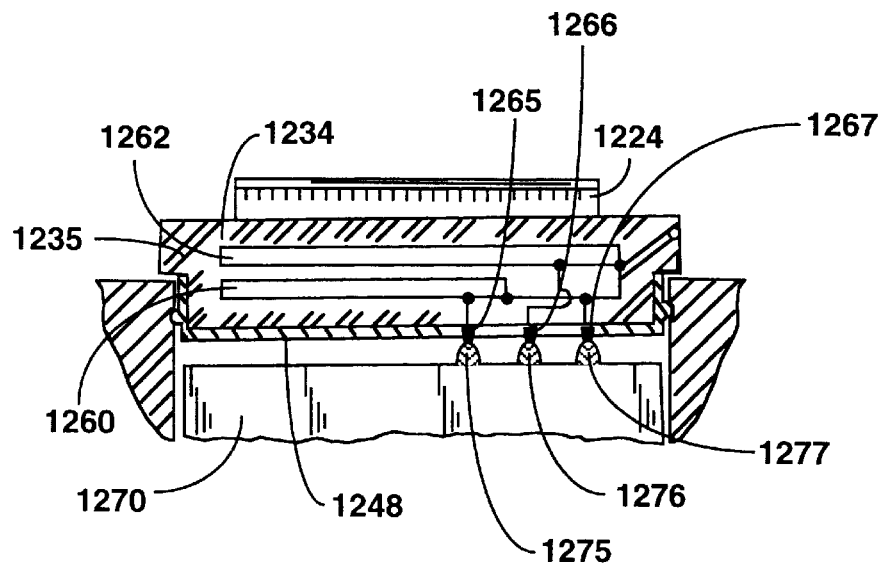
FIG. 41 is a partial vertical sectional view of another embodiment of the present invention.

Referring now to FIG. 41, the cap 1234 is shown embedded within which are two antennas 1260 and 1262 designed to receive and transmit different radio frequency signals. The first antenna 60 and the second antenna 1262 are both connected to a common ground contact 1267 which is connected to the shield and which engages the ground contact 1277 on the radio card 1270. The first antenna 1260 is connected to a first signal contact 1265 and is disposed on the cap 1234 to engage a first signal contact 1275 disposed on the radio card 1270. Similarly, the second antenna 1262 is connected to a second signal contact 1266 and is disposed on the cap 1234 to engage a second signal contact 1276 disposed on the radio card 1270. Thus the radio card 1270 will use a signal via contact 1275 or via contact 1276 depending upon which antenna it would like to use. Which antenna it would like to use is dependent upon the desired frequency upon which it want to transmit and receive.

The radio card 1270 as shown has three contacts 1275, 1276 and 1277. However, if the radio transceiver in the radio card 1270 is designed such that it would only be able to transmit and receive signals which correspond to the first antenna 1260, then it would not need to have contact 1276 and it could be left off. Similarly, if the radio card 1270 were only going to use second antenna 1262 then contact 1275 could be omitted. Thus, standardizing contact position with respect to antenna type allows for flexibility in cap usage with various radio cards such that only appropriate antennas will be connected to the radio card.

Figure 42:
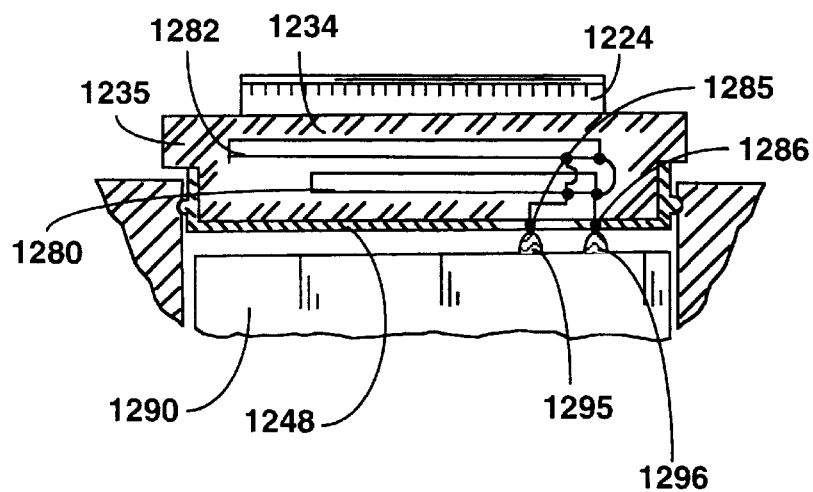
FIG. 42 is a partial vertical sectional view of still another embodiment of the present invention.

Referring to FIG. 42, two antennas 1280 and 1282 are embedded in the cap 1234. In this embodiment built in accordance with the present invention, the two antennas 1280 and 1282 not only share a common ground contact 86 which engages the ground contact 1296 of the radio card 1290, but they also share a common signal contact 1285 which engages the signal contact 1295 on the radio card 1290. Thus, both antennas receive and transmit signals using the same two contacts. This embodiment requires a radio card 1290 which can filter the different signals and thus use the signal from the desired antenna while ignoring the signals which arrive via the other antenna.

Figure 8:
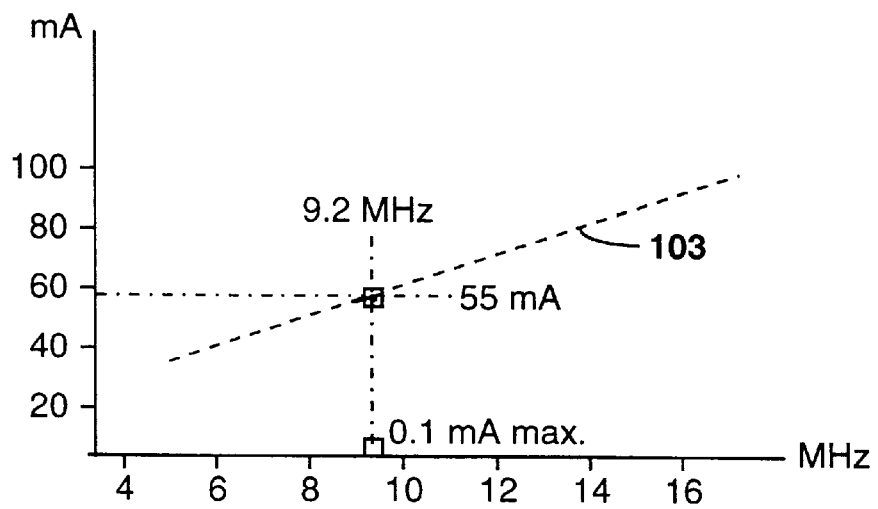
FIG. 8 is a schematic diagram showing frequency related current characteristics of an application microprocessor device of the circuit shown in FIG. 5.
Figure 43:
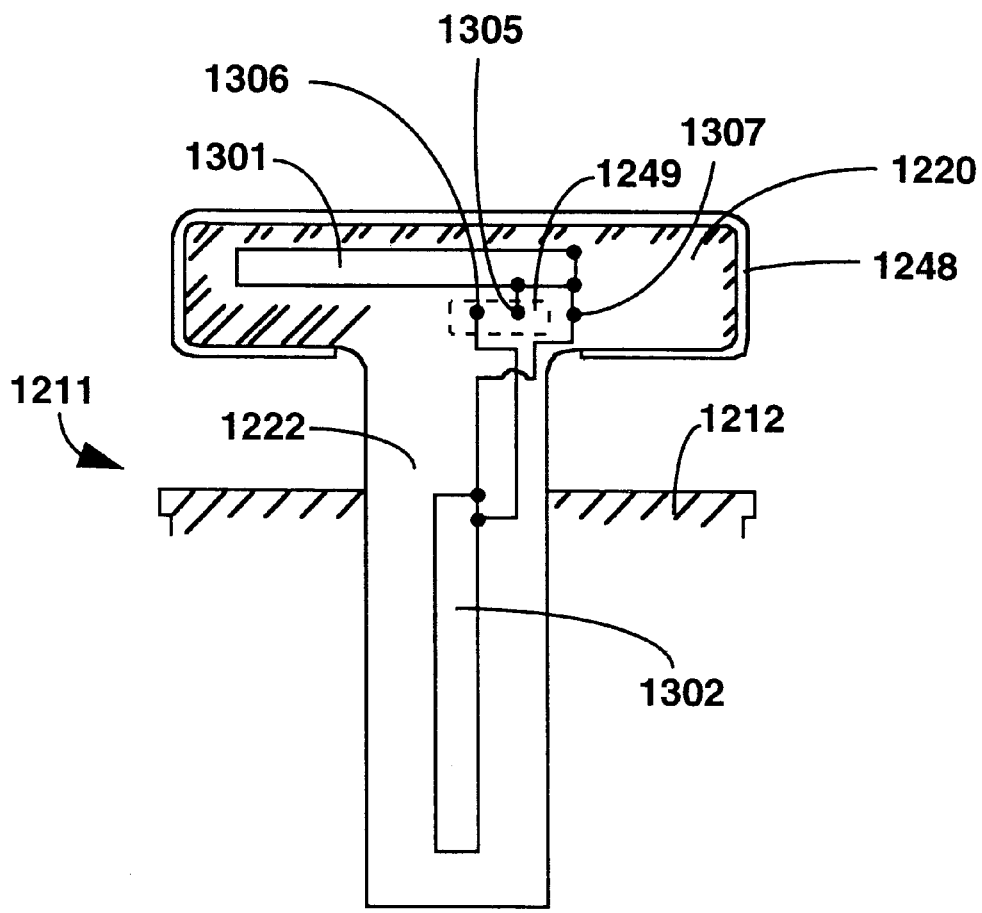
FIG. 43 is a partial back view taken along line 10—10 in FIG. 35 of the computer device.

Referring to FIG. 43, a computer device 1211 built in accordance with the present invention is shown which is designed to implement an antenna diversity scheme. A first antenna 1301 is embedded in the cap 1220. A second antenna 1302 is shown embedded in the band 1222. As discussed in the embodiment as shown in FIG. 8, the two antennas 1301 and 1302 share a common ground contact 1307. The first antenna 1301 is connected to a signal contact 1305. Likewise, the second antenna 1302 is connected to a signal contact 1306. The hole 1249 in the shield 1248 which prevent the signal contacts 1305 and 1306 from grounding is shown in dashed lines.

The first antenna 1301 is similar to the second antenna 1302 and both are designed to transmit and receive similar radio frequency signals. When the cap 1220 is engaged in the opening of the housing 1212, the first antenna 1301 and the second antenna 1302 will be perpendicular with respect to each other. The quality of the signal received by the first antenna 1301 and the quality of the signal received by the second antenna 1302 may be greatly different since the antennas are place at right angles with respect to each other. In the present embodiment, the radio card can check the quality of each signal and use the antenna which is currently receiving the stronger signal. Additionally, it can switch to the other antenna when the conditions change such that the signal is no longer acceptable. Utilizing two similar antennas in this matter, antenna diversification, can be very important in computer terminals of this type since they are often mobile and are often subjected to a rapidly changing environment. An antenna diversification scheme of this type can be used to help eliminate the reception problems associated with signal multipath.

Figure 44:
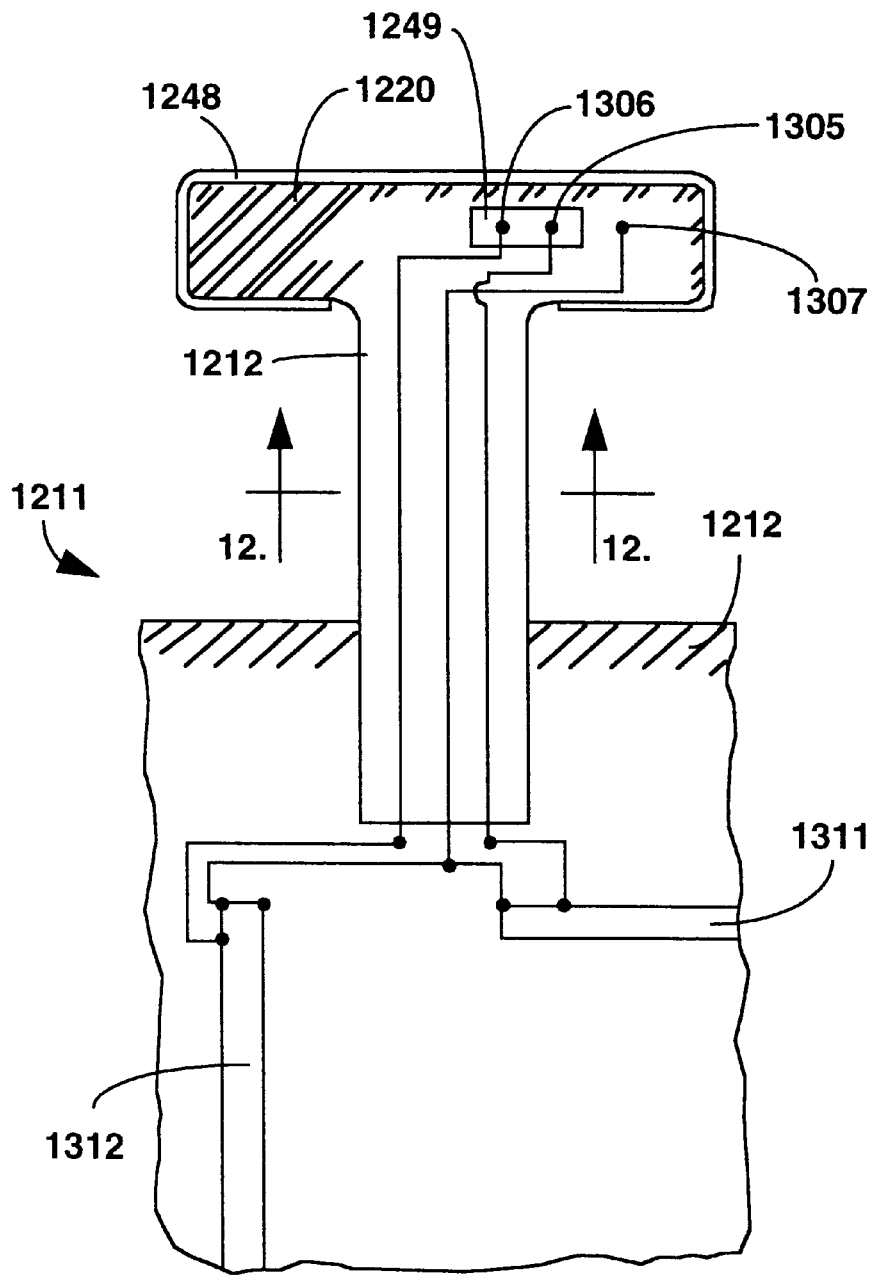
FIG. 44 is a partial back view of still another embodiment built in accordance with the present invention.

Referring now to FIG. 44, another embodiment of the present invention is shown with the first antenna 1311 and the second antenna 1312 attached to the housing 1212 of the computer terminal 1211. As in the embodiment shown in FIG. 43, the first antenna 1311 is similar to the second antenna 1312 and both are designed to transmit and receive similar radio frequency signals and are perpendicular with respect to each other such that an antenna diversity scheme can be implemented. The antennas 1311 and 1312 are connected to the contacts 1305, 1306 and 1307 through the cap 1220 and though the band 1212.

Figure 46:
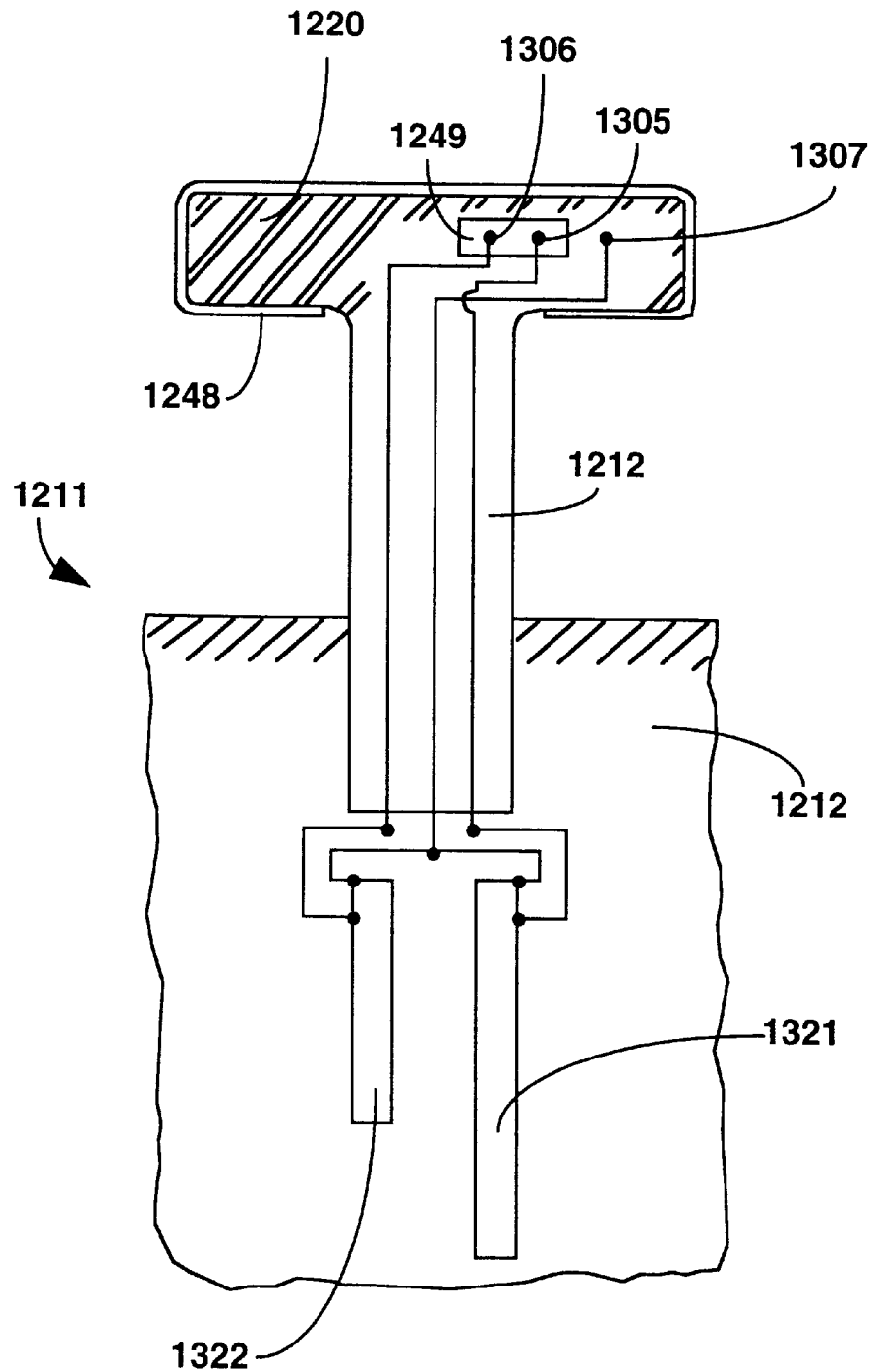
FIG. 46 is partial back view of a computer device of yet another embodiment of the present invention.

Referring to FIG. 46, the embodiment of FIG. 44 is shown with the only differences being that the first antenna 1321 and the second antenna 1322 are positioned slightly differently and the antennas are designed to transmit and receive different radio frequency signals. Thus, the radio card uses the signal on contact 1305 when it wants to receive signals via the first antenna 1321 and uses the signal on contact 1306 when it wants to receive signal via the second antenna 1322.

Figure 45:
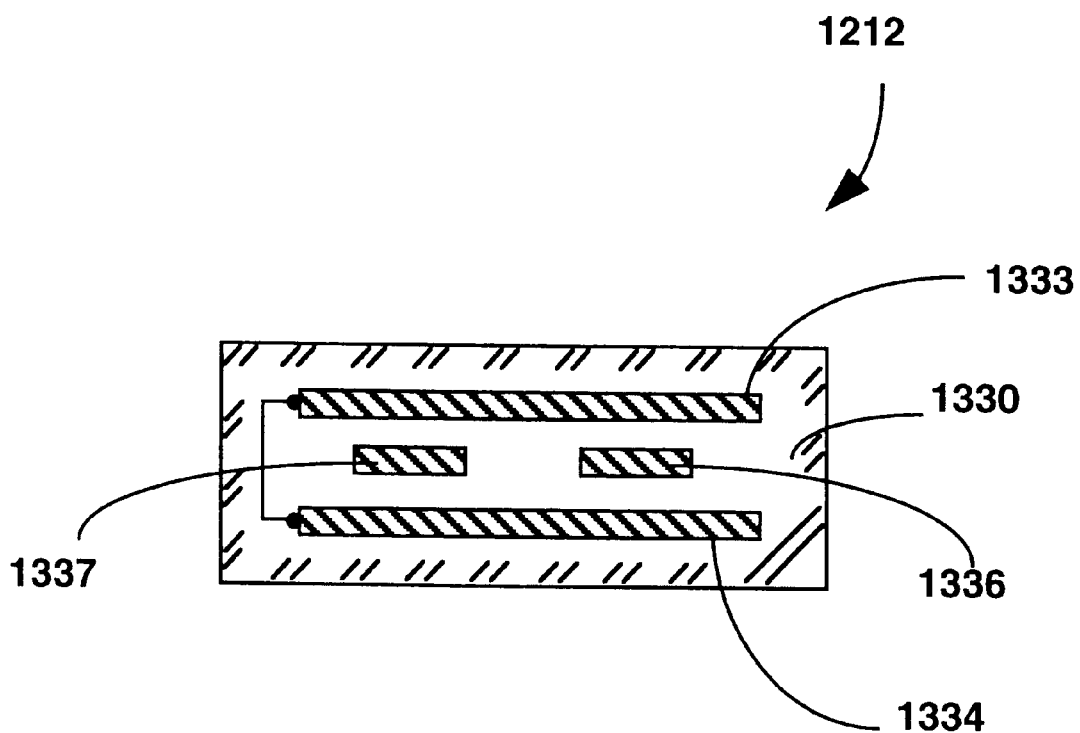
FIG. 45 is a partial horizontal sectional view taken along line 12—12 in FIG. 44 showing a shielded ribbon used to carry the antenna signals.

In FIGS. 43, 44 and 46, the portion of the connection between the contacts 1305, 1306 and 1307 and the antennas which pass through the band 1212 are shown schematically as wires. In the best mode of the present invention, the transmission of the signal through the band 1212 would be accomplished through the use of a micro shield strip 1330 as shown in FIG. 45. The micro shield strip consists of several conductive ribbons running the length of the band 1212 and separated by the non-conductive material of the band 1212. A wide top ribbon 1333 and a wide bottom ribbon 1334 are used to sandwich two smaller ribbons 1336 and 1337. The smaller ribbons 1336 and 1337 are used to transmit the antenna signals and are connected to contacts 105 and 106 respectively. The wide bands 1333 and 1334 are common to each other and are used to ground each of the antennas and are connected to the ground contact 1307 on the cap 1220. The wide ground ribbons 1333 and 1334 shield the smaller antenna signal ribbons 1336 and 1337 and help to maintain the signal integrity.

Figure 47:
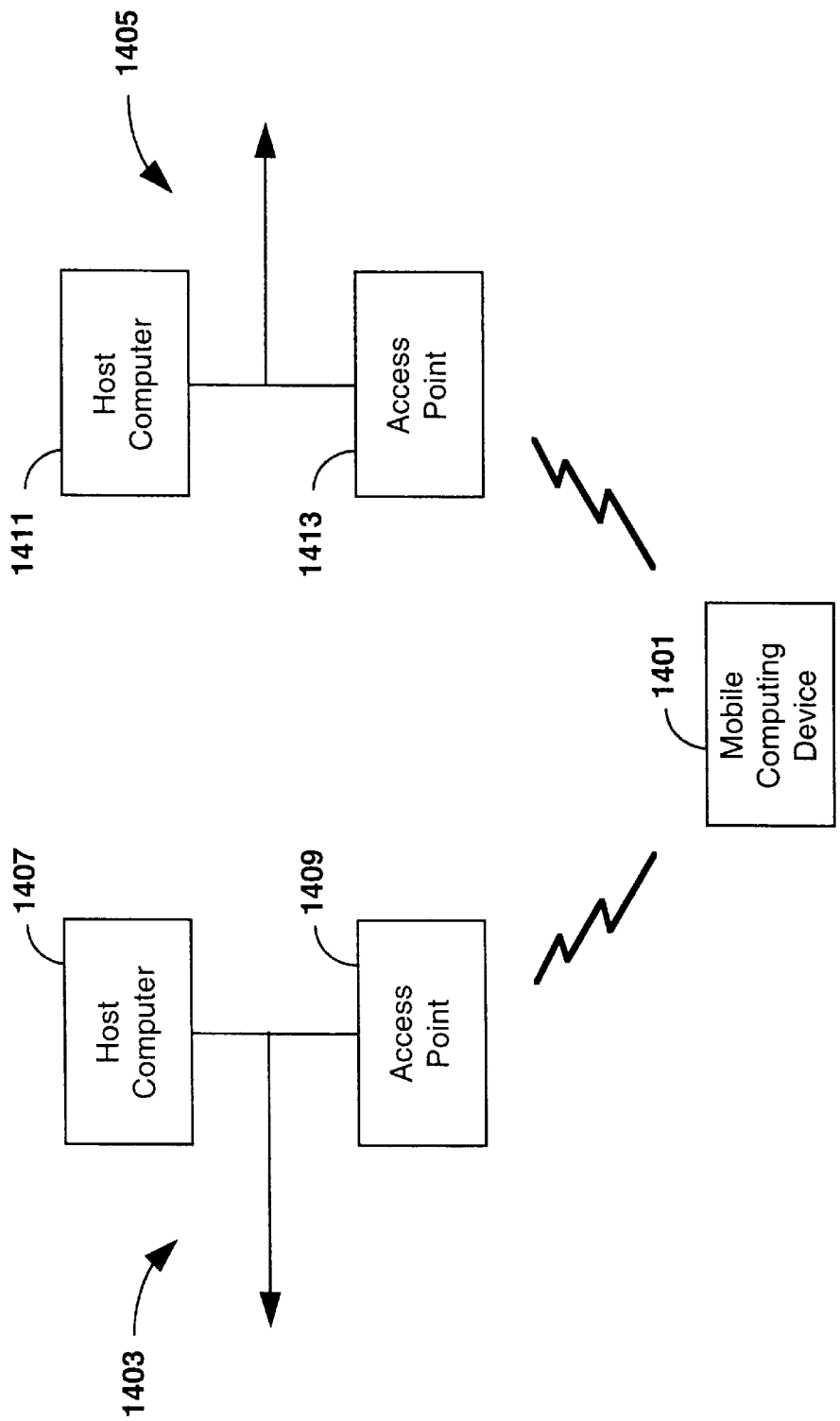
FIG. 47 is a diagram illustrating the use of the portable data terminal according to the present invention which utilizes a plurality of radios to access different subnetworks of an overall communication network.

FIG. 47 is a diagram illustrating the use of portable data terminals according to the present invention which utilizes a plurality of radios to access different subnetworks of an overall communication network. Specifically, subnetworks 1403 and 1405 are illustrated which provide for an overall network environment for MCD 1401. Each subnetwork 1403 and 1405 may have a host computer, such as 1407 and 1411, and an access point, such as 1409 and 1413. The access point 1409 provides for communication via one type of radio communication while access point 1403 provides for another. For examples, access point 1409 may provide a long-distance digital cellular link while access point 1413 provides for local spread spectrum link.

In addition, access points 1409 and 1413 might also exist on a single network for providing multiple communication paths in case one access point fails or becomes overloaded.

To accommodate multiple radios, the communication module of MCD 1401 contains multiple transceivers, and associated protocol substacks and antennas. Specifically, the communication module might include a single processing unit which handles multiple sets of software protocol substacks, i.e., one for each of the included transmitters. Similarly, if the protocol substacks and the processing unit functionality of each radio is too different, additional separate processing units may be included. Finally, the MCD (the portable data collection terminal) might also be designed to receive multiple communication modules.

In addition, the base module may interrogate the selected ("inserted") communication module(s) to determine which antennas to interconnect. Alternatively, the communication modules may interrogate the base module and request from the available antennas. Where a suitable antenna is not available, an external antenna connector is selected. Available antennas may be installed inside or on the outside of the base unit. Of course the antennas might also be selected via the physical communication module connectors as described below.

Figure 48:
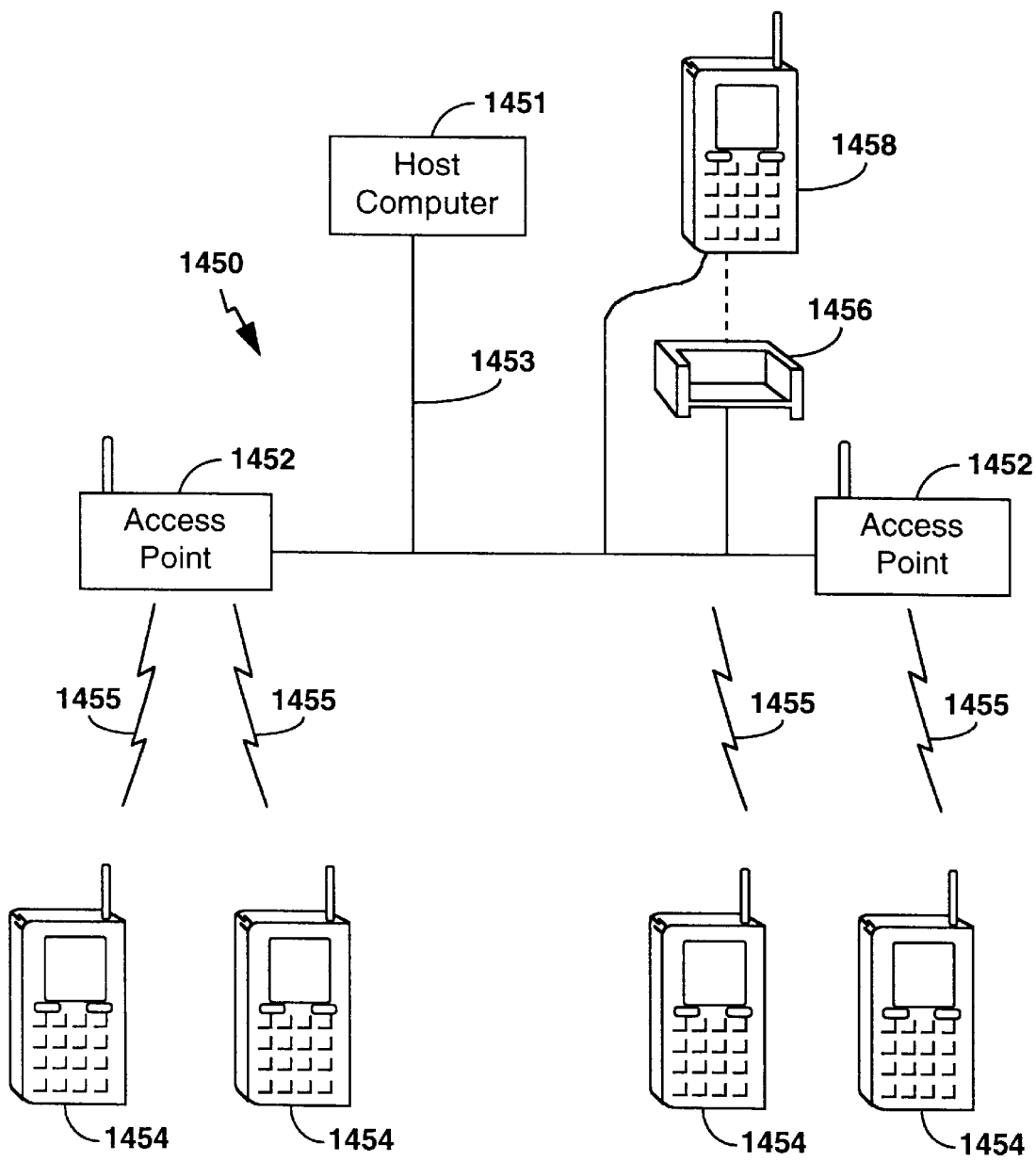
FIG. 48 is a diagram illustrating the use of portable data terminals according to the present invention utilizing features of both wired access points and wireless network constituents.

FIG. 48 is a diagram illustrating an alternate configuration of portable data terminals according to the present invention. Specifically, a communication network 1450 provides an overall network environment for portable data collection terminals 1454. A host computer 1451 is connected to access points 1452 via a wired connection 1453. The access points 1452 are in turn communicatively coupled to portable data collection terminals 1454 via wireless links 1455. The wireless links 1455 may be one or more of a plurality of wireless communications technologies, including narrow-band radio frequency, spread spectrum radio frequency, infrared, and others.

A dock 1456 and a portable data terminal 1458 according to the present invention may be connected to the wired backbone 1453, and may serve a function similar to an access point 1452. The dock 1456 may provide power to the terminal 1458, or alternatively the dock may be absent and the terminal 1458 may run for a limited time under the power of its battery. The terminal 1458 connects directly to the wired backbone 1453, and also communicates with another terminal 1454 through a wireless link 1455. The terminal 1458 may, for example, be equipped with protocol converter circuitry to convert communication on the wire backbone 1453 into wireless communication on the link 1455, and also to convert wireless communication on the link 1455 to a format for communication on the wire backbone 1453. The communication module associated with terminal 1458 thus improves the versatility of the terminal 1458.

Figure 49:
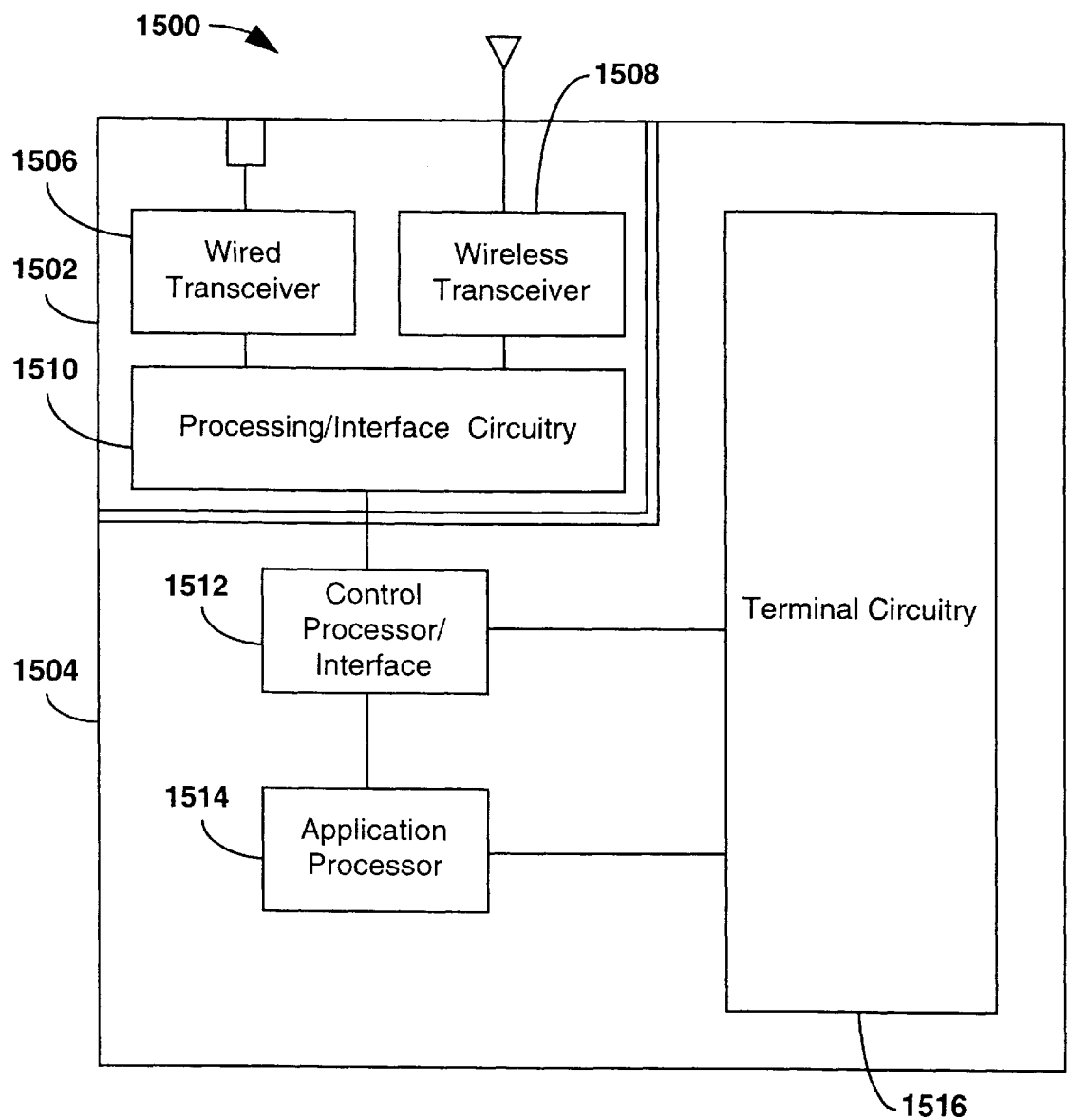
FIG. 49 is a functional block diagram illustrating the basic components of a portable data terminal according to the present invention equipped with both wired and wireless transceivers.

FIG. 49 illustrates one embodiment of the data collection terminal of the present invention, having both wired and wireless communication capability. A data terminal 1500 is shown having a communication module 1502 and a base module 1504. The communication module 1502 contains a wired transceiver 1506, a wireless transceiver 1508, and processing and interface circuitry 1510. The base module 1504 contains a control processor and interface 1512, an application processor 1514, and terminal circuitry 1516 containing data input and display portions and other circuitry well known in the art. The blocks shown in communication module 1502 and base module 1504 are simplified for exemplary purposes, and it will be understood by one skilled in the art that a data terminal 1500 according to the present invention is not limited to the block circuitry shown in FIG. 49. In another embodiment, the communication module 1502 may contain additional transceivers for communicating on other mediums and in other networks. The processing and interface circuitry 1510 of the communication module 1502 isolates the circuitry of the base module 1504 from the differing operating characteristics of the transceivers, so that communication by any of the transceivers can be accommodated by the circuitry and software routines of the base module 1504.

In operation, the processing and interface circuitry 1510 of the communication module 1502 is programmed with the network configuration to route communication through either the wired transceiver 1506 or the wireless transceiver 1508. An incoming message on the wired transceiver 1506 may be routed and processed to a terminal display portion, or may be routed to a host computer, a dock, or another portable data terminal 1500 through the wired transceiver 1506 or through the wireless transceiver 1508, whichever is appropriate. Similarly, an incoming message on the wireless transceiver 1508 may be routed to display or through the wireless transceiver 1508 or through the wired transceiver 1506, whichever is appropriate for the destination. By provided for the routing functions to be done in the communication module 1502, the power used in the base module 1504 can be minimized. Specifically, the interface with the control processor 1512 and the application processor 1514 need not be used, which allows the main terminal in the base module 1504 to remain dormant while communications are routed in the communication module 1502.

The choice of which transceiver to use in routing communication is based on a "least cost" analysis, considering factors such as the power required to send the message through a particular transceiver, the speed at which the message will be received from a particular transceiver, the possibility of error associated with each transceiver, etc. A wired connection is usually selected when available, but routing decisions may vary with the different characteristics of each message and the mobility of the terminal. The processing and interface circuitry 1510 in the communication module 1502 is preferably capable of performing the least cost routing analysis for all communication messages, without activating any processing power from the base module 1504.

Figure 50:
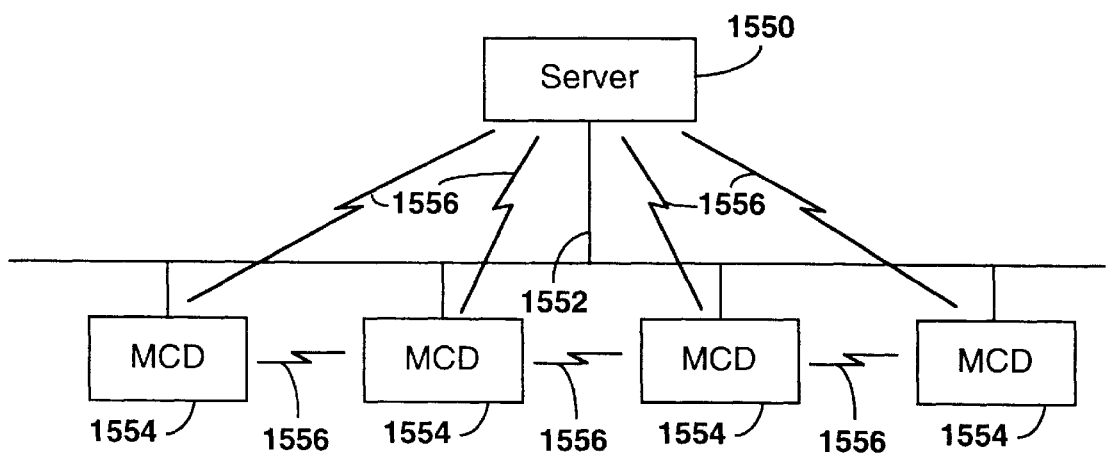
FIG. 50 is a diagram illustrating the use of portable data terminals according to the present invention in a communication network having both wired and wireless communication capability.

FIG. 50 is a diagram illustrating the use of portable terminals according to the present invention utilizing both wired and wireless communication in a network configuration. Specifically, a server 1515 is shown connected to mobile computing devices (MCDs) 1554 via a wired communication link 1552. The communication link 1552 may alternatively be an infrared link, or another communication technology. MCDs 1554 are connected to each other and to the server via the link 1552. MCDs 1554 are also communicatively coupled to each other via wireless links 1556.

The network involving the server 1550, the communication link 1552, and the MCDs 1554 represents a primary communication network, that is preferable to use when there are no interference or disconnection problems in the network. The network between MCDs 1554 involving wireless links 1556 represents an auxiliary or backup network, which is used where there are problems with the primary network, or to run diagnostics on the primary network. The MCDs 1554 are equipped to automatically switch from the primary network to the auxiliary network when a problem arises on the primary network. This network redundancy allows the MCDs 1554 to remain in constant communication with each other and with server 1550.

For example, a wired network on a communication link 1552 does not recognize connection well, and may not immediately detect a loss of connectivity. MCDs 1554 utilize wireless links 1556 to diagnose a lack of connection on the wired network 1552. For example, an MCD 1554 may activate its radio to send a test message to another component of the network, either another MCD 1554 or the server 1550, to test communication on the wired link 1552 by sending a reply test message back to the inquiring MCD 1554. The test routine is preferably implemented and controlled by the processing/interface circuitry 1510 in the communication module 1502 (see FIG. 49) of the MCD 1554. If the reply communication test is not received, the MCD 1554 will know that there is a problem on the primary network, and will inform other MCDs 1554 to switch to the auxiliary network. The MCDs 1554 can continue to check the primary network via wireless links 1556 until the primary network is back in service.

Some MCDs 1554 may be out of range to effect wireless communication with server 1550 by a wireless link 1556. An out-of-range condition is determined according to the particular communication and connection protocol implemented by MCDs 1554 and other network components such as server 1550. In this situation, the out-of-range MCD 1554 sends its message, along with an out-of-range condition indicator, to another MCD 1554 that is in communication with the server 1550, and the in-range MCD 1554 forwards the message on to the server. Similarly, the server 1550 sends its messages intended for the out-of-range MCD 1554 to an in-range MCD 1554 to be forwarded over a wireless link 1556. The MCDs 1554 are capable of automatically switching from the wired network to the wireless network and vice versa for each communication attempt.

Figure 51:
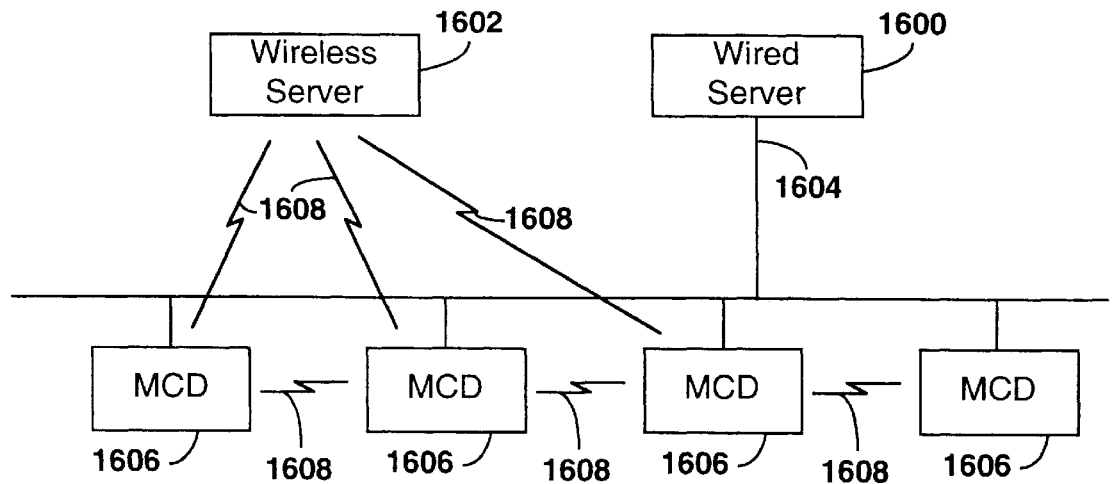
FIG. 51 is a diagram illustrating the use of portable data terminals according to the present invention in both a wired and a wireless network simultaneously.

FIG. 51 is a diagram illustrating the use of portable data terminals according to the present invention utilizing both wired and wireless communication to access separate subnetworks in an overall communication network. Specifically, a wired network includes wired server 1600 and mobile computing devices (MCDs) 1606 connected by a wired communication link 1604. MCDs 1606 are also part of a wireless network with wireless server 1602, and are communicatively coupled to each other and the wireless server 1602 via wireless communication links 1608. Wireless links 1608 may be radio frequency communication links, such as narrowband, direct sequence spread spectrum, frequency hopping spread spectrum or other radio technologies. Alternatively, wireless links 1608 may be infrared communication links, or other wireless technologies. In another embodiment, the wired server 1600 and the wired communication links 1604 may utilize infrared communication technology, with the wireless communication links 1608 being radio frequency links. The present invention contemplates various combinations of communication technologies, all accommodated by communication modules of MCDs 1606. The communication modules of MCDs 1606 include any number of transceivers operable on any number of communication mediums, since the differences in their operating characteristics are isolated from the base module of the MCDs 1606 by a communication processor. The MCDs 1606 are preferably able to automatically switch between the wired and wireless networks, controlled primarily by a communication processor in their communication modules.

Some MCDs 1606 may be out of range to effect wireless communication with wireless server 1602 by a wireless link 1608. An out-of-range condition is determined according to the particular communication and connection protocol implemented by MCDs 1606 and other network components such as wireless server 1602. In this situation, the out-of-range MCD 1606 sends its message, along with an out-of-range condition indicator, to another MCD 1606 that is in communication with the wireless server 1602, either over a wireless link 1608 or alternatively over a wired link 1604 if both MCDs 1606 are constituents of a wired network. The in-range MCD 1606 then forwards the message on to the wireless server 1602 over wireless link 1608. Similarly, the wireless server 1602 sends its messages intended for the out-of-range MCD 1606 to an in-range MCD 1606 to be forwarded over a wireless link 1608 or a wired link 1604, if both MCDs are constituents of a wired network.

It should be realized that various other changes and modifications in the structure of the described embodiment would be possible without departing from the spirit and scope of the invention as set forth in the claims.

What is claimed is:

1. One or more circuits adapted for use in a mobile computing device comprising:
   a terminal adapted to receive battery power for at least one of the circuits;
   communication circuitry comprising a reduced power mode and being adapted to use a first wireless communication and a second wireless communication different from the first wireless communication to transmit data to access points, the communication circuitry reducing power by controlling the frequency of scanning for the access points; and processing circuitry arranged to process data received from the communication circuitry.

2. The one or more circuits of claim 1 wherein the processing circuitry operates at a plurality of different frequencies determined by a ratio.

3. The one or more circuits of claim 1 wherein the processing circuitry is arranged to enter into a state in which at least a portion of the processing circuitry is unclocked.

4. The one or more circuits of claim 1 wherein the processing circuitry comprises an integrated circuit.

5. The one or more circuits of claim 1 wherein the processing circuitry comprises a processor operating at a first frequency and a controller operating at a second frequency different from the first frequency.

6. The one or more circuits of claim 5 wherein the controller is arranged to provide output to a display and wherein the processor is arranged to process data from the communication circuitry.

7. The one or more circuits of claim 6 and further comprising a bus suitable for receiving data from a keyboard.

8. The one or more circuits of claim 1 wherein the processing circuitry is arranged to provide output to a display and is arranged to control the display.

9. The one or more circuits of claim 1 and further comprising a bus suitable for receiving data from a keyboard.

10. The one or more circuits of claim 1 and further comprising a clock control circuit causing the processing circuitry to operate at a plurality of different frequencies.

11. The one or more circuits of claim 1 wherein processing circuitry enables switching from the reduced power mode to an increased power mode of the processing circuitry when the communication circuitry is needed to transmit or receive data.

12. The one or more circuits of claim 11 wherein the switching from the reduced power mode to an increased power mode comprises switching from one frequency of operation to an increased frequency of operation.

13. The one or more circuits of claim 1 and further comprising an interface capable of coupling to a wired network.

14. A method for use in a mobile computing device to communicate with access points comprising:

receiving battery power;
using the battery power to transmit data to the access points and receive data from the access points using a first wireless communication and a second wireless communication different from the first wireless communication;
reducing the received battery power by controlling the frequency of scanning for the access points; and
processing data received from the first wireless communication and the second wireless communication.

15. The method of claim 14 wherein the processing data comprises operating at a plurality of different frequencies determined by a ratio.

16. The method of claim 14 wherein the processing data comprises processing data in response to clocking signals and wherein the clocking signals are suspended when data processing is not required.

17. The method of claim 14 wherein the processing data comprises operating at a first frequency and at a second frequency different from the first frequency.

18. The method of claim 17 and further comprising displaying data resulting from the data processing.

19. The method of claim 18 and further comprising receiving data from a keyboard.

20. The method of claim 14 and further comprising displaying data resulting from the data processing.

21. The method of claim 14 and further comprising receiving data from a keyboard.

22. The method of claim 14 wherein the processing data comprises processing at a plurality of different frequencies.

23. The method of claim 14 and further comprising:
reducing the received battery power when the transmitting of data or the receiving of data is not needed; and
increasing the received battery power when the transmitting of data or the receiving data is needed.

24. The method of claim 23 wherein the reducing the received battery power comprises reducing the frequency of the processing and wherein the increasing the received battery power comprises increasing the frequency of the processing.

25. The method of claim 14 and further comprising coupling to a wired network.

* * * * *

UNITED STATES PATENT AND TRADEMARK OFFICE
CERTIFICATE OF CORRECTION

| | | |
|---|---|---|
| PATENT NO. | : 6,714,983 B1 | Page 1 of 1 |
| APPLICATION NO. | : 08/513658 | |
| DATED | : March 30, 2004 | |
| INVENTOR(S) | : Steven E. Koenck et al. | |

It is certified that error appears in the above-identified patent and that said Letters Patent is hereby corrected as shown below:

In the Cover Page:

Page 2, line 2, after "Aug. 31, 1993, now Pat. No. 5,680,633", delete the entire section ", which is a continuation-in-part of application ... now Pat. No. 5,249,678".

In the Specification

Column 1, line 8, - column 3, line 5 replace the entire section "This application is a continuation-in-part of: ... issued Sep. 20, 1994)." with --The application is a continuation-in-part of Application No. 08/114,872 filed August 31, 1993, now U.S. Patent No. 5,680,633 issued October 21, 1997.--.

In the claims

Column 42, lines 64-65, Claim 1, after "transmit data to access points", insert -- and to receive data from access points --.

Signed and Sealed this

Ninth Day of January, 2007

JON W. DUDAS
*Director of the United States Patent and Trademark Office*

US006714983C1

(12) EX PARTE REEXAMINATION CERTIFICATE (7794th)
United States Patent
Koenck et al.

(10) Number: US 6,714,983 C1
(45) Certificate Issued: Oct. 5, 2010

(54) MODULAR, PORTABLE DATA PROCESSING TERMINAL FOR USE IN A COMMUNICATION NETWORK

(75) Inventors: Steven E. Koenck, Cedar Rapids, IA (US); Patrick W. Kinney, Marion, IA (US); Ronald L. Mahany, Cedar Rapids, IA (US); Robert C. Meier, Cedar Rapids, IA (US); Phillip Miller, Cedar Rapids, IA (US); Julie Ann Miller, legal representative, Cedar Rapids, IA (US)

(73) Assignee: Broadcom Corporation, Irvine, CA (US)

Reexamination Request:
No. 90/008,819, May 8, 2008

Reexamination Certificate for:
Patent No.: 6,714,983
Issued: Mar. 30, 2004
Appl. No.: 08/513,658
Filed: Aug. 11, 1995

Certificate of Correction issued Jan. 9, 2007.

Related U.S. Application Data

(63) Continuation-in-part of application No. 08/114,872, filed on Aug. 31, 1993, now Pat. No. 5,680,633.

(51) Int. Cl.
*G05F 1/32* (2006.01)
*G06F 1/16* (2006.01)
*G06Q 10/00* (2006.01)
*G07F 7/02* (2006.01)
*G07G 1/00* (2006.01)

(52) U.S. Cl. .................................. 709/230; 709/249
(58) Field of Classification Search .................. None
See application file for complete search history.

(56) References Cited

U.S. PATENT DOCUMENTS 4,449,248 A   5/1984   Leslie et al.

| 4,734,694 A | 3/1988 | Umetsu et al. |
| 4,745,408 A | 5/1988 | Nagata et al. |
| 4,799,253 A | 1/1989 | Stern et al. |
| 4,809,257 A | 2/1989 | Gantenbein et al. |
| 4,857,915 A | 8/1989 | Andros et al. |
| 4,903,319 A | 2/1990 | Kasai et al. |
| 4,964,121 A | 10/1990 | Moore |
| 4,977,611 A | 12/1990 | Maru |
| 4,989,230 A | 1/1991 | Gillig |
| 5,027,428 A | 6/1991 | Ishiguro et al. |
| 5,058,023 A | 10/1991 | Kozikaro |

(Continued)

FOREIGN PATENT DOCUMENTS

| EP | 0 490 441 A2 | 6/1992 |
| GB | 2250892 | 6/1992 |
| JP | 61-174743 | 8/1986 |
| JP | 62-37008 | 8/1994 |
| WO | WO 92/02084 | 2/1992 |

OTHER PUBLICATIONS

Nix et al, "High Speed Data Transmission Formats for Radio LANs", Radio LANs, IEE Colloquium on May 7, 1992 pp. 3/1–3/6.*

(Continued)

*Primary Examiner*—Charles Craver

(57) ABSTRACT

A portable data terminal includes at least two communication transceivers having different operating characteristics, one for conducting data communications on a wired subnetwork and one for conducting data communications on a wireless subnetwork. A communication processor converts data received by the communication transceivers to a predetermined format for a base module and converts data in a predetermined format from the base module to a format for transmission by a selected one of the first and second communication transceivers, thereby isolating the base module from differing characteristics of the transceivers. The communication processor is arranged to relay communications received by one transceiver for re-transmission by the other transceiver and to transfer communications from one subnetwork to the other, without activating the base module.

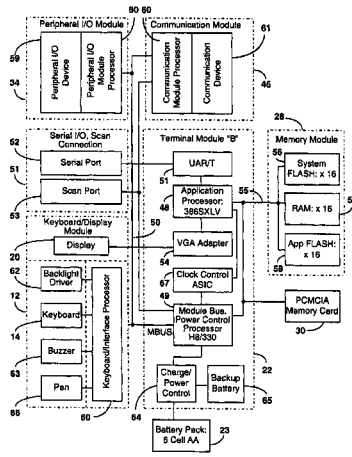

U.S. PATENT DOCUMENTS

| | | |
|---|---|---|
| 5,058,203 A | 10/1991 | Inagami |
| 5,093,926 A | 3/1992 | Sasuta |
| 5,103,459 A | 4/1992 | Gilhousen et al. |
| 5,117,449 A | 5/1992 | Metroka |
| 5,119,397 A | 6/1992 | Dahlin et al. |
| 5,128,938 A | 7/1992 | Borras |
| 5,142,279 A | 8/1992 | Jasinski et al. |
| 5,142,534 A | 8/1992 | Simpson et al. |
| 5,142,550 A | 8/1992 | Tymes |
| 5,146,214 A | 9/1992 | Yamada et al. |
| 5,150,361 A | 9/1992 | Wieczorek et al. |
| 5,203,020 A | 4/1993 | Sato et al. |
| 5,224,150 A | 6/1993 | Neustein |
| 5,224,152 A | 6/1993 | Harte |
| 5,241,542 A | 8/1993 | Natarajan et al. |
| 5,252,963 A | 10/1993 | Snowden et al. |
| 5,257,019 A | 10/1993 | Schwendeman et al. |
| 5,260,988 A | 11/1993 | Schellinger et al. |
| 5,274,666 A | 12/1993 | Dowdell et al. |
| 5,275,254 A | 1/1994 | Shiraishi et al. |
| 5,276,680 A | 1/1994 | Messenger |
| 5,285,208 A | 2/1994 | Bertiger |
| 5,301,225 A | 4/1994 | Suzuki et al. |
| 5,329,531 A | 7/1994 | Diepstraten et al. |
| 5,329,576 A | 7/1994 | Handforth |
| 5,331,634 A | 7/1994 | Fischer |
| 5,343,512 A | 8/1994 | Wang |
| 5,361,397 A | 11/1994 | Wright |
| 5,371,734 A | 12/1994 | Fischer |
| 5,371,898 A | 12/1994 | Grube et al. |
| 5,375,254 A | 12/1994 | Owen |
| 5,377,192 A | 12/1994 | Goodings et al. |
| 5,392,287 A | 2/1995 | Tiedemann, Jr. et al. |
| 5,420,911 A | 5/1995 | Dahlin et al. |
| 5,509,035 A | 4/1996 | Teidemann, Jr. et al. |
| 5,533,097 A | 7/1996 | Crane |
| 5,550,895 A | 8/1996 | Burson |
| 5,581,173 A | 12/1996 | Yalla et al. |
| 5,590,346 A | 12/1996 | West et al. |
| 5,649,308 A | 7/1997 | Andrews |
| 5,680,311 A | 10/1997 | Trsar et al. |
| 5,696,468 A | 12/1997 | Nise |
| 5,712,868 A | 1/1998 | Stern |
| 5,745,523 A | 4/1998 | Dent et al. |
| 5,757,239 A | 5/1998 | Gilmore |
| 5,825,253 A | 10/1998 | Mathe et al. |
| 5,910,752 A | 6/1999 | Filipovic et al. |
| 6,069,880 A | 5/2000 | Owen et al. |
| 6,348,841 B1 | 2/2002 | See |
| 6,359,872 B1 | 3/2002 | Mahany et al. |
| 6,374,311 B1 | 4/2002 | Mahany et al. |
| 6,522,871 B1 | 2/2003 | Patrick et al. |
| 6,583,675 B2 | 6/2003 | Gomez |
| 6,593,826 B2 | 7/2003 | See |
| 6,694,129 B2 | 2/2004 | Peterzell et al. |
| 6,714,983 B1 | 3/2004 | Koenck et al. |
| 6,731,146 B1 | 5/2004 | Gallardo |
| 6,764,983 B1 | 7/2004 | Hammond et al. |
| 6,819,197 B2 | 11/2004 | Maldonado |
| 6,823,033 B2 | 11/2004 | Fahim |
| 6,888,913 B2 | 5/2005 | Walker |
| 6,911,856 B2 | 6/2005 | Florescu |
| 6,928,275 B1 | 8/2005 | Patrick et al. |
| 6,937,872 B2 | 8/2005 | Krasner |

OTHER PUBLICATIONS

Respondent Qualcomm Incorporated's Notice Of Prior Art, with Exhibits A & D attached thereto, Nov. 15, 2005.

Qualcomm's Response To Interrogatory 3, with Exhibits B & C attached thereto, Aug. 16, 2005.

"Cellular System Dual–Mode Mobile Station—Base Station Compatibility Standard," EIA/TIA Interim Standard, IS–54, May 1990.

"Change Request 05.02–11," Recommendation GSM 05.02, v. 3.3.0, Jun. 22, 1989.

"Change Request 05.02–14," Recommendation GSM 05.02, v. 3.3.0, Nov. 28, 1989.

"Covering Note To Draft Rec. GSM 01.04.Version 2.00.01—Vocabulary In A GSM PLMN," GSM 01.04 v.2.00.01, Sep. 28, 1990.

"Discontinuous Reception (DRX) in the GSM System," Recommendation GSM 03.13, v 3.0.2, Jan. 15, 1990.

"European Digital Cellular Telecommunications System (Phase 1), Network Functions," GSM 03.01 v 3.3.1, Feb. 1992.

"European Digital Cellular Telecommunications System (Phase 2), Discontinuous Reception (DRX) In The GSM System," GSM 03.13, v. 4.0.1, Jul. 1, 1993.

"European Digital Cellular Telecommunications System (Phase 2), Functions Related To MS In Idle Mode," GSM 03.22, Version 4.4.0, Jun. 25, 1993.

"European Digital Cellular Telecommunications System (Phase 2), Mobile Stations (MS) Features," GSM 02.07, Oct. 1993.

"European Digital Cellular Telecommunications System (Phase 2), Mobile Stations Features," GSM 02.07, v. 4.4.1, Jun. 7, 1993.

"Man–Machine Interface Of The Mobile Station," Recommendation GSM 02.30, v 3.5.0, Mar. 1990.

"Mobile Station Features," Recommendation GSM 02.07, v 3.4.0, Jan. 1991.

"Mobile Station Features," Recommendation GSM 02.07, v. 3.3.0, Mar. 1990.

"Mobile Station Features," Recommendation GSM 02.07, v. 3.4.1, Feb. 1992.

"Mobile Station Features," Recommendation GSM 02.07, v. 3.4.1, Apr. 1991.

"MS–BSS Interface Date Link Layer Specification," Recommendation GSM 04.06, v. 3.6.0, 1992.

"Multiplexing And Multiple Access On The Radio Path," GSM Recommendation 05.02, v. 3.4.1, Jan. 1990.

"Outline Of Idle Mode Tasks, GSM Recommendation" 03.22, v. 1.0.1, May 23, 1991.

"Physical Layer On The Radio Path: General Description," Change Request 05.02–2, Recommendation GSM 05.01, v. 3.3.0, Nov. 17, 1989.

"Physical Layer On The Radio Path: General Description," GSM 05.01, v. 3.2.0, May 1988.

"Programme Management Review, GSM Action Plan, Review 18" ETS/GSM 23, Jun. 5, 1989.

"Proposed EIA/TIA Interim Standard, Wideband Spread Spectrum Digital Cellular System Dual–Mode Mobile Station—Base Station Compatibility Standard," EIA/TIA/IS–95, Apr. 21, 1992.

"Security Related Network Functions," Recommendation GSM 3.20, v. 3.3.2, Jan. 1991.

"SIM, Functional Characteristics," Recommandation GSM 02.17, v. 3.2.0, Mar. 1990.

Cellular Digital Packet Data System Specification Overview.
Cellular Digital Packet Data System Specification Preliminary Release 0.8—Book 1, Mar. 19, 1993.

Cellular Digital Packet Data System Specification Preliminary Release 0.8—Book II, Mar. 19, 1993.
Cellular Digital Packet Data System Specification Preliminary Release 0.8—Book III, Mar. 19, 1993.
Cellular Digital Packet Data System Specification Release 0.3 Preliminary Working Draft, Dec. 28, 1992.
Cellular Digital Packet Data System Specification Release 0.8—Book IV, Mar. 19, 1993.
Cellular Digital Packet Data System Specification Release 0.8—Book V, Mar. 19, 1993.
Cellular Digital Packet Data System Specification Release 0.9—Preliminary Draft, N/A, Apr. 30, 1993.
Cellular Digital Packet Data System Specification Release 1.0—Book II, Jul. 19, 1993.
Cellular Digital Packet Data System Specification Release 1.0—Book III, Jul. 19, 1993.
Cellular Digital Packet Data System Specification Release 1.0—Book IV, Jul. 19, 1993.
Cellular Digital Packet Data System Specification Release 1.0—Book V, Jul. 19, 1993.
Cellular Digital Packet Data System Specification Release 1.0—Book I, Jul. 19, 1993.
Cellular Digital Packet Data System Specification Release 1.1—Book 1, 1995 CDPD Forum, Inc., Jan. 19, 1995.
Cellular Digital Packet Data System Specification Release 1.1—Book 2, 1995 CDPD Forum, Inc., Jan. 19, 1995.
Cellular Digital Packet Data System Specification Release 1.1—Book 3, 1995 CDPD Forum, Inc., Jan. 19, 1995.
Cellular Digital Packet Data System Specification Release 1.1—Book 4, 1995 CDPD Forum, Inc., Jan. 19, 1995.
Cellular Digital Packet Data System Specification Release 1.1—Book 5, 1995 CDPD Forum, Inc., Jan. 19, 1995.
Cellular Digital Packet Data System Specification Release 1.1—Book 6, 1995 CDPD Forum, Inc., Jan. 19, 1995.
Cellular Digital Packet Data System Specification Release 1.1—Book 7, 1995 CDPD Forum, Inc., Jan. 19, 1995.
Cellular Digital Packet Data System Specification Release 1.1—Book 8, 1995 CDPD Forum, Inc., Jan. 19, 1995.
Change Request to Specification GSM 02.11 Service Accessibility GSM 02.11, v 4.4.0, Feb. 11, 1993.
GSM Program Management Information, GSM 87/88, Apr. 22, 1988.
"Mobile Radio Interface Layer 3 Specification," Recommendation GSM 04.08, v. 3.3.1, Apr. 1989.
"Subscriber Identity Modules, Functional Characteristics," Recommendation GSM 02.17, v. 3.2.0, Mar. 1990.
Technical Manual Callmaster/Smart MT–270, 1982.
"Man–Machine Interface Of The Mobile Station," GSM 02.30 v. 3.9.0, Feb. 1992, QBB155113–155137.
"Mobile Station Features," Recommendation GSM 4.4.2, Oct. 1993.
"Random Access Procedures," GSM 04.06, v. 3.6.0, 1992.
Release Note, Recommendation GSM 03.20, Security Related Network Functions, v. 3.3.2, Jan. 1991.
Release Note, Recommendation, Mobile Station Features, GSM 02.07, v. 3.3.0, Mar. 1990.
Release Note, Recommendation, Man–Machine Interface of The Mobile Station, GSM 02.30, v. 3.5.0, Mar. 1990.
Balston, Cellular Radio Systems, 1993.
Broadcom's Third Supplemental Objections and Responses To Qualcomm's First Set Of Interrogatories (1–53), Dec. 29, 2005.
Cellular Digital Packet Data System Specification Release 1.0—Book 1, N/A, Jul. 19, 1993.
Change Request (Phase 2) Nos. 17, Tdoc GSM 195/93, Feb. 1992, Bates Nos. QBB222315–319.
ESTI Radio Equipment And Systems (RES); Digital Equipment Cordless Telecommunications (DECT) Common Interface Part 1: Overview, ETS 300 175–1, Oct. 1, 1992.
ESTI Radio Equipment And Systems (RES); Digital Equipment Cordless Telecommunications (DECT) Common Interface Part 2: Physical Layer, ETS 300 175–2, Oct. 1, 1992.
ESTI Radio Equipment And Systems (RES); Digital Equipment Cordless Telecommunications (DECT) Common Interface Part 3: Medium Access Control Layer, ETS 300 175–3, Oct. 1, 1992.
ESTI Radio Equipment And Systems (RES); Digital Equipment Cordless Telecommunications (DECT) Common Interface Part 4: Data Link Control Layer, ETS 300 175–4, Oct. 1, 1992.
ESTI Radio Equipment And Systems (RES); Digital Equipment Cordless Telecommunications (DECT) Common Interface Part 6: Identities And Addressing, ETS 300 175–6, Oct. 1, 1992.
ESTI Radio Equipment And Systems (RES); Digital Equipment Cordless Telecommunications (DECT) Common Interface Part 7: Security Features, ETS 300 175–7, Oct. 1, 1992.
ESTI Radio Equipment And Systems (RES); Digital Equipment Cordless Telecommunications (DECT) Common Interface Part 8: Speech Coding And Transmission, ETS 300 175–8, Oct. 1, 1992.
ESTI Radio Equipment And Systems (RES); Digital Equipment Cordless Telecommunications (DECT) Common Interface Part 9: Public Access Profile, ETS 300 175–9, Oct. 1, 1992.
General on Terminal Adaptation Functions For The MSs, GSM 07.01 v 3.14.0, Apr. 1, 1992.
GSM PLMN Connection Types, GSM 03.10 v 3.3.0, Feb. 1992.
Lee, Mobile Cellular Telecommunications Systems, 1989, Bates Nos. QBB147008–463.
Mobile Radio Interface Layer 3 Specification, GSM 04.08 v 4.2.0, Oct. 1992, Bates Nos. QBB479485–977.
Mobile Radio Interface Layer 3 Specification; Core Network Protocols; Stage 3, ETSI TS 124008 v. 5.3.0, 2002.
Mobile Station—Land Station Compatibility Specification, EIA/TIA/553, Sep. 1, 1989.
Mobitex Operators Association, "Mobitex Terminal Specification To Be Used With Cantle Mobitex Radio Network Issue R1A 8000 bps," Feb. 23, 1990.
Mouly, The GSM System For Mobile Communications, 1992.
MS–BSS Interface—General Aspects And Principles, GSM 04.01 v 3.0.01, Feb. 1992, Bates Nos. QBB155196–155206.
Mobitex Operators Association, "Addendum Battery–Saving Protocol for Portable Terminals," Aug. 17, 1990.
Network Functions, GSM 03.01 v 3.0.0, Feb. 1992, Bates Nos. QBB155138–155152.
Radio Data Link Access Procedure published by Motorola, Mar. 1991.
Radio Equipment And Systems (RES); Digital ESTI Radio Equipment And Systems (RES); Digital Equipment Telecommunications (DECT) Common Interface Part 5: Network Layer, ETS 300 175–5, Oct. 1, 1992.
Notice Regarding Issuance Of Initial Determination And Recommended Determination On Remedy And Bond, Oct. 10, 2006.

Recommended Minimum Performance Standards For 800 MHz Dual mode Mobile Stations, EIA/TIA/IS–55, Dec. 1, 1991, Bates Nos. QBB149924–150025.
Service Accessibility—Change Request, GSM 02.11 v 3.6.0, Jan. 14, 1992.
Service Accessibility—Change Request, GSM 02.11 v 4.0, Feb. 6, 1992.
Service Accessibility—GSM 02.11 v 4.3.0, Oct. 1992.
Service Accessibility—GSM 02.11 v 4.5.0, Apr. 1993, Bates Nos. QBB153507–515.
Service Accessibility, ETSI TS 122 011 v 6.4.0, Jun. 2004.
Speech Processing Functions: General Description, GSM 06.01 v 3.0.0, Feb. 1992.
Technical Manual Callmaster IMTS Series: MT–200 & MT–300, 1982.
Technical Realization Of The Short Message Service—Point–to–Point, GSM 03.40, v. 3.5.0, Feb. 1992.
Types Of Mobile Stations, GSM 02.06 v 3.2.0, Feb. 1992.
Posthearing Brief Of The Commission Investigative Staff, United States International Trade Commission, Apr. 3, 2006.
Rebuttal Expert Report Of Ray Nettleton Regarding Validity Of U.S. Patent Nos. 6,714,983 and 6,374,311 (redacted version), Dec. 15, 2005.
Invalidity Expert Report Of Dr. John Proakis (redacted version), Dec. 5, 2005.
Mobitex System Description MTS02.1, Feb. 19, 1990.
Mobitex Network Layer for Terminals Appendix B MTS09A.2, Feb. 19, 1990.
GSM 07.01 v 3.13.0, updated version, Apr. 1992.
Qualcomm Incorporated's Sixth Supplemental Objections And Responses To Complainant's First Set Of Interrogatories (Nos. 1–15), Dec. 9, 2005.
Second Supplemental Expert Report Of Dr. John Proakis (redacted version), Feb. 9, 2006.
Expert Report of Duane Rabe, Mar. 14, 2008.
Initial Expert Report of Tim A. Williams, Ph.D., Mar. 14, 2008.
Fisher, "Dual mode mobile unit for next generation digital narrow channel cellular telephone system," $38^{th}$ IEEE Vehicular Tech. Conf., pp. 543–547, 1988.
Decision of Appeals 2007–1493, –1494, –1495, –1496, –1497, –1498, –1499, –1514, –1573, 2008–1004, –1009, –1010, –1012, –1013, –1015, –1018, –1019 in the United States Court of Appeals for the Federal Circuit, *Kyocera Wireless Corporation, et al.* v. *International Trade Commission and Broadcom Corporation,* On appeal from the United States International Trade Commission In Investigation No. 337–TA–543, Decided Oct. 14, 2008.
"A New Chapter In Wireless Communication And Email," Electronic Messaging News, vol. 3, No. 24, Nov. 27, 1991.
"AMDC Extends RFP Deadline To Mar. 10; Waiver Decision Expected At FCC's March Meeting," Industrial Communications, No. 7, Feb. 17, 1989.
"AMDC Picks Ericsson Gear," Communications Week, vol. 252, p. 44, Jun. 12, 1989.
"An Effective Prioritization Scheme For Handovers In Cellular Networks," IEEE–ICUPC '92 Proceedings, pp. 364–368, Sep. 29, 1992–Oct. 2, 1992.
"Ardis Links With NCR Notepad Dec. 11, 1991," Newsbytes, Dec. 11, 1991.
"Ardis To Face Competition From RAM," Newsbytes, Feb. 5, 1991.

"Automation In Warehousing," Proceedings Of The $8^{th}$ International Conference, Tokyo, Japan, pp. 1–355, Oct. 6–8, 1987.
"Autonomous Radio Stations Possible Over Mobitex," Industrial Communications, No. 48, Dec. 9, 1988.
"Bean Bullish On Growth Of Mobile Data In New Future," Industrial Communications, No. 7, p. 8, Feb. 15, 1991.
"Bellsouth Buys Into Ram's Nationwide Mobile Data Network," Industrial Communications, No. 42, Oct. 18, 1991.
"BellSouth Has Option To Buy RAM Oct. 11, 1991," Newsbytes, Oct. 11, 1991.
"BellSouth RAM In Joint Venture," BOC Week, vol. 8, No. 40, p. 12, Oct. 21, 1991.
"Bellsouth, RAM To Form Mobile Communications Joint Venture," PR Newswire, p. 1, Oct. 10, 1991.
Briefing Document For The Design Of The Diplema Messager MMI, Mar. 1989.
"Broadband Lan Technology," 1988.
"BT Opens New Service Center," Communications Week, p. 25, Nov. 11, 1991.
"Business Plan Appendix IV—Financial Projections", Nov. 1, 1990.
"C Business Plan" Cognito Group Limited, Nov. 1, 1990.
"C Business Plan," Cognito Group Limited, Apr. 1990.
"Canadian Cellular Industry (the)—Industry Report," First Marathon Securities Ltd. Industry Report, Investext Report No. 1154903, p. 30, Oct. 25, 1991.
"Cantel To Launch Mobile–Data And Paging Networks," The Gazette, Montreal Quebec, p. D1, May 10, 1989.
"Cellular System Mobile Station—Land Station Compatibility Specification," Office Of Science Technology Bulletin No. 53, Jul. 1983.
"Coded First To Jump On Mobitex Equipment Bandwagon; Sees Data Licenses As Worth As Much As Cellular," Industrial Communications, No. 22, Jun. 9, 1989.
"Communications Personals," Communications Daily, vol. 11, No. 28, Feb. 11, 1991.
"Complexity, High Price Keep Some Customers Away: Mobile Datacoms Taxes Users," Communications Week International, p. 20, Apr. 1, 1991.
"Consolidation, New Ventures Going Full Speed Ahead In All Markets," Industrial Communications, No. 36, p. 1, Oct. 6, 1989.
"Cutting The Ties That Bind," InformationWeek, vol. 314, pp. 25–30, Apr. 1, 1991.
"DEC On Move: Teaming With Ericsson In Mobile Data Market," Communications Week International, p. 1, Mar. 18, 1991.
"DEC Targets Mobile Data Market," Communications Week International, p. 9, Mar. 18, 1991.
"DEC–Ericsson Agreement," Communications Week, p. 25, Nov. 11, 1991.
"Descriptive Air Interface Protocol," Cognito Group Limited, V. 6.0, Aug. 19, 1991.
"Digital And Ericsson To Co–Operate On Mobile Data," Exchange, vol. 3, No. 42, Nov. 1, 1991.
"Editorial: Telecom Trends," Newsbyte News Network, Dec. 24, 1991.
"Ericsson—Company Report First Boston Corporation (The)," Investext Report No. 813838, p. 9, Jun. 10, 1988.
"Ericsson—Company Report: Hoare Govett Investment Research Ltd," Investext Report No. 1039045, p. 22, Oct. 1, 1990.

"Ericsson—Company Report: Prudential Securities Inc.," Investext Report No. 1001955, p. 10, Mar. 19, 1990.

"Ericsson—Company Report: Svenska International PLC", Ericsson Company Report, Svenska International PLC, Investext Report No. 1142535, p. 2, Oct. 4, 1991.

"Ericsson (L.M.) (Telefon A/B)—Company Report: FT Analysis," Ericsson (L.M.) (Telefon A/B) Company Report FT Analysis , Investext Report No. 6027183, p. 3, Nov. 19, 1991.

"Ericsson And Digital Cooperate On Mobile Communications," Newsbyte News Network Oct. 8, 1991, Newsbytes, Oct. 8, 1991.

"Ericsson And Digital Cooperated In Mobile Data," Business Wire, San Francisco, p. 1, Oct. 7, 1991.

"Ericsson And GE And Speedwing Mobile Communications Team Up To Bring Mobile Data Communications To Airports Worldwide," Business Wire, San Francisco, p. 1, Sep. 17, 1991.

"Ericsson And GE Have Formed Joint Venture," Communications Daily, Aug. 28, 1989.

"Ericsson Announces Communications Software," Industrial Communications, No. 9, Mar. 1, 1991.

"Ericsson GE And Melard Technologies Announce A Strategic Alliance In Mobile Data Communications," Business Wire, San Francisco, p. 1, Sep. 30, 1991.

"Ericsson GE And Racotek Announce A Strategic Relationship For Mobile Data Communications," Business Wire, San Francisco, p. 1, Sep. 16, 1991.

"Ericsson GE And Racotek Inc. In Marketing Supply Deal," Alliance Alert–Medical Health, vol. 2, No. 10, Oct. 1, 1991.

"Ericsson GE And Speedwing Mobile Commun In Marketing Supply Deal," Alliance Alert–Medical Health, vol. 2, No. 10, Oct. 1991.

"Ericsson GE Awarded $11.6 Million Contract From The U.S. Navy," Business Wire, San Francisco, p. 1, Nov. 10, 1993.

"Ericsson GE Awarded Contract From The City Of Richardson, Texas," Business Wire, San Francisco, p. 1, Oct. 1, 1991.

"Ericsson GE In Development Deal With Anterior And RIM," Newsbyte News Network, Nov. 20, 1991.

Ericsson GE In Joint Ventures To Develop Wireless E–Mail, Telecommunications Alert, vol. 8, No. 38, Nov. 19, 1991.

"Ericsson GE Mobile Communications New R&D Center Begins Operations In North Carolina," Business Wire, San Francisco, p. 1, Nov. 27, 1990.

"Ericsson GE Mobile Communications Opens Research And Development Center In North Carolina," Business Wire, San Francisco, p. 1, May 1, 1990.

"Ericsson GE Mobile Communications To manage Its Worldwide Cellular Telephone Business From RTP, N.C.," Business Wire, San Francisco, p. 1, Apr. 24, 1991.

"Ericsson GE Mobile Data And BRM Mobile Data Sign Agreements With GE Consumer Service," News Release, p. 1, Jul. 25, 1991.

"Ericsson GE Mobile Data And RAM Mobile Data Sign Agreements With GE Consumer Services," Business Wire, San Francisco, p. 1, May 9, 1991.

"Ericsson GE, Anterior Technology & Research In Motion (RIM)—Announce Wireless Access For E–Mail Users," News Release, p. 1, Nov. 18, 1991.

"Ericsson Gets $55M Pact for Cellular Radio Data Gear", Electronic News (1991), p. 19, Jun. 12, 1989.

"Ericsson Has Data Unit" Communications Week, p. 8, Jan. 8, 1990.

"Ericsson Mobile Data Formed In New Jersey," Communications Daily, Jan. 5, 1990.

"Ericsson Signs $55 Million Agreement With RAM Broadcasting For Mobile Data Network," Industrial Communications, No. 20, Jun. 2, 1989.

"Ericsson To Introduce Radio Modem Next Month," Telecommunications Alert, vol. 8, No. 56, Dec. 17, 1991.

"Ericsson/GE Announces New Agreements," Industrial Communications, No. 40, Oct. 4, 1991.

"Ericsson: Breakthrough $55 Million Agreement For Mobile Data Network In U.S.A.," Edge, vol. 4, No. 64, Jun. 12, 1989.

"Ericsson's Mobitex Mobile Data System Is Chosen By Cantel For Nationwide Public Mobile Data Service In Canada," News Release, Ericsson (LM) Telephone, p. 1, Dec. 1, 1988.

"FCC Calendar Of Events For The Week Of Feb. 11," FCC Daily Digest, vol. 10, No. 27, Feb. 8, 1991.

"IBM, Motorola Join Networks Forming 2–Way Data Offering," Industrial Communications, No. 5, p. 1, Feb. 2, 1990.

"Industry Briefs," Network World, vol. 8, No. 41, pp. 9, 11, Oct. 14, 1991.

Lead Story #2: Swedish Government Picks Magnovox AVL For Upcoming Trials, Inside IVHS, vol. 1, No. 3, Feb. 4, 1991.

"Minigrams," Computergram International, No. 1805, CGI11150023, Nov. 15, 1991.

"Mobidata And Cantel Set To Complete In Digital Mobile Data Market," Common Carrier Week, vol. 6, No. 21, May 22, 1989.

"Mobile Data Communications—A New Market," News Release, p. 1, Jul. 3, 1987.

"Mobile Data Communications: Erickson GE & Racotek In Strategic Relationship," Edge, vol. 6, No. 165, p. 6, Sep. 23, 1991.

"Mobile Data Communications: Ericsson GE & Racotek In Strategic Relationship," Edge, vol. 2, No. 70, p. 21, Sep. 23, 1991.

"Mobile Move," CommunicationsWeek International, No. 73, p. 3, Nov. 4, 1991.

"Mobile Users Get Electronic Mail Link (Anterior Technology)," Communications International, Dec. 13, 1991, No. 1823, CGI12120016.

"Motorola Inc.—Company Report: Kidder, Peabody & Company, Inc.," Investext Report No. 1011254, p. 2, May 15, 1990.

"MTEL WOOS FCC For Two–Way Data Net At 930–931 MHz," Industrial Communications, No. 47, Nov. 22, 1991.

"Multi–Channel Land Mobile Systems For Dispatch Traffic (With Or Without PSTN Interconnection)," ITU–R—International Telecommunication Union/ITU Radiocommunication Sector, Report No. 741–3, pp. 142–153, 1990.

"National Car Rental Chooses RAM For Data Network Services," Industrial Communications, VIS24, Jun. 14, 1991.

"National Mobile Data Network Sends Out Request For Information; Dream System In Mind Already," Industrial Communications, Oct. 21, 1988.

"Noise–Free Data Nets Introduced," Telecommunications Alert, vol. 8, No. 7, Jul. 1990.

"Nokia—Line of Business Classification," Annual Report, 1987.

"Nordic Monthly—Geographic Report: Svenska International PLC," Investext Report No. 1142734, p. 6, Oct. 1, 1991.

"Northern Indiana Public Service Company Selects $10 Million Ericsson GE Communications System," News Release, p. 1, Nov. 11, 1991.

"Other Manufactures Developing Compatible Hardware," Industrial Communications, No. 48, Dec. 9, 1988.

"Radio–Linked Network To Be Offered To Airlines Sep. 19, 1991," Newsbytes, Inc., Sep. 19, 1991.

"RAM Adds Customers To Mobile Data Network," Industrial Communications, No. 14, Apr. 5, 1991.

"RAM Mobile Data And Ericsson GE Mobile Data Announce Agreements With Sears Business Centers," News Release, p. 1, Mar. 26, 1991.

"RAM Mobile Data Launches Network With Transcontinental Message," News Release, p. 1, Feb. 20, 1991.

"Ram Signs GE Consumer Service To A Pilot Test On its Data Network," Industrial Communications, No. 19, May 10, 1991.

"Sales Decline: Ericsson 9–Month Net Off 53%", Electronic News, vol. 37, Issue 18, 1991.

"Sears Business Centers To Market RAM's Mobile Data Network," Industrial Communications, No. 13, Mar. 29, 1991.

"Sears Inks Pacts With Ericsson, RAM Mobile Data," Computer Reseller News, 102, Issue 418, p. 1–2, Apr. 29, 1991.

"Service," Industrial Communications, No. 48, Dec. 9, 1988.

"Simware And Ram Mobile Data Network Sign Strategic Marketing Agreement," News Release, p. 1, Oct. 7, 1991.

"Smith Barney's Morning Call—Topical Report Smith Barney, Harris Upham & Co.," Investext Report, No. 1145237, p. 3, Oct. 11, 1991.

Wepman et al., "Spectrum Usage Measurements In Potential PCS Frequency Bands," IEEE—ICUPC '92 Proceedings, pp. 10–15, Sep. 29, 1992–Oct. 2, 1992.

"Strategic Agreement: Simware & Ericsson GE In Strategic Marketing Agreement For Laptop Computer Access To Corporate Mainframes," Edge, vol. 6, No. 169, p. 17, Oct. 21, 1991.

"Supporting Research And Advanced Development," NASA Space Programs Summary 37–48, vol. III, Jet Propulsion Laboratory, pp. 1–291, Dec. 31, 1967.

"Sweden Launches The World's First Public Radio Telecommunication Network For Text, Speech And Data," Newswire, Trade Publication, Industrial News Service, Feb. 24, 1987.

"Swedish Road Administration To Try Out Vehicle Location System," Industrial Communications Trade Publication, No. 14, Apr. 5, 1991.

"Swedish Telecom Mobitex System Eases Module Frequency Congestion," Communications News, vol. 22, No. 4, p. 135, Apr. 1985.

"The Messenger MMI Specification," Mar. 1990.

Parsa, "The Mobitex Packet–Switched Radio Data System," IEEE, pp. 534–538, Jul. 1992.

"The OSPF Specification," Oct. 1989.

Bertoni et al., "Theoretical Prediction Of Slow Fading Statistics in Urban Environments," IEEE—ICUPC '92 Proceedings, pp. 1–4, Sep. 29, 1992–Oct. 2, 1992.

"Third–Quarter Losses Prompt Sizable Ericsson Layoffs," Industrial Communications, No. 47, Nov. 22, 1991.

Devasirvatham et al., "Two Frequency Radiowave Propagation Measurements in Brooklyn," IEEE—ICUPC '92 Proceedings, pp. 23–27, Sep. 29, 1992–Oct. 2, 1992.

"U.K. Mobile Data Licenses Granted," Communications Week International, No. 36, p. 18, Feb. 26, 1990.

"U.S. Army Selects Digitally Associated Trunked Communications System For Training Centers," News Release, p. 1, Oct. 1, 1991.

"Update On Ardis–Mobitex Radio Modem Competition," Newsbytes, Inc., Oct. 2, 1991.

Xia et al., "Urban And Suburban Microcellular Propagation," IEEE—ICUPC '92 Proceedings, pp. 5–9, Sep. 29, 1992–Oct. 2, 1992.

"Vandals Wreck Cardphones To Increase Booty From Payphones," Europe 2000—Communications & Information Technology, vol. 3, No. 7, Sep. 1991.

"Vehicle Tracking And Communication Joint Venture," PRS Automotive Service, Aug. 22, 1991.

"Why Did Ericsson Pick Up The Long–For–Sale GE Subsidiary?," Mobile Phone News, vol. 7, No. 18, Aug. 31, 1989.

"Wireless Data: The Next Frontier For Cellular," Mobile Phone News, vol. 9, No. 24, pp. 4–6, Dec. 5, 1991.

"Wireless World: Ericsson GE Enters Lockdown Matrix With Mobile Digital Telephone," Business Wire, San Francisco, p. 1, Oct. 7, 1991.

"Wireless World: Ericsson GE In Lockdown Matrix With Mobile Digital Telephone," Edge, vol. 6, No. 167, p. 29, Oct. 7, 1991.

"Wireless World: Ericsson GE, Anterior Technology & Research In Motion Announced Wireless Access For E–Mail Users," Business Wire, San Francisco, p. 1, Nov. 18, 1991.

"Wireless World: Ericsson GE, Anterior Technology & Research In Motion (RIM) Announce Wireless E–mail," Edge, vol. 6, No. 174, p. 4, Nov. 25, 1991.

"Year's Biggest Stories Land In Personal Communications, Spectrum (Part 1)" Industrial Communications, No. 1, Jan. 4, 1991.

Abowd et al., "Cyberguide: A Mobile Context–Aware Tour Guide," Wireless Networks, vol. 3, pp. 421–433, 1997.

Afek et al., "End–To–End Communication In Unreliable Networks," Proceedings Of The 7th Annual ACM Symposium On Principles Of Distributed Computing (Toronto, Ontario, Canada), pp. 131–148, 1988.

Aguirre et al., "Signal Strength Measurements At 915 MHz and 1920 MHz In An October Microcell Environment," IEEE—ICUPC '92 Proceedings, pp. 16–22, Sep. 29, 1992–Oct. 2, 1992.

Olmos et al., "Performance Analysis Of A Second Order Delay–Lock Loop With Application To A CDMA System With Multipath Propagation," IEEE—ICUPU '92 Proceedings, pp. 209–213, Sep. 29, 1992–Oct. 2, 1992.

Akaiwa et al., "The Channel Segregation, A Self–Organized Dynamic Channel Allocation Method: Application to TDMA/FDMA Microcellular System," IEEE—ICUPU '92 Proceedings, pp. 346–349, Sep. 29, 1992–Oct. 2, 1992.

Alfano et al., "UPT Supplementary Services European Standards Scenario," IEEE—ICUPU '92 Proceedings, pp. 69–73, Sep. 29, 1992–Oct. 2, 1992.

Ameden, "Activities Of The Cellular Telecommunications Industry Association Microcell/Microsystems Subcommittee Regarding Microcell Technology," IEEE—ICUPC '92 Proceedings, pp. 147–150, Sep. 29, 1992–Oct. 2, 1992.

Aoki, "Improved Output Spectrum Of Linearized Class–F Power Amplifier For Digital Cellular Mobile Communcations," IEEE—ICUPU '92 Proceedings, pp. 195–198, Sep. 29, 1992–Oct. 2, 1992.

Arndt et al., "International Standards On Universal Personal Telecommunications: State Of The Art And Future Projections," IEEE—ICUPU '92 Proceedings, pp. 59–63, Sep. 29, 1992–Oct. 2, 1992.

Assarsson, "Technology, Know–How And Teamwork—The Vital Circle In a Ro–Ro Port," Report No. 0–904930–27–0, pp. 138–142, 1984.

Badrinath et al., "Designing Distributed Algorithms For Mobile Computing Networks," Proceedings Of The Second Workshop On The Management Of Replicated Data Rutgers University, pp. 1–13, 1994.

Badrinath et al., "To Send Or Not To Send: Implementing Deferred Transmission In Mobile Host," ICDCS, Hong Kong, pp. 1–7, Jun. 1996.

Balakrishnan et al., "Improving Reliable Transport And Handoff Performance In Cellular Wireless Networks," Wireless Networks, vol. 1, pp. 469–481, 1995.

Bart, "Vendors Join The Wireless Bandwagon," Communications International, vol. 18, No. 19, p. 25, Oct. 1991.

Bartoli, "Group–Based Multicast And Dynamic Membership In Wireless Networks With Incomplete Spatial Coverage," Mobile Networks And Applications 3, pp. 175–188, 1998.

Bean, "Paging At The Crossroads—Industry Report," Arthur D. Little Decision Resources, Inc., Investext Report No. 1111592, pp. 5–6, Jun. 27, 1990.

Bedingfield, "On The Concept Of A Service Host For Personal Communications Services," IEEE—ICUPC '92 Proceedings, Sep. 29, 1992–Oct. 2, 1992, IEEE—ICUPC '92 Proceedings, pp. 314–318, Sep. 29, 1992–Oct. 2, 1992.

Berkman, "Ericsson Is Restructuring To Adapt To A Deregulated Global Market," Electronic Business, vol. 17, No. 2, pp. 34–38, Jan. 21, 1991.

Berntson, "Mobitex—A New Network For Mobile Data Communications," Ericsson Review, vol. 66, Issue 1, p. 33, 1989, Bates Nos. QBB151463–151469.

Biba, "A Hybrid Wireless MAC Protocol Supporting Asynchronous And Synchronous MSDU Delivery Services," IEEE 802. 11/91–92, Sep. 1991.

Binkley et al. "Authenticated Ad Hoc Routing At The Link Layer For Mobile Systems," Wireless Networks, vol. 7, 1999.

Blankenhorn, "PacTel Cellular Introduces Microcells In Los Angeles", Newsbytes, Inc., Oct. 2, 1991.

Blazević et al., "Self–Organizing Wide–Area Routing," Proc. Of SCI, pp. 1–8, 2000.

Boncompagni et al., "Comments: Telecom Leaders From Around The World Reveal their Plans For The Future," Telephony, vol. 216, No. 9, p. 28, Feb. 27, 1989.

Booker, "Cellular Modems Put The Office On The Road," Computerworld, vol. 25, No. 10, pp. 43–44, Mar. 11, 1991.

Booker, "Wireless Networks Create Tough Choices," Computerworld, vol. 25, No. 48, pp. 55–56, Dec. 2, 1991.

Borgman, "Telefonaktiebolaget Lm Ericsson—Company Report: Dillon, Read & Co.," Investext Report No. 1008947, p. 12, May 21, 1990.

Boyer, "An Analytical Comparison Of Block Error Rate Performance For Wireline Data Modulation Standards In A Variably Fading Ricean Analog Cellular Channel," IEEE—ICUPC '92 Proceedings, pp. 121–125, Sep. 29, 1992–Oct. 2, 1992.

Bragwad et al., "Advanced Intelligent Network Requirements For Personal Communications Services," IEEE—ICUPC '92 Proceedings, pp. 324–328, Sep. 29, 1992–Oct. 2, 1992.

Brodsky, "Wireless Data Networks And The Mobile Workforce," Telecommunications, vol. 24, No. 12, p. 31, Dec. 1990.

Brodsky, "Wireless MANs/WANs Offer 'Data To Go'," Business Communications Review, vol. 21, No. 2, p. 45–51, Feb. 1991.

Buck, "Tele–Trends—Industry Report, Donaldson, Lufkin & Jenrette Securities Corp.," Investext Report No. 814739, p. 8, Jun. 24, 1988.

Bulusu et al., "Scalable Coordination For Wireless Sensor Networks: Self–Configuring Localization Systems," Proceedings Of The 6th International Symposium On Communication Theory And Applications (ISCTA), pp. 1–6, Jul. 2001.

Bushaus, "GE, Ericsson In Cellular Pact," Telephony's AM Report, vol. 217, No. 10, p. 3, Aug. 28, 1989.

Cáceres et al., Fast And Scalable Wireless Handoffs In Support Of Mobile Internet Audio, Mobile Networks And Applications 3, pp. 351–363, 1998.

Cáceres et al., "The Effects Of Mobility On Reliable Transport Protocols," International Conference On Distributed Computing Systems, Nov. 1, 1993.

Cáceres et al., "Improving The Performance Of Reliable Transport Protocols In Mobile Computing Environments," IEEE Journal On Selected Areas In Communications, vol. 13, No. 5, pp. 1–10, Jun. 1995.

Calhoun, "Digital Cellular Radio," 1988.

Callendar, "Standards For Global Personal Communications Services," IEEE—ICUPC '92 Proceedings, pp. 163–167, Sep. 29, 1992–Oct. 2, 1992.

Camazza et al., "PCS Data Management In An Intelligent Network," IEEE—ICUPC '92 Proceedings, pp. 329–333, Sep. 29, 1992–Oct. 2, 1992.

Campbell et al., "A Cellular IP Testbed Demonstrator," Center For Telecommunications Research, Columbia Unversity, New York, pp. 1–4, 1999.

Carpintero et al., "Requirements For The Interconnection Of Base Stations In A Wireless System," IEEE—ICUPC '92 Proceedings, pp. 141–146, Sep. 29, 1992–Oct. 2, 1992.

Cellular Data Network Functional Specification Rev. 2.0.2, Oct. 5, 1992.

Chang, "Dispersive Fading Effects In CDMA Radio Systems," IEEE—ICUPC '92 Proceedings, pp. 185–189, Sep. 29, 1992–Oct. 2, 1992.

Chen et al., "Signaling System No. 7 Network Interconnect Impacts In Support Of Mobile Communications Services," IEEE—ICUPC '92 Proceedings, pp. 247–252, Sep. 29, 1992–Oct. 2, 1992.

Chuang, "Frequency Resue For Two Co–Existing TDMA Personal Communications Systems," IEEE—ICUPC '92 Proceedings, pp. 350–354, Sep. 29, 1992–Oct. 2, 1992.

Ciancetta et al., "Universal Personal Telecommunication Provision Within Intelligent Networks," IEEE—ICUPC 'pProceedings, pp. 319–323, Sep. 29, 1992–Oct. 2, 1992.

Connolly, "Mobile Data Mission," Communications, vol. 27, No. 8, pp. 41–48, Aug. 1990.

Coursey, Mobile Computing Matures: Radio Modems Will Let Portables Send, Receive E–Mail, InfoWorld, vol. 13, Issue 51, p. 28, 1991.

Craninckx et al., "Wireless CMOS Frequency Synthesizer Design," 1998.

Cunningham, "Rascal Telecom—Company Report Scrimgeour Vickers," Investext Report No. 908246, p. 4, Feb. 17, 1989.

Davis et al., "Filtered Spreading Sequences For Interference Avoidance," IEEE—ICUPC '92 Proceedings, pp. 54–58, Sep. 29, 1992–Oct. 2, 1992.

Didner, "Data Goes Mobile," Telephony, Mar. 11, 1991, vol. 220, No. 10, pp. 24–25.

Didner, "The Next Step In Mobile Communications," Telecommunications, Dec. 1990, vol. 24, No. 12, p. 48–50.

Dommety et al., "Flat Location Management Scheme For PCNs," 1997.

Dube et al., "Signal Stability Based Adaptive Routing (SSA) For Ad–Hoc Mobile Networks," IEEE Personal Communication, pp. 1–22, Aug. 26, 1996.

Duet, "An Assessment Of Duplexing Methods For The Radio Links Of Personal Communication Systems," IEEE—ICUPC '92 Proceedings, pp. 131–135, Sep. 29, 1992–Oct. 2, 1992.

Earnshaw, "The Topology Discovery Service," pp. 111–118, Feb. 18, 1993.

Edwards, "Simware Targets Software At RF Wireless Market," Computing Canada, vol. 17, No. 23, p. 53, Nov. 7, 1991.

Egan et al., "City Of Dallas Fire Department Purchases $4 Million Ericsson GE Communications System," Business Wire, San Francisco, Oct. 16, 1991.

Egan et al., "Ericsson And GE Form Mobile Communications Joint Venture," Business Wire, San Francisco, p. 1, Aug. 24, 1989.

Egan et al., "McCaw Cellular, LIN Broadcasting To Rebuild Cellular Systems In N.Y., N.J. Pacific Northwest With Ericsson GE Equipment," Business Wire, San Francisco, p. 1, Oct. 3, 1990.

Egan et al., "SaskTel Purchases New Ericsson GE Communications System To Serve Saskatchewan," Business Wire, San Francisco, p. 1, Oct. 23, 1991.

Egan, "Ericsson Signs Breakthrough Agreement For Mobile Data Network," Business Wire, San Francisco, p. 1, May 31, 1989.

Elson et al., "Fine–Grained Network Time Synchronization Using Reference Broadcasts," pp. 1–14, May 17, 2002.

Eng et al., "A Wireless Broadband Ad–Hoc ATM Local–Area Network," Wireless Networks 1, pp. 161–174, 1995.

Epstein, "Indigenous Switching," Industry Report: Arthur D. Little Decision Resources, Incorporated, Investex Report No. 938157, p. 6, Jul. 1, 1987.

Ergen et al., "MEWLANA—Mobile IP Enriched Wireless Local Area Network Architecture," Proc. Of IEEE Vehicular Technology Conference (Vancouver), vol. 4, pp. 2449–2453, Mar. 2002.

Fenner, Mobil Address Management And Billing For Personal Communications, IEEE—ICUPC '92 Proceedings, pp. 253–257, Sep. 29, 1992–Oct. 2, 1992.

Foyil, "Nokia—Company Report: UBS Phillips & Drew Global Research Group," Investext Report No. 1034219, p. 2, Oct. 8, 1990.

Frangini, "Rogers Cantel Lauches 'Public Access' Mobile Network," Computing Canada, vol. 16, No. 12, p. 53, Jun. 7, 1990.

Fraser, "The Mobitex Terminal Specification," Communications, vol. 28, No. 7, pp. 33–38, Jul. 1991.

Fraser, "The MTS—Part II," Communications, vol. 28, No. 8, pp. 52–55, Aug. 1991.

Fudge, "Third Generation Mobile Systems—What They Will Do And Who Decide," IEEE—ICUPC '92 Proceedings, pp. 433–442, Sep. 29, 1992–Oct. 2, 1992.

Gates, "Computers Enter The Wireless Age: New Technology Can Link Terminals Spanning Globe," Financial Post, p. 13, Jun. 8, 1991.

Ghassemian, "Evaluation Of Different Handoff Schemes For Cellular IP," Master's Thesis, Kings College, London, 2001.

Goldberg, "Systems Engineering And Program Managment For Personal Communications In T1P1," IEEE—ICUPC '92 Proceedings, pp. 151–157, Sep. 29, 1992–Oct. 2, 1992.

Goodman, "Cellular Packet Communications," IEEE Transactions On Communcations, vol. 38, No. 8, Aug. 1990.

Gross, "Telephone Lines—Industry Report, Donaldson, Lufkin & Jenrette Securities," Industry Report, Investext Report No. 1149341, p. 14, Nov. 11, 1991.

Haber, "The Art Of Wireless Computing," Midrange Systems, vol. 4, No. 16, p. 66, Aug. 6, 1991.

Hasselberg, "Mobitex Permits Tailored Telecom," Tele (English Edition), No. 2, vol. XXXXI, pp. 14–16, 1988.

Haug et al., "Microcellular Radio Performance In A Rayleigh/Rician CoChannel Interference Eivironment," IEEE—ICUPC '92 Proceedings, pp. 112–115, Sep. 29, 1992–Oct. 2, 1992.

Hayes et al., "Personal Satellite Communications Utilizing The KA–Band," IEEE—ICUPC '92 Proceedings, pp. 385–390, Sep. 29, 1992–Oct. 2, 1992.

Hightower et al., "Design And Calibration Of The SpotON Ad–Hac Location Sensing System," pp. 1–18, Aug. 2001.

Hines, "LM Ericsson—Company Report: Paine Webber Inc.," Investext Report No. 1153781, p. 9, Dec. 10, 1991.

Hirschman, "Service Mobility/Transparency For Personal Communications," IEEE—ICUPC '92 Proceedings, pp. 334–338, Sep. 29, 1992–Oct. 2, 1992.

Ho, "Effects Of Antenna Polarization And Beam Pattern On Multipath Delay Spread And Path Loss In Indoor Obstructed Wireless Channels," IEEE—ICUPC '92 Proceedings, pp. 92–96, Sep. 29, 1992–Oct. 2, 1992.

Hodes et al., "Composable Ad–Hoc Location–Based Services For Heterogeneous Mobile Clients," Wireless Networks, vol. 5, pp. 411–427, 1999.

Honcharenk et al., "Theoretical Prediction Of UHF Propagation Within Office Buildings," IEEE—ICUPC '92 Proceedings, pp. 102–105, Sep. 29, 1992–Oct. 2, 1992.

Huang et al., "OPNET Simulation Of A Multi–Hop Self–Organizing Wireless Sensor Network," Florida Communication Research Labs, Motorola Labs, Fort Lauderdale, FL 33322, 2002.

Hunt, "The Regulatory Environment For Personal Communications In The Post–WARC–92 Period," IEEE—ICUPC '92 Proceedings, pp. 429–432, Sep. 29, 1992–Oct. 2, 1992.

Ioannidis et al., "IP–Based Protocols For Mobile Internetworking," Proceedings Of Conference On Communications Architecture & Protocols, pp. 1–17, 1991.

Ioannidis et al. "IP–Based Protocols For Moblie Internetworking," Proceedings Of Conference On Communications Architecture & Protocols, 1991.

Jain, "Characteristics Of Destination Address Locality In Computer Networks: A Comparison Of Caching Schemes," Jun. 25, 1990.

Jakobs et al., "Electronic Mail In Broadcast Networks," IEEE—ICUPC '92 Proceedings, pp. 412–416, Sep. 29, 1992–Oct. 2, 1992.

Jalali et al., "Performance Of Data Protocols For In–Building Wireless Systems," IEEE—ICUPC '92 Proceedings, pp. 407–411, Sep. 29, 1992–Oct. 2, 1992.

Jetcheva et al., "Adaptive Demand–Driven Multicast Routing In Multi–Hop Wireless Ad Hoc Networks," Proceedings Of The 2nd ACM International Symposium On Mobile Ad–Hoc Networking & Computing (Long Beach Session: Routing And Transport), pp. 33–44, 2001.

Johansson et al., "Scenario–Based Performance Analysis Of Routing Protocols For Mobile Ad–Hoc Networks," Proceedings Of The 5th Annual ACM/IEEE International Conference On Mobile Computing And Networking (Seattle), pp. 195–206, 1999.

Johansson, "The Mobitex Experience," Paper Presented At International Mobile Communications (London 1990), pp. 55–68, Jun. 1990.

Jung et al., "A Power Saving MAC Protocol For Wireless Networks," Department Of Computer Science, Texas A&M University, Technical Report, Jul. 2002.

Jung et al., "An Energy Efficient MAC Protocol For Wireless LAN's," Department Of Computer Science, Texas A&M University, Technical Report TR01–017, Jul. 31, 2001.

Kaplan, "The Network In Your Pocket," Business Communications Review, vol. 21, No. 3, p. 112, Mar. 1991.

Karp et al., "GPSR: Greedy Perimeter Stateless Routing For Wireless Networks," Proceedings Of The 6th Annual International Conference On Mobile Computing And Networking (Boston), pp. 243–254, 2000.

Karp, "Geographic Routing For Wireless Networks," PhD Thesis, Harvard University, Oct. 2000.

Katz, "The Use Of Connectionless Network Layer Protocols Over FDDI Networks," ACM SIGCOMM Computer Communcation Review, vol. 20(3), pp. 32–45, 1990.

Kay, "Extended–TDMA™ A High Capacity Evolution Of U.S. Digital Cellular," IEEE—ICUPC '92 Proceedings, pp. 182–184, Sep. 29, 1992–Oct. 2, 1992.

Kearns, "Scope Of ZENworks 7 Suite Stretches Far And Wide," Network World, (http://www.networkworld.com\newsletters\netware\2005\0829nw1.html), Aug. 30, 2005.

Khandani et al., "ISI–Reduced Modulation Over A Fading Multipath Channel," IEEE—ICUPC '92 Proceedings, pp. 288–292, Sep. 29, 1992–Oct. 2, 1992.

Kiang, "Characteristics Of Two–Alternative Frequency Channel Assignment Methods For TDMA Wireless Access Systems," IEEE—ICUPC '92 Proceedings, pp. 355–358, Sep. 29, 1992–Oct. 2, 1992.

Kiang, "Geometrical Ray Tracing Approach For Indoor Wave Propagation In A Corridor," IEEE—ICUPC '92 Proceedings, pp. 106–111, Sep. 29, 1992–Oct. 2, 1992.

Kikuta, "Global UPT Architecture With International Mobility Management," IEEE—ICUPC '92 Proceedings, pp. 229–235, Sep. 29, 1992–Oct. 2, 1992.

Kilpatrick, "Mobile Packet–Switched Data Networks," RF Expo East, Orlando, FL, pp. 367–369, Oct. 29, 1991–Oct. 31, 1991.

Kim, "KBLCOM Eyes Automated Customer Service System," Multichannel News, v. 12, N. 12, p. 102, Mar. 25, 1991.

Kleeman, "Optimal Estimation Of Position And Heading For Mobile Robots Using Ultrasonic Beacons And Dead–Reckoning," Proceedings Of The 1992 IEEE International Conference On Robotics And Automation (Nice, France), 1992.

Krashinsky et al., "Minimizing Energy For Wireless Web Access With Bounded Slowdown," Proc. ACM Mobicon 02:119–130, 2002.

Krechmer, "A Review Of US Mobile Communications Standards," Telecommunications, vol. 25, No. 7, pp. 43–45, Jul. 1991.

Kriz et al., "Spread Spectrum Indoor Video Transmission," IEEE—ICUPC '92 Proceedings, pp. 421–425, Sep. 29, 1992–Oct. 2, 1992.

Ku, "The Outlook Of DCS 1880 For Personal Communications Networks," IEEE—ICUPC '92 Proceedings, pp. 168–171, Sep. 29, 1992–Oct. 2, 1992.

Kubo et al., "Simulated Tolerance Of Loop Parameters Of Cartesian Feedback Amplifier For $\pi/4$–Shifted QPSK Transmitter," IEEE—ICUPC '92 Proceedings, pp. 136–140, Sep. 29, 1992–Oct. 2, 1992.

Kumar, "Antennas For MSAT Ground Terminals," IEEE—ICUPC '92 Proceedings, pp. 219–223, Sep. 29, 1992–Oct. 2, 1992.

Kwok, "Wireless Networking Requirements Of Multimedia Applications," IEEE—ICUPC '92 Proceedings, pp. 402–406, Sep. 29, 1992–Oct. 2, 1992.

Lambert, "Security For Universal Personal Communications," IEEE—ICUPC '92 Proceedings, pp. 44–48, Sep. 29, 1992–Oct. 2, 1992.

Larsen, "Marketing Mobile Data Services And Equipment," Proceedings Of Cellular & Mobile Communications 88, pp. 111–116, Nov. 1988.

Larsen, "Mobitex—A System For Mobile Data Communication," Information Network And Data Communication, III, Proceedings Of The IFIP TC6 International Conference On Information Network And Data Communication, Lillehammer, Norway, pp. 239–247, Mar. 1990.

Larsen, "Mobitex—Public Mobile Radio Service," Communications International, vol. 13, Pt. 10, p. 96, Oct. 1986.

Lau et al., "Interworking Of Satellite And Terrestrial Networks For Land Mobile Communications," IEEE—ICUPC '92 Proceedings, pp. 375–379, Sep. 29, 1992–Oct. 2, 1992.

Laval et al., "Cognito Network Overview," Cognito Group Limited, Sep. 19, 1990.

Laval, "Briefing Document For A Brochure On The Cognito Mobile Messaging Service," Cognito Group Limited, May 22, 1990.

Lawson–Jenkins, "The Role of GSM In The Development Of Standards For A Worldwide Personal Communication Network," IEEE—ICUPC '92 Proceedings, p. 79–81, Sep. 29, 1992–Oct. 2, 1992.

Leibowitz et al., "Rogers Cantel Mobile Communications Inc.—Company Report," Donaldson, Lufkin & Jenrette Securities, Investext Report No. 1145153, Oct. 15, 1991.

Lin et al., "A Two–Stage Maximum Likelihood Sequence Estimation Technique And Its Application To Data Transmission Protocol In Digital Cellular Radio," IEEE—ICUPC '92 Proceedings, pp. 303–307, Sep. 29, 1992–Oct. 2, 1992.

Linnartz et al., "Performance Of Personal Communication Networks With Error Correction Coding In Microcellular Channels," IEEE—ICUPC '92 Proceedings, pp. 308–313, Sep. 29, 1992–Oct. 2, 1992.

Lo et al., "An Estimate Of Network Database Transaction Volume To Support Personal Communications Services," IEEE—ICUPC '92 Proceedings, pp. 236–241, Sep. 29, 1992–Oct. 2, 1992.

Ioannidis et al., "The Design And Implementation Of A Mobile Internetworking Architecture," 1993 Winter USENIX, San Diego, CA, pp. 489–500, Jan. 25, 1993–Oct. 29, 1993.

Loberg et al., "Mobitex—The New Swedish Cellular Mobile Radio Service," International Conference On Radio Receivers & Associated Systems ($4^{th}$: 1986), Pub. No. 68, pp. 77–82, 1986.

Loberg et al., "Mobitex Brings A New Look To Dispatch Communications," Communications International, vol. 12, No. 2, pp. 25–32, Feb. 1985.

Long et al., "Rapid Prototyping Of Mobile Context–Aware Applications: The Cyberguide Study," Proceedings Of The 2nd Annual International Conference On Mobile Computing And Networking, (Rye, NY), 1996.

Loudermilk, "Trio Throws Weight Behind Radio E–Mail Technology," PC Week, vol. 8, No. 48, p. 39, Dec. 2, 1991.

Lusa, "The ITU's Quadrennial Telecom Show In Geneva Attracts And Dazzles Thousands," Networking Management, vol. 9, No. 14, pp. 12–14, Dec. 1991.

Lycksell, "Mobitex: A New Radio Communication System For Dispatch Traffic," Tele (English Edition), vol. 35, Issue 1, pp. 68–75, 1983.

Madhow, "Minimum Mean Squared Error Interference Suppression For Direct–Sequence Spread–Spectrum Code–Division Multiple–Access," IEEE—ICUPC '92 Proceedings, pp. 273–277, Sep. 29, 1992–Oct. 2, 1992.

Malyan et al., "A Wireless Personal Communications Architecture For Urban Areas," IEEE—ICUPC '92 Proceedings, pp. 116–120, Sep. 29, 1992–Oct. 2, 1992.

Mandell et al., "A Comparison Of CDMA And Frequency Hopping In A Cellular Environment," IEEE—ICUPC '92 Proceedings, pp. 172–176, Sep. 29, 1992–Oct. 2, 1992.

Maric et al., "Microcell Planning And Channel Allocation For Manhattan Street Environments," IEEE—ICUPC '92 Proceedings, pp. 359–363, Sep. 29, 1992–Oct. 2, 1992.

Mathy et al., "An Overlay Tree Building Protocol," J. Crowcroft And M. Hoffman (Eds.) Springer–Verlag Berlin–Heidelberg, pp. 76–87, 2001.

McIlwain et al., "Routing Technology Software Inc. And Ericsson GE Team Up To Provide 'Roadshow' Routing Application To Mobitex Networks Worldwide," Business Wire, San Francisco, Jun. 6, 1991.

Mokhtar et al., "Capacity For Cellular CDMA PCS's In Nakagami Fading Log–Normal Shadowing Channels," IEEE—ICUPC '92 Proceedings, pp. 190–194, Sep. 29, 1992–Oct. 2, 1992.

Morrison et al., "Statistical Analysis And Autoregressive Modeling Of The Indoor Radio Propagation Channel," IEEE—ICUPC '92 Proceedings, pp. 97–101, Sep. 29, 1992–Oct. 2, 1992.

Mulqueen, "Mobile Data Network Debuts," Data Communications, p. 78, Jan. 1991.

Murphy et al., "UPT: Mobility vs. Portability," IEEE—ICUPC '92 Proceedings, pp. 224–228, Sep. 29, 1992–Oct. 2, 1992.

Murthy et al., "A Routing Protocol For Packet Radio Networks," Proceedings Of The 1st Annual International Conference On Mobile Computing And Networking (Berkeley), pp. 86–95, 1995.

Murthy et al., "An Efficient Routing Protocol For Wireless Networks," Mobile Networks And Applications 1, pp. 183–197, 1996.

Nakajima et al., "Intelligent Network Architecture For Personal Mobile Telecommunication," IEEE—ICUPC '92 Proceedings, pp. 339–344, Sep. 29, 1992–Oct. 2, 1992.

Nichols, "LM Ericsson—Company Report: Prudential Securities Inc.," Investext Report No. 1035361, p. 19, Oct. 11, 1990.

Nikaein et al, "DDR–Distributed Dynamic Routing Algorithm For Mobile Ad Hoc Networks," Proc. Of The 1st Annual ACM International Symposium On Mobile Ad Hoc Networking & Computing (Boston), Session A, pp. 19–27, 2000.

Noel et al., "The Development Of An 8 KBPS GMSK–Like Modem For Mobitex," IEEE Pacific Rim Conference On Communications, Computers And Signal Processing, vol. 2, pp. 791–794, May 9, 1991–May 10, 1991.

Noerpel, "Hybrid Signaling For The Air Interface For A Wireless Access Communication System," IEEE—ICUPC '92 Proceedings, pp. 49–53, Sep. 29, 1992–Oct. 2, 1992.

O'Byrne, "Digital Cellular Over The Cable Television Fiber–Optic Plant," IEEE—ICUPC '92 Proceedings, pp. 205–208, Sep. 29, 1992–Oct. 2, 1992.

Pande et al., "Application Of Wireless Access To Telecommunication Services In Developing Countries," IEEE—ICUPC '92 Proceedings, pp. 82–86, Sep. 29, 1992–Oct. 2, 1992.

Perlman, "An Algorithm For Distributed Computation Of A Spanning Tree In An Extended LAN," Proceedings Of The Ninth Symposium On Data Communications (Whistler Mountain, British Columbia, Canada), pp. 44–53, 1985.

Perlman, "Incorporation of Multiaccess Links Into A Routing Protocol," Proceedings Of The Eighth symposium On Data Communications (North Falmouth, MA), pp. 85–94, 1983.

Pouwelse et al., "Power Consumption Trade–Offs For Wireless Audio Access," Delft University Of Technology, 2000.

Powell, "Cellular Telephones Give Way To Mobile Communications," Communications Canada, p. 35, Jun. 22, 1989.

Powell, "Use Cellular To Support Datacom Applications," Networking Management, vol. 9, No. 5, pp. 30–34, Apr. 1991.

Prakash, "A Routing Algorithm For Wireless Ad Hoc Networks With Unidirectional Links," Wireless Networks, vol. 7, pp. 617–625, 2001.

Prakash, "Unidirectional Links Prove Costly In Wireless Ad Hoc Networks," Proceedings Of The 3rd International Workshop On Discrete Algorithms And Methods For Mobile Computing And Communication (Seattle), pp. 15–22, 1999.

Preston, "Ericsson, GE Form Mobile Venture," Communications Week International, No. 25, p. 9, Aug. 21, 1989.

Priyantha et al., "The Cricket Compass For Context–Aware Mobile Applications," Proceedings Of The 7th Annual International Conference On Mobile Computing And Networking (MOBICOM 2000), pp. 1–14, 2001.

Purton, "BT Admits Impact Of Recession But Still Manages To Improve Results," Europe 2000—Communications & Information Technology, vol. 3, No. 7, pR 93(1), Sep. 1991.

Ramesh et al, "Spectral Shaping Using Coded Modulation For Mobile Radio," IEEE—ICUPC '92 Proceedings, pp. 298–302, Sep. 29, 1992–Oct. 2, 1992.

Reinbold et al., "A Comparison Of IP Mobility Protocols," Tech. Rep. Infonet–TR–13, Dec. 2001.

Reiter, "Three Cellular Modems," PC Magazine, vol. 9, No. 22, p. 365, Dec. 25, 1990.

Rodrigues et al., "Rural Satellite Service: A Mexican View," IEEE—ICUPC '92 Proceedings, pp. 380–384, Sep. 29, 1992–Oct. 2, 1992.

Rohani et al., "Low Cost High Performance CDMA System For U.S. PCS," IEEE—ICUPC '92 Proceedings, pp. 278–282, Sep. 29, 1992–Oct. 2, 1992.

Röhl et al., "A Short Look On Power Saving Mechanism In The Wireless LAN Standard" Draft IEEE 802.11, pp. 1–6, 1997.

Royer et al., "Multicast Operation Of The Ad–Hoc On–Demand Distance Vector Routing Protocol," Proceedings Of the $5^{th}$ Annual ACM/IEEE International Conference On Mobile Computing And Networking (Seattle), pp. 207–218, 1999.

RPM Native Mode Interface R1.1.1 Reference Manual, May 1, 1992.

Salkintzis et al., "Mobile Packet Data Technology: An Insight Into Mobitex Architecture," IEEE Personal Communications, pp. 10–18, Feb. 1997.

Sanford et al., "Facade Integrated Microstrip Patch Antennas Applied To Personal communication Networks," IEEE—ICUPC '92 Proceedings, pp. 214–218, Sep. 29, 1992–Oct. 2, 1992.

Savage, "A Technology To Link Professionals On The Road To Central Information Systems: Mobitex Public Networks In Europe," World Congress On Applications Of Transport Telematics And Intelligent Vehicle–Highway Systems, vol. 5, pp. 2662–2668, 1995.

Schwartz, "Ericsson Set To Debut Radio Modems," Communications Week, p. 21, Dec. 2, 1991.

Seshan et al., "The Role Of Digital Processing In Personal Communications Networks," IEEE—ICUPC '92 Proceedings, pp. 200–204, Sep. 29, 1992–Oct. 2, 1992.

Seshan, "Low–Latency Handoff For Cellular Data Networks," Ph.D. Thesis, University Of California At Berkeley, 1995.

Sheety et al., "Development in Mobile Markets," Communications International, vol. 18, No. 12, p. 47, Dec. 1991.

Sneed, "A 2–GHz CMOS LC–Tuned VCO Using Switched–Capacitors To Compensate For Bond Wire Inductance Variation," University Of California, Berkeley, pp. 1–51, Dec. 21, 2000.

Sollenberger et al., "An Efficient TDMA Radio Link And Architecture For Wireless Local Access," IEEE—ICUPC '92 Proceedings, pp. 262–266, Sep. 29, 1992–Oct. 2, 1992.

Srisathapornpat et al., "Coordinated Power Conservation For Ad Hoc Networks," IEEE International Conference On Communications, 25(1), pp. 3330–3335, 2002.

Stein, "Greater Efficiency With Mobile Data Communication," Ericsson Review, vol. 68, Issue 4, pp. 104–110, 1991.

Steinert–Threlkeld, "Ericsson Unit To Aid New Network: Richardson Firm To Provide Equipment For Cellular Data Link," The Dallas Morning News, Record No. DAL1073150, Jun. 1, 1989.

Sudame et al., "On Providing Support For Protocol Adaptation In Mobile Wireless Networks," Mobile Networks And Applications 6, pp. 43–55, 2001.

Sweeny, "IBM, Motorola Join To Offer Mobile Data," Communications Week, vol. 286, pp. 2, 84, Feb. 5, 1990.

Takats et al., "A Network Management Architecture For Satellite Based Personal Communications," IEEE—ICUPC '92 Proceedings, pp. 395–401, Sep. 29, 1992–Oct. 2, 1992.

Tan et al., "A Fast Handoff Scheme For Wireless Networks," Proceedings Of The 2nd ACM International Workshop On Wireless Mobile Multimedia (Seattle, WA), 1999.

Tan et al., "Mobicast: A Multicast Scheme For Wireless Networks," Mobile Networks And Applications 5, pp. 259–271, 2000.

Tanno et al., "Multiplexing Of Communication Ports On Unix Terminals For Packet Radio Networks," IEEE—ICUPC '92 Proceedings, pp. 417–420, Sep. 29, 1992–Oct. 2, 1992.

Thorborg et al., "Mobimed—A Telemedicine System For Mobile Monitoring Of Physiological Parameters," SPIE, vol. 1355, Telecommunication For Health Care: Telemetry, Teleradiology, And Telemedicine 1990, Proceedings Of IEEE Western Canada Conference And Exhibition, pp. 32–35, Jul. 6, 1990–Jul. 7, 1990.

Todd et al., "Low Power Rendezvous In Embedded Wireless Networks," Proceedings Of The 1st ACM International Symposium on Mobile Ad Hoc Networking & Computing (Boston), Sessions D, pp. 107–118, 2000.

Todd et al., "Space And Frequency Diversity Measurements of The 1.7 GHz Indoor Radio Channel For Wireless Personal Communications," IEEE—ICUPC '92 Proceedings, pp. 87–91, Sep. 29, 1992–Oct. 2, 1992.

Toh, "A Hybrid Handover Protocol For Local Area Wireless ATM Networks," Mobile Networks And Applications 1, pp. 313–334, 1996.

Troe, "Mobile–Data Packet–Networks," Electro International Conference Record, New York, pp. 510–513, Apr. 16, 1991–Apr. 18, 1991.

Tsukamoto et al., "Mobility Management Of Transport Protocol Supporting Multiple Connections," Proceedings Of The Second International Workshop On Monthly Management & Wireless Access Protocols (Philadelphia, PA), Session 4, pp. 83–87, 2004.

Ubiquity 1000 Cellular Communications System—Technical Information, May 18, 1994.

Ubiquity 1000 Cellular Communications System For Your IBM ThinkPad™ 750, User's Guide, May 18, 1994.

Valko et al., "On The Analysis Of Cellular IP Access Networks," Sixth JFIP International Workshop On Protocols For High Speed Networks (Salem), Aug. 25, 1999–Aug. 27, 1999.

Velocci, "Orbcomm Nears Full Operational Status," Aviation Week & Space Technology, vol. 149, No. 21, pp. 46–48, Nov. 23, 1998.

Vijayan et al., "The Dynamic Behavior Of Handoff Algorithms," IEEE—ICUPC '92 Proceedings, pp. 39–43, Sep. 29, 1992–Oct. 2, 1992.

Vinton, "Cellular Market Booms, But Competition Looms," Business Communications Review, vol. 20, No. 8, p. 73–77, Aug. 1990.

Vizard, "Standards For UPT Introduction and Evolution," IEEE—ICUPC '92 Proceedings, pp. 74–78, Sep. 29, 1992–Oct. 2, 1992.

Wang et al., "On Frequency–Hop Multiple Access Sequence," IEEE—ICUPC '92 Proceedings, pp. 177–181, Sep. 29, 1992–Oct. 2, 1992.

Wang et al., "Tracking A Head–Mounted Display In A Room–Sized Environment With Head–Mounted Cameras," Proc. Of Helmet–Mounted Displays II, Orlando, FL, vol. 1290 SPIE, Apr. 19, 1990–Apr. 20, 1990.

Wang, "The Hierarchical Structure Of Tracing Strategy For Universal Personal Communication Systems," IEEE—ICUPC '92 Proceedings, pp. 242–246, Jun. 23, 1992.

Want et al., "The Active Badge Location System," ACM Transactions On Information Systems, vol. 10, No. 1, pp. 91–102, Jan. 1992.

Webb, "Voice And Data Privacy Using Chaotic Time Sequences," IEEE—ICUPC '92 Proceedings, pp. 33–38, Sep. 29, 1992–Oct. 2, 1992.

Wilber–Ham et al., "Universal Personal Telecommunication (UPT) Service And Architecture Overview," IEEE—ICUPC '92 Proceedings, pp. 64–68, Sep. 29, 1992–Oct. 2, 1992.

Williams, "It's Telecom All The Way For A Rejuvenated Ericsson (LM Ericsson of Sweden Sticks To Telecommunications Business)," Electronic Business Buyer, Jul. 10, 1989.

Wilson et al., "CDMA Versus Dynamic TDMA For Access Control In An Integrated Voice/Data PCN," IEEE—ICUPC '92 Proceedings, pp. 267–272, Sep. 29, 1992–Oct. 2, 1992.

Winters et al., "The Capacity Of Wireless Communication Systems Can Be Substantially Increased By The Use Of Antenna Diversity," IEEE—ICUPC '92 Proceedings, pp. 28–32, Sep. 29, 1992–Oct. 2, 1992.

Wolter, "Multiplexing On The Downlink Of A TDMA–Based Radio System," IEEE—ICUPC '92 Proceedings, Sep. 29, 1992–Oct. 2, 1992, pp. 258–261.

Wolterink, "Handoff, A Necessary Feature In Wireless Office Systems," IEEE—ICUPC '92 Proceedings, pp. 368–374, Sep. 29, 1992–Oct. 2, 1992.

Woolnough, "Ericsson Pushes Mobile Data Standard," Electronic Engineering Times, vol. 520, p. 18, Jan. 9, 1989.

Woolnough, "Finnish Farm Has Mixed Results Building Through Acquisitions: Nokia Finds Fast Track Has Its Bumps," Electronic Engineering Times, vol. 614, pp. 85–86, Oct. 29, 1990.

Wu et al., "AMRIS: A Multicast Protocol For Ad Hoc Wireless Networks," Proceedings of IEEE MILCOMM '99 (Atlantic City, NJ), pp. 1–5, 1999.

Yamagishi et al., "A Low–Voltage 6–GHZ Band CMOS Monolithic LC–Tank VCO Using A Tuning–Range Switching Technique," IEEE MTT–S Digest, pp. 735–738, 2000.

Yu, "IS–41 For Mobility Management," IEEE—ICUPC '92 Proceedings, pp. 158–162, Sep. 29, 1992–Oct. 2, 1992.

Lin et al., "A 900 MHz, 2.5mA CMOS Frequency Synthesizer With An Automated SC Tuning Loop," Custom Integrated Circuits Conference, 2000 CICC. Proceedings of the IEEE 2000, pp. 375, 378.

Ginsburg, "A 1.6–3.2 GHz, High Phase Accuracy Quadrature Phase Locked Loop," Masters Thesis, Department Of Electrical Engineering And Computer Science, Mass. Inst. Of Technology, Jun. 2003.

Digital And Ericsson Agree On Data Network Project, Wall Street Journal, p. B4, Oct. 8, 1991.

"Ericsson And General Electric Going Mobile," Telephone Engineer & Management News, pp. 30–39, Oct. 1, 1989.

"Messenger User Guide," Cognito Limited, Apr. 1991.

"Mobilt Datanät om två år" (Mobile Datanet In Two Years), Elteknik Med. Ektuell Electronik, V. 5, p. 6, 1985.

"Radio Networks—An Air Bridge For Data," 1989.

"Standards: Ericsson," Communications International 1991, p. 46, Sep. 1991.

"The Second Overseas Radio Wave Utilization System Investigation Committee Report," Kaigai Denpa Rioy Shisutemu Chosadan Hokokusho, Dai2kai, Showa, Abstract, 1987.

"Trögt för Motitex" (Delays For Mobitex), Elteknik Med. Aktuell Elektronok, vol. 3, pp. 19–21, 1987.

"Update On Ardis–Mobitex Radio Modem Competition," Newsbyte News Network, Oct. 2, 1991.

"Waiting Time For Wireless," Computerworld, pp. 73–75, Oct. 15, 1990.

*Agere* v. *Broadcom* Memorandum & Order, Jul. 20, 2004, Bates Nos. BCMITC00000256573–667.

ETSI Handbook Guide To The Application Of The PNE Rules To The Drafting And Presentation Of ETSI Standards v 1.3, May 1990.

Fast And Scalable Handoffs For Wireless Internet Works, Proceedings Of The 2nd Annual International Conference On Mobile Computing And Networking (Rye, NY), pp. 56–66, 1996.

File History of U.S. Appl. No. 08/027,140, Bates Nos. BCMITC0000789531–664, Mar. 5, 1993.

File History of U.S. Appl. No. 08/101,254, Bates Nos. BCMITC0000793836–978, Aug. 3, 1993.

File History of U.S. Appl. No. 08/114,872, Bates Nos. QBB220620–1242, Aug. 31, 1993.

File History of U.S. Appl. No. 08/431,077, Bates Nos. BCMITC0000795734–862 Apr. 27, 1995.

File History of U.S. Appl. No. 08/487,609, Bates Nos. BCMITC0000792166–658, Jun. 7, 1995.

File History of U.S. Appl. No. 08/513,645 ('983 file history), Bates Nos. BCMITC000071666–72400, Aug. 11, 1995.

File History of U.S. Appl. No. 09/060,287 ('311 file history), Bates Nos. BCMITC000071327–71665, Apr. 14, 1989.

Haine, "A New Radio Access Protocol And Network Architecture For Mobile Packet Data," Proc. Of Vehicular Technology Conference, pp. 1–15, May 19–22, 1991.

Henderson, "Public Data Networks: The Mobitex System," Paper Presented At The IEEE Vehicle Navigation And Information Systems Conference (VNIS '89), pp. 365, 1989.

Noll, "Introduction To Telehpones And Telephone Systems," 3rd Edition, 1998.

Rubbermark, Generic Design Specification Jane Pocket Telephones, Dec. 22, 1992, Bates No. E 00 0745C–0778C.

Katarina Standard Cell Specification, Aug. 12, 1992, Bates No. E 00 0087C–0242C.

Katie Gate Array Specification, Jan. 24, 1992, Bates No. E 00 1498C–1620C.

Noll, "Landmobile And Marine Radio Technical Handbook," 1985.

List of Change Request Presented To SMH Plenary No. 6, Rev 1, SMG 305/93, Mar. 29, 1993.

Lycksell, "Mobitex, ett kommunikations–radionät för text, data och tal" (A Radio Communication Network For Text, Data And Speech), 1986.

Walker, Mobile Information Systems, 1990.

Rothblatt, Radiodetermination Satellite Services And Standards, 1987.

Robert Meier Deposition Transcript, Nov. 18, 2005.

Smart RF Wireless Data Microtransmitter AT86RF401, 1998.

SMH Meeting Report, Doc 255/92, Mar. 30, 1992.

Stemm, "Vertical Handoffs In Wireless Overlay Networks," Mobile Networks And Applications 3, Abstract, 1998.

Steven Koenck Deposition Transcript, Nov. 15, 2005.

Sweden, Telecommunications (International Edition), vol. 25, No. 10, pp. 145–148, 1991.

TIA–856 Spec., a High Rate Packet Data Air Interface Spec., Apr. 2004.

Ericsson—Company Report: Svenska International PLC, Investext Report No. 1152645, p. 2 of 2, Nov. 15, 1991.

Joifaei et al., "Concept Of On–Board–Processing Satellites," IEEE—ICUPC '92 Proceedings, pp. 391–394, Sep. 29, 1992–Oct. 2, 1992.

Seshadri et al., "Coded Modulation With Time Diversity, Unequal Error Protection, And Low Delay For The Rayleigh Fading Channel," IEEE—ICUPC '92 Proceedings, pp. 283–287, Sep. 29, 1992–Oct. 2, 1992.

Slimane et al., "Coded Quadrature Pulse–Overlapping Modulation Techniques For Personal Communications," IEEE—ICUPC '92 Proceedings, pp. 293–297, Sep. 29, 1992–Oct. 2, 1992.

Wang, "Coded BER Performance In A Correlative Fading Channel," IEEE—ICUPC '92 Proceedings, pp. 126–130, Sep. 29, 1992–Oct. 2, 1992.

"Ericsson Wins Mobile Data Pact," Communications Week International, No. 21, p. 13, Jun. 26, 1989.

Rohl, A Short Look on Power Saving Mechanisms in the Wireless LAN Standard Draft IEEE Standard 802.11, Jun. 26, 1997, Bates No. QBB218363–368.

Calhoun, Wireless Access and the Local Telephone Network, 1992.

Yu, "Overview of EIA/TIA IS–41," IEEE 1992, pp. 220–224, 1992.

Kishine et al., "A 2.5 Gb/s Clock And Data Recovery IC With Tunable Jitter Characteristics For Use In LAN's And WAN's," IEEE J.of Solid–State Circuits, vol. 34, No. 6, pp. 805–812, Jun. 1999.

Kral et al., "RF–CMOS Oscillators With Switched Tuning," Custom IC Conference, Santa Clara, CA, pp. 555–558, May 1998.

Kral, "A 2.4 GHz CMOS Frequency Synthesizer," UCLA Integrated Circuits And Systems Laboratory, Mar. 1998.

Lo, "A 1.5–V 900–MHz Monolithic CMOS Fast–Switching Frequency Synthesizer For Wireless Applications," Symposium on VLSI Circuits of Technical Papers, p. 238–241, 2000.

Alvarez, A Wide–Bandwidth Low–Voltage PLL for PowerPC Microprocessors, Symposium on VLSI Circuits Digest of Technical Papers, 1994.

Decision of Appeal 2007–1164 in the United States Court of Appeals for the Federal Circuit, *Broadcom Corporation* v. *International Trade Commission and Qualcomm Incorporated,* On appeal from the United States International Trade Commission in Investigation No. 337–TA–543, Decided Sep. 19, 2008.

EIA/TIA Interim Standard, "Cellular System Dual–Mode Mobile Station—Base Station Compatibility Standard," Revision A, Mar. 1991, EIA/TIA/IS–54–A.

EIA/TIA Interim Standard, "Cellular System Dual–Mode Mobile Station—Base Station Compatibility Standard," Revision B, Apr. 1992, EIA/TIA/IS–54–B.

Intel 8088 data sheet, Aug. 1990.

M68HC11 Reference Manual, Rev. 3.0, 1991.

Zilog Z80 Product Specification, Jan. 1978.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 4, 8, 9 and 11 is confirmed.

New claims 26-41 are added and determined to be patentable.

Claims 2, 3, 5-7, 10 and 12-25 were not reexamined.

26. *The one or more circuits of claim 1, where said first wireless communication and said second wireless communication are digital wireless communications.*

27. *The one or more circuits of claim 26, where:*
   *said first wireless communication comprises cellular communication; and*
   *said second wireless communication comprises spread spectrum communication.*

28. *The one or more circuits of claim 26, where:*
   *said first wireless communication comprises communicating with a telecommunication network; and*
   *said second wireless communication comprises communicating with a computer network.*

29. *The one or more circuits of claim 28, where said computer network comprises a wireless local area network.*

30. *The one or more circuits of claim 26, where said second wireless communication generally comprises communication over a longer distance than the first wireless communication.*

31. *The one or more circuits of claim 26, where:*
   *said first wireless communication comprises narrowband communication; and*
   *said second wireless communication comprises wideband communcation.*

32. *The one or more circuits of claim 31, where said second wireless communication comprises frequency-hopping spread spectrum communication.*

33. *The one or more circuits of claim 26, where said second wireless communication comprises frequency-hopping spread spectrum communication.*

34. *The one or more circuits of claim 26, where:*
   *said first wireless communication comprises communicating utilizing a first digital communication protocol corresponding to a first protocol stack; and*
   *said second wireless communication comprises communicating utilizing a second digital communication protocol corresponding to a second protocol stack different from said first protocol stack,*
   *where said first and second protocol stacks share at least one protocol stack layer.*

35. *The one or more circuits of claim 26, where said communication circuitry comprises a first digital transceiver adapted to perform said first wireless communication and a second digital transceiver adapted to perform said second wireless communication.*

36. *The one or more circuits of claim 26, where said communication circuitry is adapted to concurrently use said first and second wireless communications.*

37. *The one or more circuits of claim 26, comprising circuitry adapted to implement a reduced power mode by, at least in part, deactivating said processing circuitry by removing power from said processing circuitry.*

38. *The one or more circuits of claim 26, comprising circuitry adapted to implement a reduced power mode by, at least in part, deactivating said processing circuitry by removing a clocking signal from said processing circuitry.*

39. *The one or more circuits of claim 26, where said communication circuitry is adapted to use a wired network communication.*

40. *The one or more circuits of claim 1, where:*
   *said first wireless communication comprises communicating utilizing a first communication protocol; and*
   *said second wireless communication comprises communicating utilizing a second communication protocol different from said first communication protocol.*

41. *The one or more circuits of claim 26, where:*
   *said first wireless communication comprises communicating utilizing a first communication protocol; and*
   *said second wireless communication comprises communicating utilizing a second communication protocol different from said first communication protocol.*

\* \* \* \* \*